US011656592B2

(12) United States Patent
Ota et al.

(10) Patent No.: US 11,656,592 B2
(45) Date of Patent: May 23, 2023

(54) ANALYSIS DEVICE, ANALYSIS METHOD, AND RECORDING MEDIUM

(71) Applicant: OMRON Corporation, Kyoto (JP)

(72) Inventors: Yuya Ota, Kyotanabe (JP); Reiko Hattori, Kyoto (JP); Kosuke Tsuruta, Sakai (JP); Akira Nakajima, Shiga (JP); Shinsuke Kawanoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 154 days.

(21) Appl. No.: 17/270,449

(22) PCT Filed: Feb. 20, 2020

(86) PCT No.: PCT/JP2020/006719
§ 371 (c)(1),
(2) Date: Feb. 23, 2021

(87) PCT Pub. No.: WO2020/184129
PCT Pub. Date: Sep. 17, 2020

(65) Prior Publication Data
US 2021/0397148 A1 Dec. 23, 2021

(30) Foreign Application Priority Data

Mar. 13, 2019 (JP) .............................. JP2019-045744

(51) Int. Cl.
*G05B 19/042* (2006.01)
(52) U.S. Cl.
CPC .. *G05B 19/042* (2013.01); *G05B 2219/23427* (2013.01)
(58) Field of Classification Search
CPC ........ G05B 19/042; G05B 2219/23427; G05B 19/056; G06F 8/433; G06F 8/74
See application file for complete search history.

(56) References Cited

U.S. PATENT DOCUMENTS

2014/0304551 A1* 10/2014 Nakai ................. G06F 11/3692
714/38.1
2018/0314225 A1* 11/2018 Bisse ..................... G05B 19/05
(Continued)

FOREIGN PATENT DOCUMENTS

| JP | H10289102 | 10/1998 |
| JP | 2012203777 | 10/2012 |

(Continued)

OTHER PUBLICATIONS

"International Search Report (Form PCT/ISA/210) of PCT/JP2020/006719," dated May 19, 2020, with English translation thereof, pp. 1-4.

(Continued)

*Primary Examiner* — Chad G Erdman
(74) *Attorney, Agent, or Firm* — JCIPRNET

(57) ABSTRACT

An analysis device according to one aspect of the present invention supplies a definition for a dependency relation between an input parameter and an output parameter of a standard function, which cannot be derived in a dependency analysis of a control program, the definition being supplied by use of function structure information which is external information. In other words, an analysis device according to this configuration identifies a dependency relation between an input parameter and an output parameter of the standard function on the basis of function structure information that defines a dependency relation between the input parameter and the output parameter of the standard function. Therefore, the dependency relation between the input and the output of a standard function becomes clear, so the dependency relations between a plurality of device variables that mediate the standard function can be identified.

16 Claims, 34 Drawing Sheets

(56) References Cited

U.S. PATENT DOCUMENTS

2018/0348728 A1    12/2018  Ota et al.
2019/0362007 A1 *  11/2019  Jeong ..................... G06F 16/24

FOREIGN PATENT DOCUMENTS

| JP | 2013156786 |   | 8/2013 |   |   |
|----|------------|---|--------|---|---|
| JP | 2013156786 A | * | 8/2013 |   |   |
| JP | 2013225251 |   | 10/2013 |   |   |
| WO | WO-2013161195 A1 | * | 10/2013 | ......... | G06F 11/3672 |

OTHER PUBLICATIONS

"Written Opinion of the International Searching Authority (Form PCT/ISA/237) of PCT/JP2020/006719," dated May 19, 2020, with English translation thereof, pp. 1-6.
"Search Report of Europe Counterpart Application", dated Oct. 21, 2022, p. 1-p. 10.

\* cited by examiner

Program0 / Section0

(
(:= A1 D1)
(CAL (Inst_MyFB
  ((:= Enable _tmpPF0)
  (:= Arg1 A1)
  (:= Arg2 Var1))))
(:= D2 Inst_MyFB.Out1)
(CAL (Inst_StdFB2
  ((:= Execute _tmpPF0)
  (:= Input Var2)))
(:= D4 Inst_StdFB2.Out1)
)

My_FB

(
(:= Exe Enable)
(CAL (Inst_StdFB1
  ((:= EN TRUE)
  (:= Execute _tmpPF0)
  (:= Input1 Arg1)
  (:= Input2 Arg2))))
(:= Out1 inst_StdFB1.Out)
(:= tmp2 Arg2)
(:= Out2 (AND Exe tmp2))
)

| NO | PARENT | DEVICE | FOCUS | DIRECTION | VARIABLE | PROGRAM | INSTANCE | FUNCTION | PARAMETER | IO |
|---|---|---|---|---|---|---|---|---|---|---|
| 1 | - | D1 | D1 | ↑ | A1 | Program0/Section0 | Inst_MyFB | My_FB | Arg1 | INPUT |
| 2 | 1 | D1 | Arg1 | = | Arg1 | My_FB | Inst_StdFB1 | Std_FB1 | Input1 | INPUT |
| 3 | - | D2 | D2 | ↓ | Out1 | Program0/Section0 | Inst_MyFB | My_FB | Out1 | OUTPUT |
| 4 | 3 | D2 | Out1 | = | Out1 | My_FB | Inst_StdFB1 | Std_FB1 | Out | OUTPUT |
| 5 | - | D3 | D3 | = | D3 | Program0/Section0 | Inst_MyFB | My_FB | Enable | INPUT |
| 6 | 5 | D3 | Enable | ↑ | Exe | My_FB | Inst_StdFB1 | Std_FB1 | Execute | INPUT |
| 7 | - | D3 | D3 | = | D3 | Program0/Section0 | Inst_StdFB2 | Std_FB2 | Execute | INPUT |
| 8 | - | D4 | D4 | = | D4 | Program0/Section0 | Inst_StdFB2 | Std_FB2 | Out1 | OUTPUT |

| ID | FB | PAR_X | PAR_Y |
|---|---|---|---|
| 1 | Std_FB1 | Execute | Out |
| 2 | Std_FB1 | Input1 | Out |
| 3 | Std_FB1 | Input2 | Out |
| 4 | Std_FB2 | Execute | Out1 |
| 5 | Std_FB2 | Execute | Out2 |
| 6 | Std_FB2 | Input | Out2 |

| DEVICE | INSTANCE | DEP | ID | TRACE |
|---|---|---|---|---|
| D1 | Inst_StdFB1 | PAR_X | 2 | 1,2 |
| D2 | Inst_StdFB1 | PAR_Y | 1 | 3,4 |
| D2 | Inst_StdFB1 | PAR_Y | 2 | 3,4 |
| D2 | Inst_StdFB1 | PAR_Y | 3 | 3,4 |
| D3 | Inst_StdFB1 | PAR_X | 1 | 5,6 |
| D3 | Inst_StdFB2 | PAR_X | 4 | 7 |
| D3 | Inst_StdFB2 | PAR_X | 5 | 7 |
| D4 | Inst_StdFB2 | PAR_Y | 4 | 8 |

FIG.14B

|    | D1 | D2 | D3 | D4 |
|----|----|----|----|----|
| D1 | 0  | 1  | 0  | 0  |
| D2 | 0  | 0  | 0  | 0  |
| D3 | 0  | 1  | 0  | 1  |
| D4 | 0  | 0  | 0  | 0  |

ANALYSIS DEVICE, ANALYSIS METHOD, AND RECORDING MEDIUM

CROSS-REFERENCE TO RELATED APPLICATION

This application is a 371 application of the International PCT application serial no. PCT/JP2020/006719, filed on Feb. 20, 2020, which claims the priority benefits of Japan Patent Application No. 2019-045744, filed on Mar. 13, 2019. The entirety of each of the above-mentioned patent applications is hereby incorporated by reference herein and made a part of this specification.

TECHNICAL FIELD

The present invention relates to an analysis device, an analysis method, and an analysis program.

BACKGROUND ART

A production line in a factory or the like is configured of a plurality of devices (mechanisms) such as a conveyor and a robot arm. When an abnormality of any device on this production line occurs, production of a product will be stopped, which can cause great losses. Therefore, in factories and the like, a maintenance worker regularly patrols the production line to check for the occurrence of abnormalities or signs of such abnormalities.

When the occurrence of an abnormality or signs of the abnormality is detected in the production line, a true cause of the abnormality may be present in a device before the device in which the abnormality is detected. Therefore, it is important to understand a dependency relation of each of the devices in the production line in order to identify the true cause of the abnormality. However, since the number of devices constituting the production line increases and operating conditions of each of the devices may change daily, it is difficult to accurately understand the dependency relations of all the devices.

Therefore, conventionally, a skilled maintenance worker understands the dependency relations between a plurality of devices constituting the production line based on his/her own experience and intuition, and detects an abnormality or a sign thereof which has occurred in the production line. In order to enable an unskilled maintenance worker to perform such maintenance work, it has been desired to develop a technique for visualizing the dependency relations between a plurality of devices constituting a production line.

Therefore, Patent Literature 1 proposes an information processing device for visualizing a relation between a control algorithm defined by a control program and an input and output device. Specifically, the information processing device proposed in Patent Literature 1 identifies where the input and output device each of signal input and output variables described in the control program inputs and outputs a signal, and generates a directed graph showing the dependency relation between variables based on the identified result thereof. According to the invention disclosed in Patent Literature 1, the dependency relations of the input and output devices constituting the production line can be understood from the generated directed graph.

CITATION LIST

Patent Literature

[Patent Literature 1]
Japanese Patent Laid-Open No. 2013-225251

SUMMARY OF INVENTION

Technical Problem

The inventors of the present invention have found that conventional techniques such as Patent Literature 1 in which the dependency relation of each of the devices constituting a production line is derived from a control program have the following problems. A control program usually uses one or more functions (function blocks) to define various instructions. A function is a group of instructions for executing predetermined calculation processing based on an argument provided to an input parameter and outputting the calculation result thereof to an output parameter. Among such functions, there are two types of functions including a standard function and a user-defined function.

Among them, the contents of a user-defined function are described by a user in a control program. Therefore, it is possible to identify (derive) a dependency relation between an input parameter and an output parameter in a user-defined function by analyzing the control program. On the other hand, a standard function is prepared as a standard in an environment for creating a control program, and the contents thereof are not described in the control program but are described in another file such as a definition file (library). Therefore, even when a control program is analyzed, the dependency relation between an input parameter and an output parameter in a standard function cannot be derived. Therefore, in the conventional technique, when this standard function is used, there is a problem that a dependency relation between an input and an output of a standard function becomes unknown, and a dependency relation between devices (variables) cannot be derived appropriately.

In one aspect, the present invention has been made in view of such circumstances, and an objective thereof is to provide a technique capable of appropriately deriving dependency relations between a plurality of devices constituting a production line from a control program even when the control program includes a standard function.

Solution to Problem

The present invention employs the following configuration to solve the above-described problems.

That is, according to an aspect of the present invention, there is provided an analysis device including a program acquisition part configured to acquire a control program including a plurality of instructions for controlling operations of a plurality of devices included in a production line, the plurality of instructions including a function and a plurality of variables, the function including a standard function prepared as a standard, and each of the plurality of variables including a plurality of device variables corresponding to each of the devices, a program analysis part configured to extract a pattern of a dependency relation of each of the device variables on an input parameter or an output parameter of the function by performing a dependency analysis on the control program, a definition assignment part configured to identify a dependency relation between the input parameter and the output parameter in the standard function included in the function based on function structure information which defines the dependency relation between the input parameter and the output parameter in the standard function, a relation identification part configured to identify the dependency relation between the device variables by recognizing that one device variable having the dependency relation with an input parameter has a dependency relation with another device variable having a dependency relation with an output parameter having the dependency relation with the input parameter of the same function among the functions in the extracted pattern of the dependency relation, and an output part configured to output information on a result in which the dependency relation between the device variables is identified.

The analysis device according to such a configuration extracts the pattern of the dependency relation of each of the device variables on the parameter of the function by the dependency analysis on the control program. When the standard function is included in the control program, the extracted pattern may include the pattern of the dependency relation of the device variable on the standard function. As described above, since the contents of the standard function are not described in the control program, the dependency relation between an input and an output of the standard function cannot be derived by the dependency analysis of the control program.

Therefore, the analysis device according to such a configuration provides a definition of the dependency relation between the input parameter and the output parameter of the standard function, which cannot be derived by the dependency analysis of the control program, by external information such as function structure information. That is, the analysis device according to such a configuration identifies the dependency relation between the input parameter and the output parameter in the standard function based on the function structure information which defines the dependency relation between the input parameter and the output parameter in the standard function. Thus, since the dependency relation between the input and output of the standard function is clarified, it becomes possible to identify the dependency relation between the plurality of device variables with the standard function interposed therebetween. Therefore, according to the configuration, even when the control program includes the standard function, the dependency relation between the plurality of devices constituting the production line can be appropriately derived from the control program.

Further, the control program includes a series of groups of instructions for controlling operations of the plurality of devices included in the production line. The series of groups of instructions include instances of one or more functions and a plurality of variables. The function is configured of a group of instructions for performing defined information processing. For example, the function is configured of a group of instructions which perform predetermined calculation processing based on a provided input parameter and output the calculation result to an output parameter. The "function" may be referred to as a "function block." The input parameter (an input variable) is a parameter for providing an input value (an argument) to the function. The output parameter (an output variable) is a parameter for receiving the calculation result (a return value) of the function. The function may be defined to include one or more input parameters and one or more output parameters. Further, the input parameter and the output parameter may be provided as a common parameter. This common parameter may be referred to as an "input and output parameter."

The function may be defined to include one or more input and output parameters. Including one input and output parameter may be treated the same as including one input parameter and one output parameter. Arrays may be used for the input and output parameters. In the following, the input parameter and the output parameter are also simply referred to as "parameters."

In such a function, there are two types of functions including the user-defined function and the standard function. The user-defined function is a function defined by a user in the control program. The contents of the user-defined function are described in the control program. Therefore, the dependency relation between the input and the output in the user-defined function can be identified by the dependency analysis on the control program. On the other hand, the standard function is a function provided as a standard in a system. The contents of the standard function are provided separately from the control program by a definition file (a library) or the like. Therefore, the dependency relation between the input and the output in the standard function cannot be identified by the dependency analysis on the control program. The control program may include at least one instance of the standard function.

The device variables correspond to the devices (mechanisms) included in the production line and are used in the control program to define some instructions for the corresponding devices. However, the types of variables used in the control program may not be limited to device variables. Variables other than device variables may be used in the control program. Other variables are used, for example, to define some instructions for the production line. The control program may be divided into a plurality of subprograms. In this case, as the type (attribute) of variable, two types including internal variables and external variables can be provided. The internal variables are variables used in one subprogram. The external variables are variables which are commonly used among the plurality of subprograms. The device variable is one kind of the external variables among them.

The production line may be capable of producing any kind of product, and the type thereof may not be particularly limited. The types of devices may not be particularly limited, and may be appropriately selected according to the embodiment. The devices may be, for example, a conveyor, a robot arm, a servomotor, a cylinder, a suction pad, a cutter device, a sealing device, and the like. Further, the devices may be, for example, a composite device such as a molding machine, a printing machine, a mounting machine, a reflow furnace, and a substrate inspection device. Further, the devices may include, for example, a device which executes internal processing such as a device which detects some information by various sensors, a device which acquires data from various sensors, a device which detects some information from the acquired data, and a device which processes acquired data, for example, in addition to the above-described devices with some physical operations. One device may be configured of one or a plurality of devices, or may be configured of a part of a device. One device may be configured of a plurality of devices. Further, when the same device executes a plurality of types of processing, each may be regarded as a different device. For example, when the same device executes first processing and second processing, the device which execute the first processing may be regarded as a first device, and the device which executes the second processing may be regarded as a second device.

In the analysis device according to the aspect, extracting the pattern of the dependency relation by performing the dependency analysis may include generating an abstract syntax tree from the control program by performing a syntax analysis on the control program, generating a control flow graph showing a route, on which each of the instructions depends, from the generated abstract syntax tree, extracting each of the device variables from the abstract syntax tree or the control flow graph, extracting a function from the abstract syntax tree or the control flow graph, and extracting the pattern of the dependency relation of each extracted device variable on an input parameter or an output parameter of the extracted function by tracing the route on which each of instruction depends with reference to the control flow graph. According to such a configuration, since the pattern of the dependency relation of each of the device variables on the parameters of the function can be appropriately extracted, the dependency relation between the plurality of devices constituting the production line can be appropriately derived.

The analysis device according to the aspect may further include a graph generation part configured to generate a directed graph which shows the dependency relation between the identified device variables based on the result in which the dependency relation is identified and includes a plurality of first nodes representing each of the device variables, and an edge representing the dependency relation. Further, the output part may output the generated directed graph as information on the result. According to such a configuration, the derived dependency relation between the plurality of devices can be shown in an easy-to-understand graphical representation using the directed graph.

The nodes represent variables. The edge (a branch) connects two nodes. Connecting by the edge indicates that the devices corresponding to each of the nodes have the dependency relation. At this time, a start point of an arrow of the edge indicates a dependency source, and an end point of the arrow indicates a dependency destination. "There is a dependency relation" means that a result of an operation of the device which is the dependency source is related to an operation of the device which is the dependency destination.

In the analysis device according to the aspect, the directed graph may be generated to further include a block which represents the function and is connected via the edge to the first node representing the device variable having the dependency relation with the input parameter or the output parameter of the represented function. According to such a configuration, the dependency relation between the device variables corresponding to each of the devices in the control program and the dependency relation of each of the device variables on each of the parameters of the function can be shown in association with each other. Therefore, it becomes possible to understand the dependency relation of each of the device variables on the parameter of the function in association with the dependency relation between each of the devices. The block is handled in the same way as the above-described node.

In the analysis device according to the aspect, the plurality of variables may include another variable which is different from each of the device variables and is used between any one of the plurality of device variables and the input parameter or the output parameter of the function. Also, the directed graph may be generated to further include a second node which represents the other variable, is disposed between the first node representing any one of the plurality of device variables and the block representing the function, and is connected to each of the first node and the block via the edge. According to such a configuration, when another variable is interposed between the device variables, the dependency relation with the other variable can be shown in association with the dependency relation between the devices.

In the analysis device according to the aspect, the directed graph may be generated so that the input parameter and the output parameter of the represented function are distinguished, the block is connected via the edge to the first node representing the device variable having the dependency relation, and a name of the corresponding input parameter or output parameter is shown in the vicinity of the edge. According to such a configuration, the dependency relation of each of the device variables on each of the parameters of the function can be shown more clearly in association with the dependency relation between the device variables.

In the analysis device according to the aspect, the plurality of instructions may include the plurality of functions, and the plurality of functions may further include a user-defined function which is different from the standard function and is defined by a user in the control program. Additionally, the directed graph may be generated so that, among the plurality of blocks, a first block representing the standard function of the plurality of functions is shown in a first form, and a second block representing the user-defined function is shown in a second form different from the first form. According to such a configuration, it is possible to show the dependency relation of each of the device variables on each of the parameters of the function after the type of function is distinguished.

In the analysis device according to the aspect, the directed graph may be generated to further includes a plurality of third nodes which is disposed in the bloc and represents each of the input parameter and the output parameter of the represented function, the third nodes each of which is connected via the edge to the first node representing the device variable having the dependency relation with each of the represented input parameter and output parameter and represents each of the input parameter and the output parameter having the dependency relation with each other in the represented function being connected to each other via the edge. According to such a configuration, the dependency relation between the device variables in the control program via the function can be shown by a graph representation including the third node. Therefore, it becomes possible to properly understand the dependency relation between the device variables via the function.

In the analysis device according to the aspect, the plurality of instructions may include the plurality of functions, and the plurality of functions may further include a user-defined function which is different from the standard function and is defined by a user in the control program. Additionally, the directed graph may be generated so that, among the plurality of blocks, a first block representing the standard function of the plurality of functions is shown in a first form, and a second block representing the user-defined function is shown in a second form different from the first form. According to such a configuration, it is possible to show the dependency relation between the device variables in the control program via the function after the type of function is distinguished.

In the analysis device according to the aspect, the plurality of variables may include a local variable which is different from each of the device variables and is used between the input parameter and the output parameter which have the dependency relation with each other inside the user-defined function. Additionally, the directed graph may be generated to further include a fourth node which represents the local variable, is disposed between the third nodes representing each of the input parameter and the output parameter having the dependency relation with each other in the second block representing the user-defined function, and is connected to each of the third nodes via the edge. According to such a configuration, the dependency relation between the device variables in the control program via the user-defined function can be shown in association with an internal structure of the user-defined function.

In the analysis device according to the aspect, the plurality of functions may include a standard function used between the input parameter and the output parameter having the dependency relation with each other inside the user-defined function. Additionally, the directed graph may be generated so that the first block representing the standard function used inside the user-defined function is disposed between the third nodes representing each of the input parameter and the output parameter having the dependency relation with each other in the second block representing the user-defined function, and is connected to each of the third nodes via the edge. According to such a configuration, the dependency relation between the device variables in the control program via the user-defined function can be shown in association with the internal structure of the user-defined function.

In the analysis device according to the aspect, the plurality of functions may further include another user-defined function used between the input parameter and the output parameter having the dependency relation with each other inside the user-defined function. Additionally, the directed graph may be generated so that the second block representing the other user-defined function used inside the user-defined function is disposed between the third nodes representing each of the input parameter and the output parameter having the dependency relation with each other in the second block representing the user-defined function, and is connected to each of the third nodes via the edge. According to such a configuration, the dependency relation between the device variables in the control program via the user-defined function can be shown in association with the internal structure of the user-defined function.

In the analysis device according to the aspect, the control program may be divided into a plurality of subprograms. Additionally, the directed graph may be generated so that a plurality of regions corresponding to each of the subprograms is included, and each of the first nodes is disposed in the region of the subprogram which utilizes the represented device variable among the plurality of regions. According to such a configuration, when division programming is performed, the location of the device variable corresponding to each of the devices in the control program and the dependency relation between the device variables can be shown in association with each other. The number of subprograms may not be particularly limited and may be appropriately determined according to the embodiment.

In the analysis device according to the aspect, at least one of the plurality of subprograms may be divided into sections. Additionally, the directed graph may be generated so that the first nodes which include sub-regions corresponding to the sections in the region of the subprogram divided into the sections and represent the device variables used in the sections are disposed in the sub-regions corresponding to the sections. According to such a configuration, the location of the device variable corresponding to each of the devices in the control program can be more clearly shown in association with the dependency relation between the device variables. The number of sections may not be particularly limited and may be appropriately determined according to the embodiment.

As another aspect of the analysis device according to each of the above-described embodiments, one aspect of the present invention may be an information processing method or a program which realizes each of the above-described configurations, or a storage medium that stores the program and can be read by a computer or the like. Here, the storage medium which can be read by a computer or the like is a medium which stores information such as a program by an electrical, magnetic, optical, mechanical, or chemical action.

For example, according to an aspect, there is provided an analysis method in which the following steps are performed by a computer, the steps including a step of acquiring a control program including a plurality of instructions for controlling operations of a plurality of devices included in a production line, the plurality of instructions including a function and a plurality of variables, the function including a standard function prepared as a standard, and each of the plurality of variables including a plurality of device variables corresponding to each of the devices, a step of extracting a pattern of a dependency relation of each of the device variables on an input parameter or an output parameter of the function by performing a dependency analysis on the control program, a step of identifying a dependency relation between the input parameter and the output parameter in the standard function included in the function based on function structure information which defines the dependency relation between the input parameter and the output parameter in the standard function, a step of identifying the dependency relation between the device variables by recognizing that one device variable having the dependency relation with an input parameter has a dependency relation with another device variable having a dependency relation with an output parameter having the dependency relation with the input parameter of the same function among the functions in the extracted pattern of the dependency relation, and a step of outputting information on a result in which the dependency relation between the device variables is identified.

Further, for example, according to an aspect, there is provided an analysis program in which the following steps are performed by a computer, the steps including a step of acquiring a control program including a plurality of instructions for controlling operations of a plurality of devices included in a production line, the plurality of instructions including a function and a plurality of variables, the function including a standard function prepared as a standard, and each of the plurality of variables including a plurality of device variables corresponding to each of the devices, a step of extracting a pattern of a dependency relation of each of the device variables on an input parameter or an output parameter of the function by performing a dependency analysis on the control program, a step of identifying a dependency relation between the input parameter and the output parameter in the standard function included in the function based on function structure information which defines the dependency relation between the input parameter and the output parameter in the standard function, a step of identifying the dependency relation between the device variables by recognizing that one device variable having the dependency relation with an input parameter has a dependency relation with another device variable having a dependency relation with an output parameter having the dependency relation with the input parameter of the same function among the functions in the extracted pattern of the dependency relation, and a step of outputting information on a result in which the dependency relation between the device variables is identified.

Advantageous Effects of Invention

According to the present invention, even when a control program includes a standard function, it is possible to appropriately derive dependency relations between a plurality of devices constituting a production line from the control program.

BRIEF DESCRIPTION OF DRAWINGS

FIG. 8 shows an example of an abstract syntax tree obtained from the control program of FIG. 7.

FIG. 12 shows an example of data showing a pattern of a dependency relation obtained by the dependency analysis for the control program of FIG. 7.

FIG. 14A schematically illustrates an example of function structure information according to the embodiment.

FIG. 14B illustrates an example of intermediate data obtained in a process of identifying the dependency relation between the device variables in the analysis device according to the embodiment.

DESCRIPTION OF EMBODIMENTS

Hereinafter, an embodiment according to one aspect of the present invention (hereinafter, also referred to as "the present embodiment") will be described with reference to the drawings. However, the embodiment described below is merely an example of the present invention in all respects. Needless to say, various improvements and modifications can be made without departing from the scope of the present invention. That is, in implementing the present invention, a specific configuration according to the embodiment may be appropriately adopted. Data appearing in the present embodiment is described in natural language, but more specifically, it may be identified in pseudo language, commands, parameters, machine language, or the like which can be recognized by a computer.

§ 1 Application Example

Figure 1:
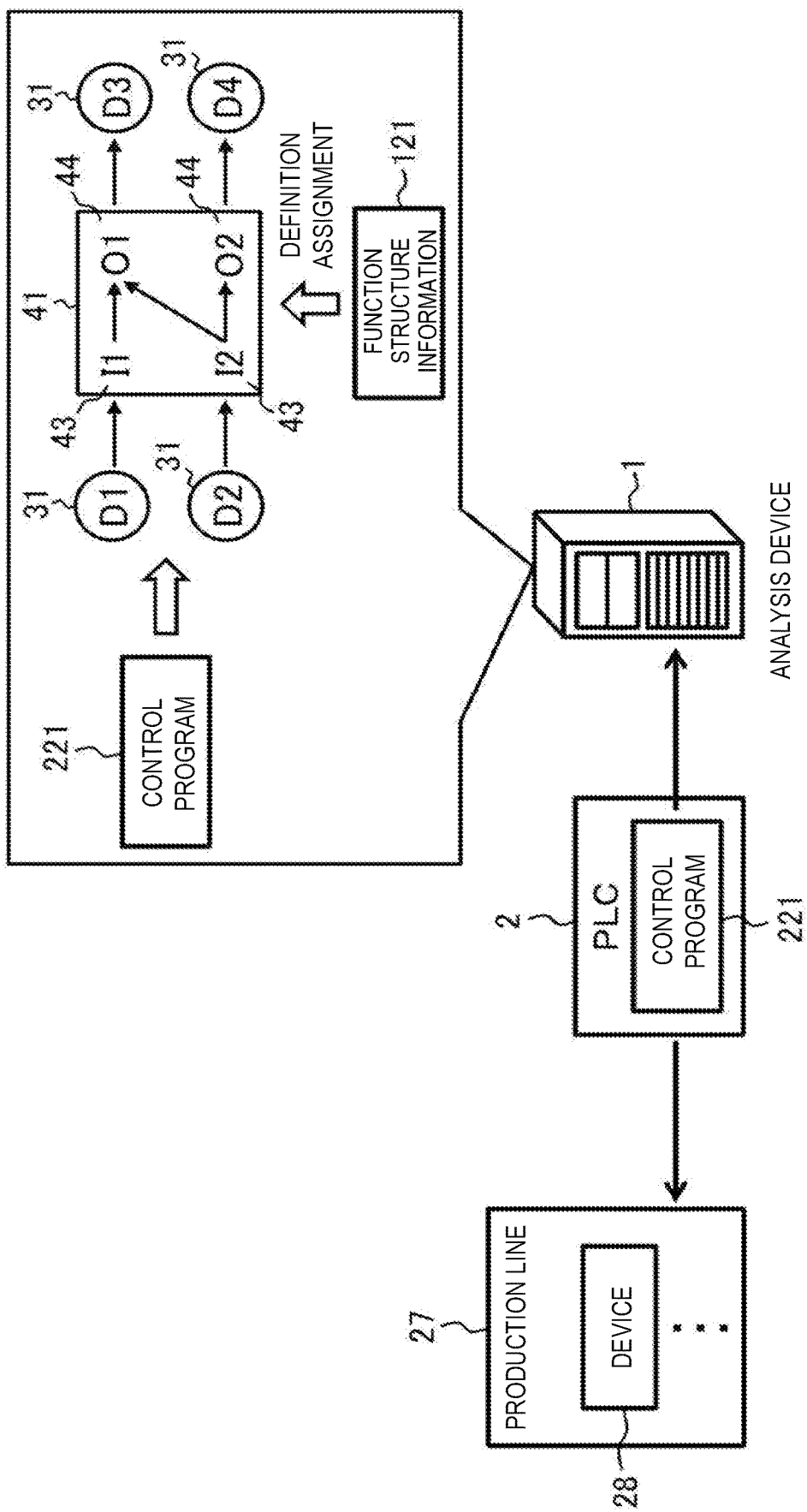
FIG. 1 schematically illustrates an example of a situation in which the present invention is applied.

First, an example of a situation in which the present invention is applied will be described with reference to FIG. 1. FIG. 1 schematically illustrates an example of a situation in which an analysis device 1 according to the present embodiment is applied. The analysis device 1 according to the present embodiment is an example of a "graph display device." In the example of FIG. 1, it is assumed that there is a programmable logic controller (PLC) 2 which is a computer different from the analysis device 1, and the PLC 2 controls operations of a plurality of devices 28 constituting a production line 27 based on a control program 221.

The analysis device 1 according to the present embodiment is a computer configured to derive a dependency relation between the plurality of devices 28 included in the production line 27 from the control program 221. Specifically, the analysis device 1 acquires the control program 221 including a plurality of instructions (a series of groups of instructions) for controlling the operations of the plurality of devices 28 included in the production line 27. The plurality of instructions defined in the control program 221 includes one or more instances of a function and a plurality of variables.

A function is configured of a group of instructions for executing defined information processing. For example, a function is configured of a group of instructions which execute predetermined calculation processing based on a provided input parameter and output the calculation results thereof to an output parameter. A "function" may be referred to as a "function block." The input parameter (an input variable) is a parameter for providing an input value (an argument) to the function. The output parameter (an output variable) is a parameter for receiving the calculation results (return values) of the function.

The function may be defined to include one or more input parameters and one or more output parameters. Further, the input parameter and the output parameter may be provided as common parameters. This common parameter may be referred to as an "input and output parameter." The function may be defined to include one or more input and output parameters. Arrays may be used for the input and output parameters. Including one input and output parameter may be treated as the same as including one input parameter and one output parameter.

There are two types of functions including a user-defined function and a standard function. The user-defined function is a function defined by a user in the control program. The contents of the user-defined function are described in the control program. On the other hand, the standard function is a function provided as a standard in a system. The contents of the standard function are provided separately from the control program in a definition file (a library) or the like. The instances of one or more functions in the control program 221 include instances of one or more standard functions 41.

Further, the plurality of variables includes a plurality of device variables 31 corresponding to each of the devices 28. The device variables 31 correspond to the devices 28 included in the production line 27 and are used in the control program 221 to determine a certain instruction for a corresponding device 28. However, the types of variables used in the control program 221 are not limited to the device variables 31. Variables other than the device variables 31 may be used in the control program 221. The other variables are used, for example, to define certain instructions for the production line 27. The control program 221 may be divided into a plurality of subprograms. In this case, as the types (attributes) of variables, two types including internal variables and external variables can be provided. The internal variables are variables used within one subprogram. The external variables are variables which are commonly used in the plurality of subprograms. The device variables 31 are one kind of external variables among them.

The production line 27 may be capable of producing any kind of product, and the type thereof may not be particularly limited. The types of devices 28 may not be particularly limited, and may be appropriately selected according to the embodiment. The devices 28 may be, for example, a conveyor, a robot arm, a servomotor, a cylinder, a suction pad, a cutter device, a sealing device, and the like. Further, the devices 28 may be, for example, a composite device such as a molding machine, a printing machine, a mounting machine, a reflow furnace, and a substrate inspection device. Further, the devices 28 may include, for example, a device which executes internal processing such as a device which detects some information through various sensors, a device which acquires data from various sensors, a device which detects some information from the acquired data, and a device which processes acquired data, for example, in addition to the above-described devices with some physical operations. One device 28 may be configured of one or a plurality of devices, or may be configured of a part of a device. One device may be configured of a plurality of devices 28. Further, when the same device executes a plurality of types of processing, it may be regarded as a different device 28 each time. For example, when the same device executes first processing and second processing, the device may be regarded as a first device when it executes the first processing, and the device may be regarded as a second device when it executes the second processing.

The analysis device 1 according to the present embodiment extracts a pattern of a dependency relation of each of the device variables 31 with respect to the input parameter or the output parameter of the instance of the function by executing a dependency analysis on the acquired control program 221. The extracted pattern includes a pattern of the dependency relation of each of the device variables 31 with respect to the input parameter 43 or the output parameter 44 of the instance of the standard function 41. However, since the contents (an internal structure) of the standard function 41 are not described in the control program 221, the dependency relation between the input parameter 43 and the output parameter 44 in the instance of the standard function 41 cannot be derived through the dependency analysis on the control program 221.

Therefore, the analysis device 1 according to the present embodiment provides a definition of the dependency relation between the input parameter 43 and the output parameter 44 of the standard function 41, which cannot be derived through the dependency analysis on the control program 221, from external information. That is, the analysis device 1 acquires function structure information 121 which defines the dependency relation between the input parameter and the output parameter in the standard function. Then, the analysis device 1 identifies the dependency relation between the input parameter 43 and the output parameter 44 in the instance of the standard function 41 included in the control program 221 based on the function structure information 121.

In the pattern of the extracted dependency, it is assumed that one of the plurality of device variables 31 has a dependency relation with an input parameter of an instance of a certain function among one or more functions included in the control program 221. It is also assumed that another device variable has a dependency relation with an output parameter of the same function which has the dependency relation with the input parameter. In this case, the analysis device 1 according to the present embodiment recognizes that the one device variable has a dependency relation with the other device variable.

That is, it is assumed that a first device variable (one device variable) among the plurality of device variables 31 has a dependency relation with an input parameter of a certain function among one or more functions included in the control program 221, and a second device variable (another device variable) has a dependency relation with an output parameter of another function. In this case, when the input parameter and the output parameter are parameters of the same function (in other words, the first device variable and the second device variable have a dependency relation with a common function), and there is a dependency relation between the input parameter and the output parameter, the analysis device 1 recognizes that there is a dependency relation between the first device variable and the second device variable.

When the control program 221 includes an instance of the user-defined function, the dependency relation between the input parameter and the output parameter in the instance of the user-defined function is identified through the dependency analysis on the control program 221. On the other hand, the dependency relation between the input parameter 43 and the output parameter 44 in the instance of the standard function 41 is provided by the function structure information 121. Therefore, the analysis device 1 can identify the dependency relation between the device variables 31 through the above-described recognition processing. The analysis device 1 outputs information on the results of identifying the dependency relation between the device variables 31.

In the example of FIG. 1, a device variable "D1" has a dependency relation with an input parameter "I1" of the instance of the standard function 41. A device variable "D2" has a dependency relation with an input parameter I2" of the instance of the standard function 41. A device variable "D3" has a dependency relation with an output parameter "O1" of the instance of the standard function 41. A device variable "D4" has a dependency with an output parameter "O2" of the instance of the standard function 41. The pattern of the dependency relations is extracted through the dependency analysis. Further, a definition that there is a dependency relation between the input parameter "I1" and the output parameter "O1" and there is a dependency relation between the input parameter I2" and each of the output parameters "O1" and "O2" is provided by the function structure information 121.

Therefore, in the example of FIG. 1, the analysis device 1 can identify the dependency relation between the device variables 31 such that the device variable "D1" has a dependency relation with the device variable "D3" and the device variable "D2" has a dependency relation with each of the device variables "D3" and "D4." FIG. 1 is only an example of the dependency relation between the device variables 31. The number of device variables 31, the number of other variables, the number of instances of the function, the number of parameters in the function, and the presence or absence of the dependency relation may be set as appropriate.

As described above, in the present embodiment, since the dependency relation between the input parameter 43 and the output parameter 44 of the standard function 41 is clarified by the function structure information 121, the dependency relations between a plurality of device variables 31 with the standard function 41 interposed therebetween can be identified. Therefore, according to the present embodiment, as illustrated in FIG. 1, even when the control program 221 includes the standard function 41, the dependency relations between a plurality of devices 28 constituting the production line 27 can be appropriately derived from the control program 221.

§ 2 Configuration Example
[Hardware Configuration]
<Analysis Device>

Figure 2:
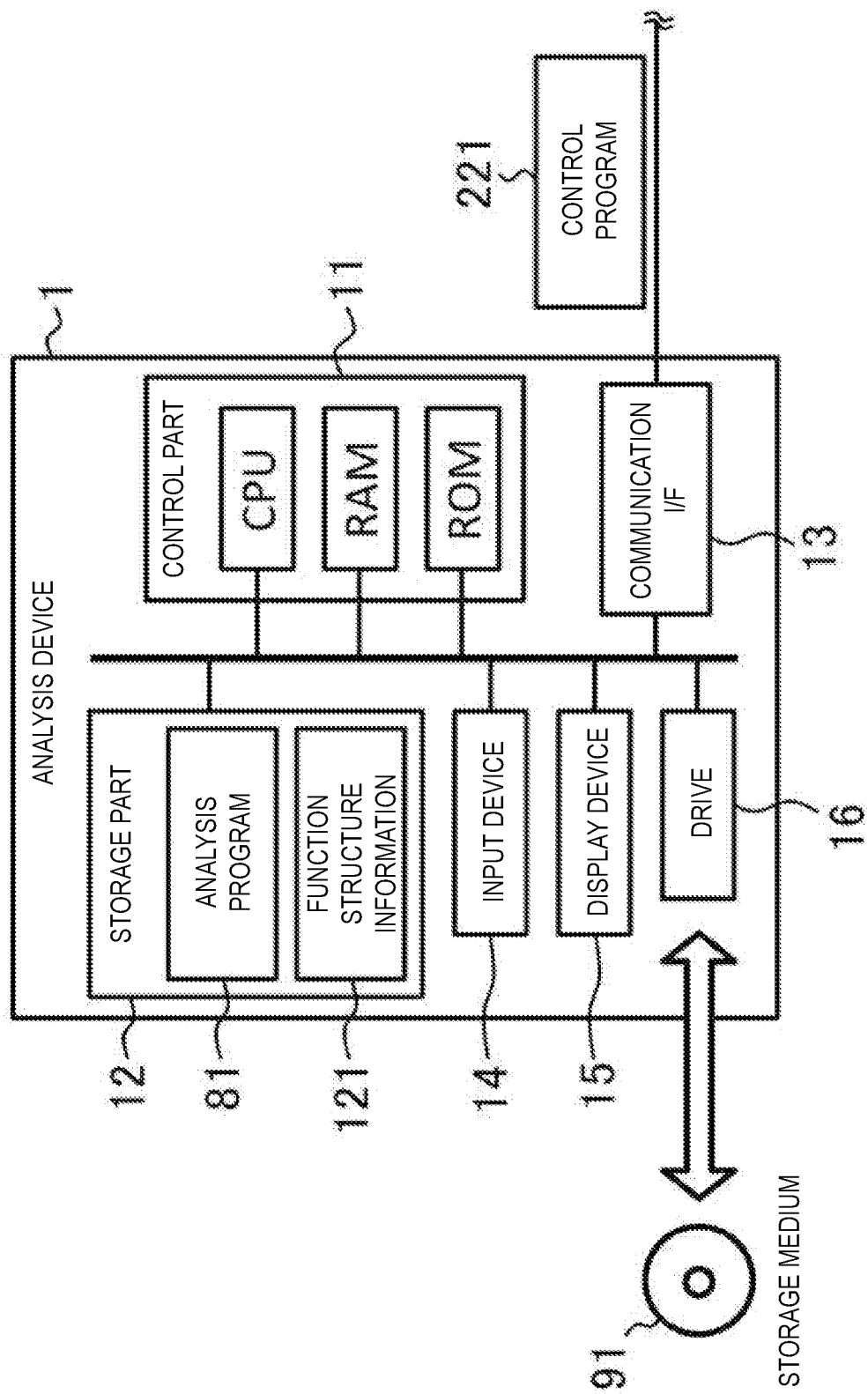
FIG. 2 schematically illustrates an example of a hardware configuration of an analysis device according to an embodiment.

Next, an example of a hardware configuration of the analysis device 1 according to the present embodiment will be described with reference to FIG. 2. FIG. 2 schematically illustrates an example of the hardware configuration of the analysis device 1 according to the present embodiment.

As shown in FIG. 2, the analysis device 1 according to the present embodiment is a computer to which a control part 11, a storage part 12, a communication interface 13, an input device 14, a display device 15, and a drive 16 are electrically connected. In FIG. 2, the communication interface is described as a "communication I/F."

The control part 11 includes a central processing part (CPU), a random access memory (RAM), a read only memory (ROM), and the like which are hardware processors, and is configured to execute information processing based on a program and a variety of data. The storage part 12 is an example of a memory, and is configured of, for example, an auxiliary storage device such as a hard disk drive or a solid state drive. In the present embodiment, the storage part 12 stores a variety of information such as an analysis program 81 and the function structure information 121.

The analysis program 81 is a program for causing the analysis device 1 to execute information processing (FIGS. 5A to 6, 10A to 11B, 13A, and 13B which will be described later) regarding a derivation of the dependency relations between the plurality of devices 28. The analysis program 81 includes a series of groups of instructions for the information processing. The function structure information 121 shows the definition of the dependency relation between the input parameter and the output parameter in the standard function. Details will be described later.

The communication interface 13 is, for example, a wired local area network (LAN) module, a wireless LAN module, or the like, and is an interface for performing wired or wireless communication via a network. The analysis device 1 can perform data communication with the PLC 2 via the network through the communication interface 13 and can acquire the control program 221. The type of network may be appropriately selected from, for example, the Internet, a wireless communication network, a mobile communication network, a telephone network, a dedicated network, and the like.

The input device 14 is, for example, a device for performing an input such as a mouse, and a keyboard. The display device 15 is an example of an output device, and is for example, a display. An operator can operate the analysis device 1 via the input device 14 and the display device 15.

The display device 15 may be a touch panel display. In this case, the input device 14 may be omitted.

The drive 16 is, for example, a CD drive, a DVD drive, or the like, and is a drive device for reading a program stored in a storage medium 91. The type of drive 16 may be appropriately selected according to the type of storage medium 91. At least one of the analysis program 81, the function structure information 121, and the control program 221 may be stored in the storage medium 91.

The storage medium 91 is a medium in which information of a program or the like is stored by an electrical, magnetic, optical, mechanical, or chemical action so that a computer or other device, a machine, or the like can read the recorded information of the program or the like. The analysis device 1 may acquire at least one of the analysis program 81, the function structure information 121, and the control program 221 from the storage medium 91.

Here, in FIG. 2, a disc type storage medium such as a CD or a DVD is illustrated as an example of the storage medium 91. However, the type of storage medium 91 is not limited to the disc type, and may not be the disc type. Examples of storage media other than the disc type include a semiconductor memory such as a flash memory.

Regarding the specific hardware configuration of the analysis device 1, parts can be omitted, replaced, and added as appropriate according to the embodiment. For example, the control part 11 may include a plurality of hardware processors. The hardware processors may be configured of a microprocessor, a field-programmable gate array (FPGA), a digital signal processor (DSP), or the like. The storage part 12 may be configured of a RAM and a ROM included in the control part 11. At least one of the communication interface 13, the input device 14, the display device 15, and the drive 16 may be omitted. The analysis device 1 may further include an output device other than the display device 15, such as a speaker. The analysis device 1 may be configured of a plurality of computers. In this case, hardware configurations of the computers may or may not be the same. Further, the analysis device 1 may be a general-purpose information processing device such as a desktop personal computer (PC) or a tablet PC, a general-purpose server device, or the like, in addition to an information processing device designed exclusively for a provided service.

<PLC>

Figure 3:
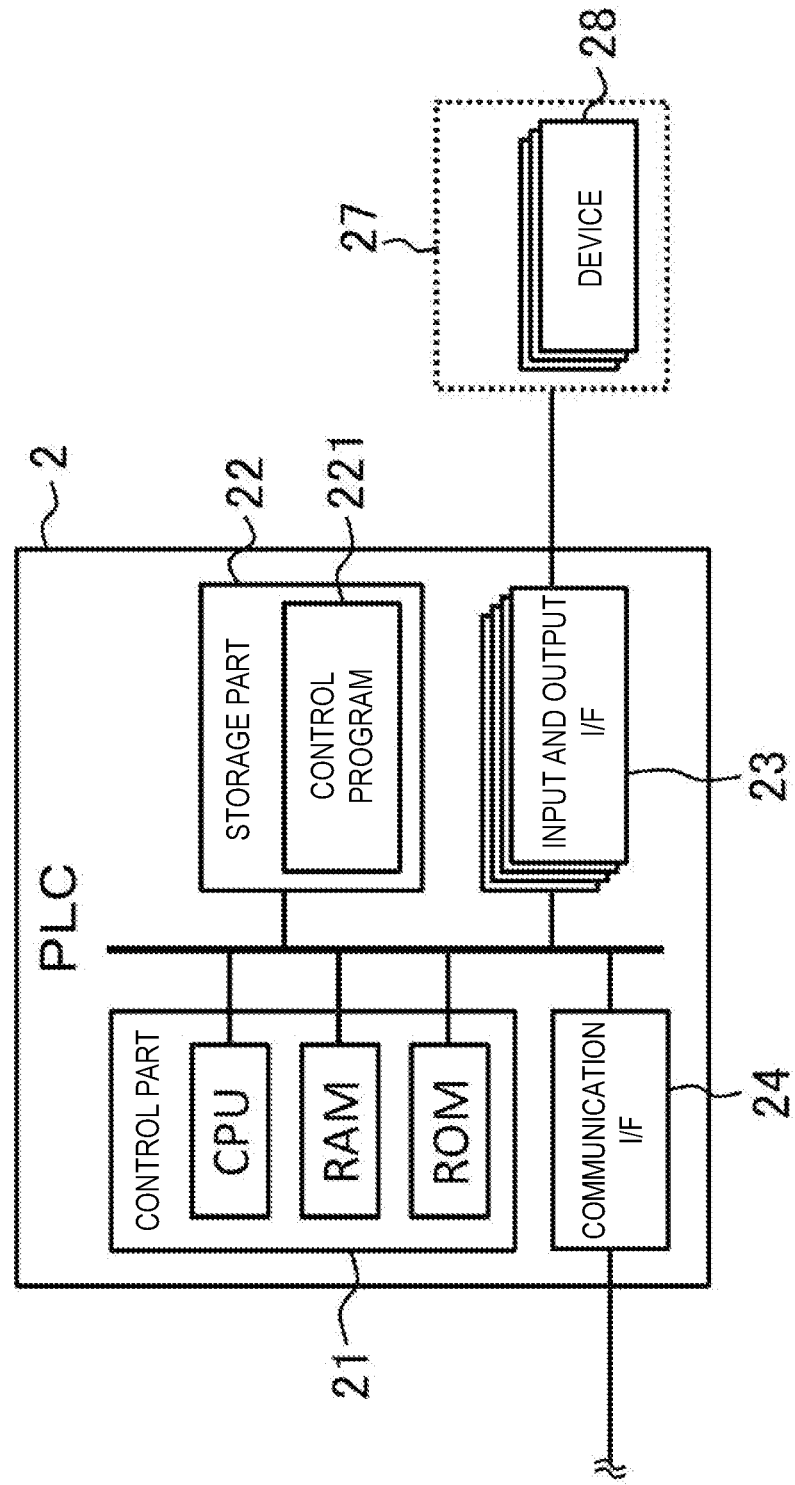
FIG. 3 schematically illustrates an example of a hardware configuration of a control device (PLC) according to the embodiment.

Next, an example of a hardware configuration of the PLC 2 which controls an operation of the production line 27 will be described with reference to FIG. 3. FIG. 3 schematically illustrates an example of the hardware configuration of the PLC 2 according to the present embodiment.

As shown in FIG. 3, the PLC 2 is a computer to which a control part 21, a storage part 22, an input and output interface 23, and a communication interface 24 are electrically connected. Thus, the PLC 2 is configured to control the operation of each of the devices 28 on the production line 27. In FIG. 3, the input and output interface and the communication interface are described as an "input and output I/F" and a "communication I/F," respectively.

The control part 21 includes a CPU, a RAM, a ROM, and the like, and is configured to execute the information processing based on a program and a variety of data. The storage part 22 is configured of, for example, a RAM, a ROM, or the like, and stores a variety of information such as the control program 221. The control program 221 is a program for controlling the operation of the production line 27. The control program 221 includes a plurality of instructions (a series of groups of instructions) for controlling the operation of the plurality of devices 28 included in the production line 27.

The input and output interface 23 is an interface for connecting to an external device, and is appropriately configured according to the external device to be connected. In the present embodiment, the PLC 2 is connected to the production line 27 via the input and output interface 23. The number of input and output interfaces 23 is not particularly limited and may be appropriately set according to the embodiment.

The communication interface 24 is, for example, a wired LAN module, a wireless LAN module, or the like, and is an interface for performing wired or wireless communication. The PLC 2 can perform data communication with the analysis device 1 through the communication interface 24.

Regarding the specific hardware configuration of the PLC 2, parts can be omitted, replaced, and added as appropriate according to the embodiment. For example, the control part 21 may include a plurality of processors. The storage part 22 may be configured of a RAM and a ROM included in the control part 21. The storage part 22 may be configured by an auxiliary storage device such as a hard disk drive or a solid state drive. Further, the PLC 2 may be replaced with a general-purpose information processing device such as a desktop PC or a tablet PC, in addition to an information processing device designed exclusively for a provided service, according to a target to be controlled.

[Software Configuration]

Figure 4:
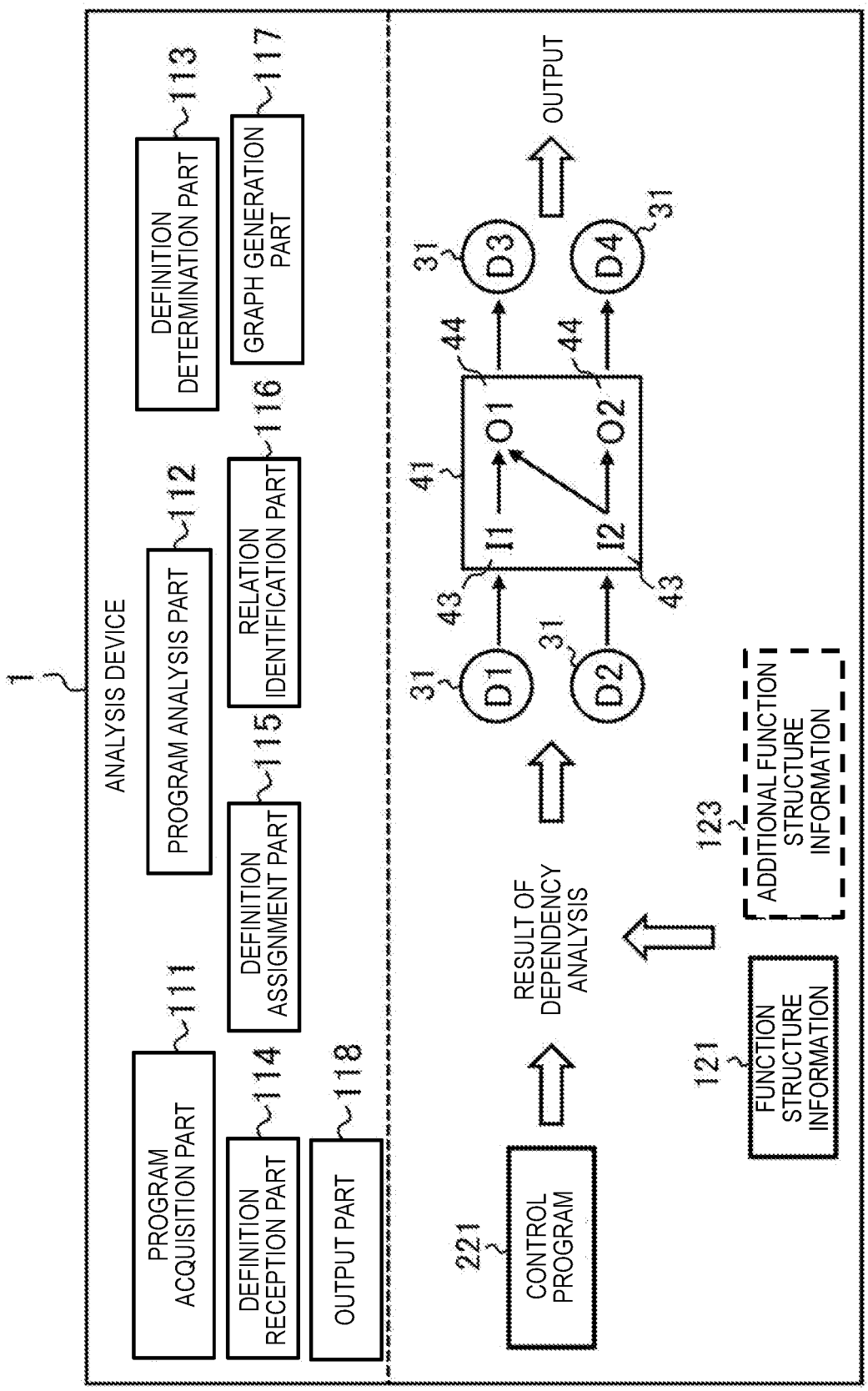
FIG. 4 schematically illustrates an example of a software configuration of the analysis device according to the embodiment.

Next, an example of a software configuration of the analysis device 1 according to the present embodiment will be described with reference to FIG. 4. FIG. 4 schematically illustrates an example of the software configuration of the analysis device 1 according to the present embodiment.

The control part 11 of the analysis device 1 decompresses the analysis program 81 stored in the storage part 12 into the RAM. Then, the control part 11 analyzes and executes the analysis program 81 decompressed in the RAM with the CPU and controls each of the parts. Thus, as shown in FIG. 4, the analysis device 1 according to the present embodiment is operated as a computer including a program acquisition part 111, a program analysis part 112, a definition determination part 113, a definition reception part 114, a definition assignment part 115, a relation identification part 116, a graph generation part 117, and an output part 118 as software modules. That is, in the present embodiment, each of the software modules of the analysis device 1 is realized by the control part 11 (CPU).

The program acquisition part 111 acquires the control program 221 including a plurality of instructions for controlling the operation of the plurality of devices 28 included in the production line 27. The plurality of instructions includes instances of one or more functions and a plurality of variables. The one or more functions include one or more standard functions 41 provided as a standard. The plurality of variables includes a plurality of device variables 31 corresponding to each of the devices 28.

The program analysis part 112 extracts the pattern of the dependency relation of each of the device variables 31 with respect to the input parameter or the output parameter of the instance of the function by executing the dependency analysis on the control program 221. The definition determination part 113 determines whether or not the control program 221 includes instances of one or more undefined standard functions in which the dependency relation is not defined in the function structure information 121 with reference to the function structure information 121 which defines the dependency relation between the input parameter and the output parameter in the standard function. When it is determined that the control program 221 includes the instances of one or more undefined standard functions, the definition reception part 114 receives an input of additional function structure information 123 which defines the dependency relation between the input parameter and the output parameter in the undefined standard function.

The definition assignment part 115 identifies the dependency relation between the input parameter 43 and the output parameter 44 in the instances of one or more standard functions 41 included in the one or more functions based on the function structure information 121. Further, when it is determined that the control program 221 includes the instances of one or more undefined standard functions, the definition assignment part 115 identifies the dependency relation between the input parameter and the output parameter in the instances of one or more undefined standard functions of the standard functions 41 included in the control program 221 based on the input additional function structure information 123.

In the extracted pattern of the dependency relation, the relation identification part 116 identifies the dependency relation between the device variables 31 by recognizing that one device variable which has a dependency relation with the input parameter of the same function of one or more functions has a dependency relation with another device variable which has a dependency relation with the output parameter which has a dependency relation with the input parameter. The graph generation part 117 generates a directed graph which shows the dependency relation between the identified device variables 31 based on the results of identifying the dependency relation and includes a node representing each of the device variables 31 and one or more edges representing a dependency relation. The output part 118 outputs information on the results of identifying the dependency relation between the device variables 31. In the present embodiment, the output part 118 outputs the generated directed graph as the information on the results.

Each of the software modules of the analysis device 1 will be described in detail in an operation example which will be described later. In the present embodiment, an example in which each of the software modules of the analysis device 1 is realized by a general-purpose CPU is described. However, some or all of the above-described software modules may be realized by one or a plurality of dedicated hardware processors. Further, regarding the software configuration of the analysis device 1, the software modules may be omitted, replaced, or added as appropriate according to the embodiment.

§ 3 Operation Example

Figure 5A:
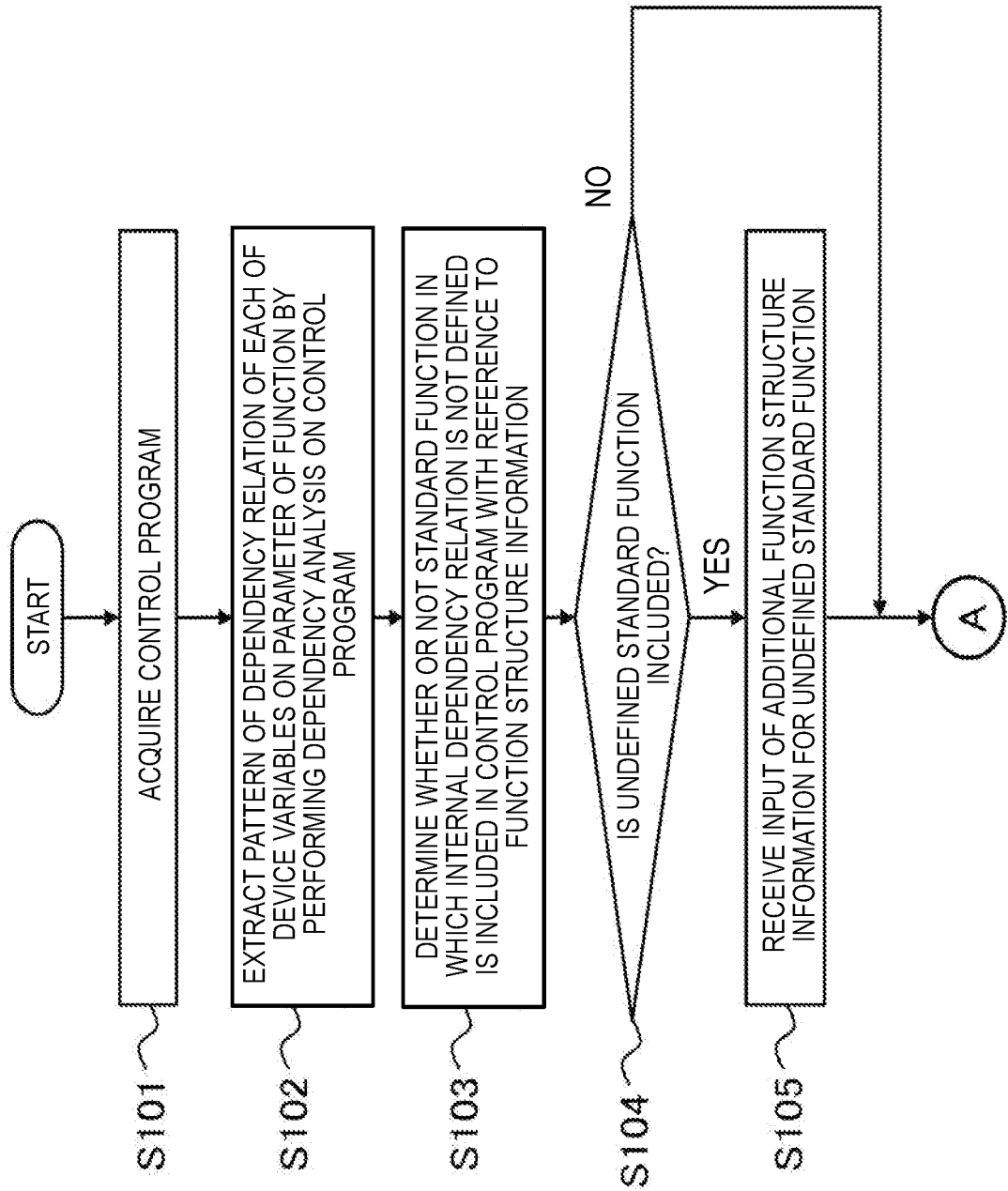
FIG. 5A illustrates an example of a processing procedure of the analysis device according to the embodiment.
Figure 5B:
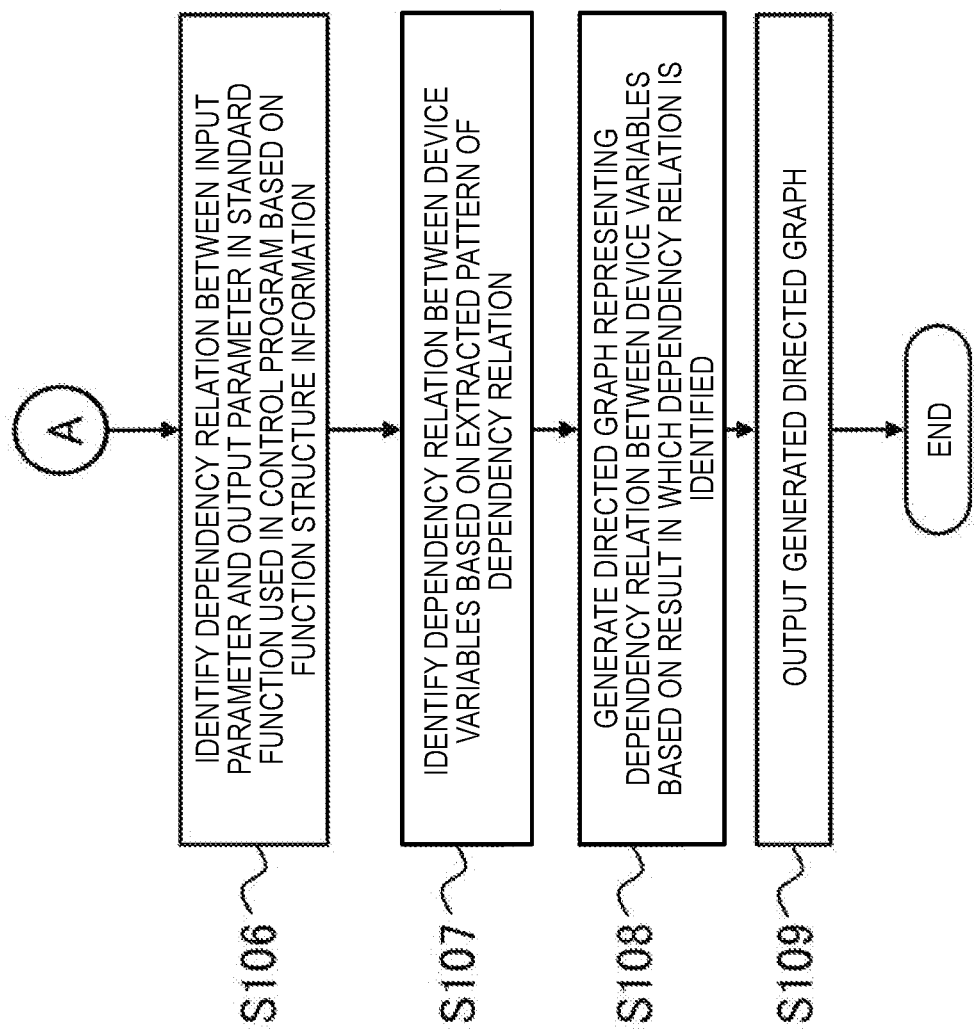
FIG. 5B illustrates an example of the processing procedure of the analysis device according to the embodiment.

Next, an operation example of the analysis device 1 will be described with reference to FIGS. 5A and 5B. FIGS. 5A and 5B illustrate an example of a processing procedure of the analysis device 1 according to the present embodiment. The processing procedure of the analysis device 1 described below is an example of an "analysis method" of the present invention. However, the processing procedure described below is just an example, and each processing may be changed as much as possible. Further, regarding the processing procedure described below, steps can be omitted, replaced, and added as appropriate according to the embodiment.

[Step S101]

In Step S101, the control part 11 operates as the program acquisition part 111 to acquire the control program 221.

In the present embodiment, the control part 11 acquires the control program 221 from the PLC 2 via the network using the communication interface 13. However, a location and an acquisition method of the control program 221 may not be limited to such an example. When the control program 221 is present in the storage part 12 or the storage medium 91, the control part 11 may acquire the control program 221 from the storage part 12 or the storage medium 91. Further, when the control program 221 is present in another information processing device, the control part 11 may acquire the control program 221 from the other information processing device. When the control program 221 is acquired, the control part 11 proceeds to next Step S102.

The control program 221 may be written using at least one of a ladder•diagram language, a function•block•diagram language, a structured•text language, an instruction•list language, a sequential•function•chart language, and a C language so that it can be executed by the PLC 2. In addition to these languages, the control program 221 may be written using, for example, a program language such as Java (registered trademark), Python, C++, Ruby, or Lua. The type of control program 221 may not be particularly limited, and may be appropriately selected according to the embodiment.

[Step S102]

In Step S102, the control part 11 extracts the pattern of the dependency relation of each of the device variable 31 on the input parameter or the output parameter of the instance of the function by operating as the program analysis part 112 and executing the dependency analysis on the acquired control program 221.

<Dependency Analysis>

Figure 6:
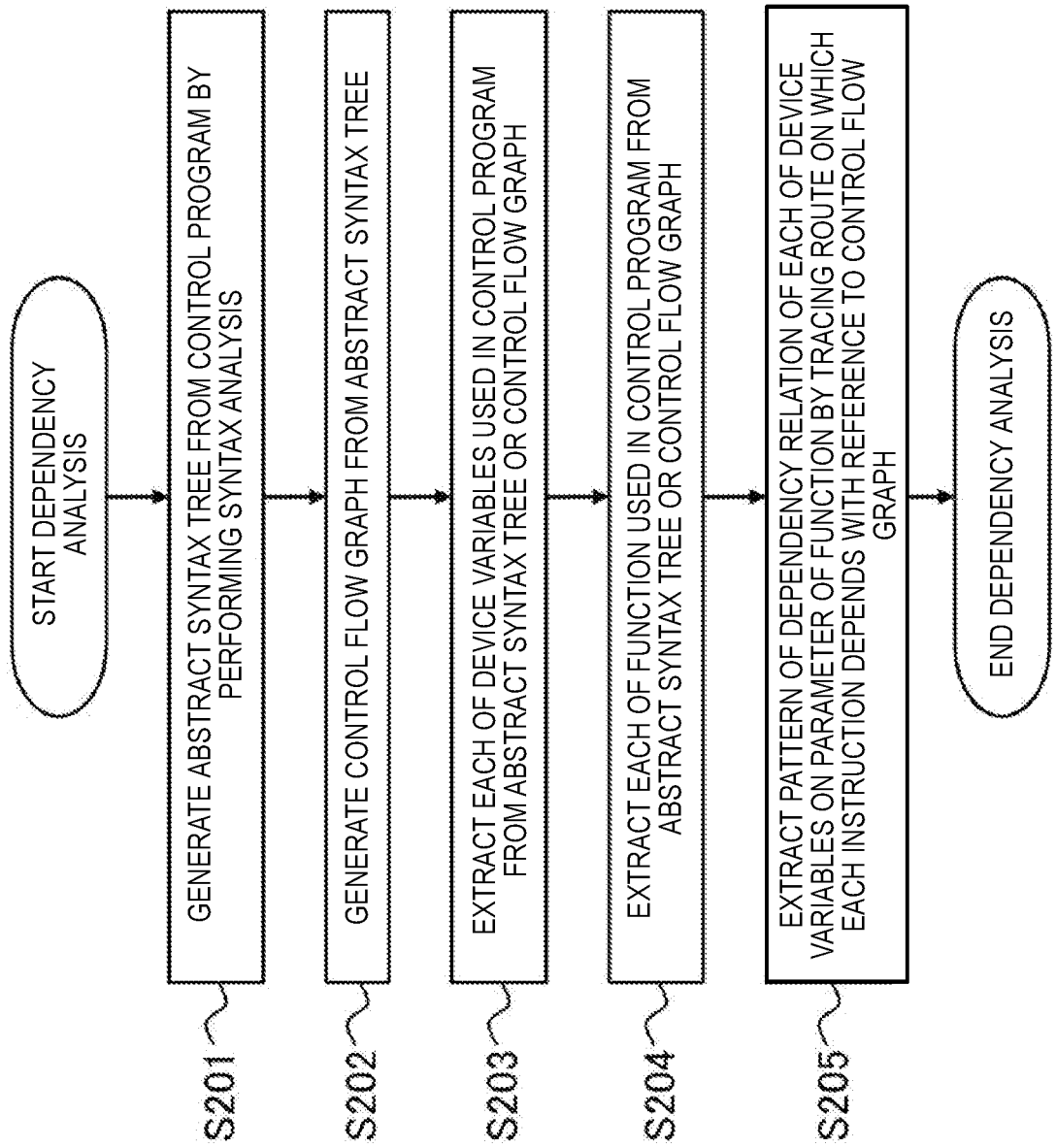
FIG. 6 illustrates an example of the processing procedure of a dependency analysis by the analysis device according to the embodiment.

Here, an example of processing of Step S102 will be described in detail with reference to FIG. 6. FIG. 6 illustrates an example of the processing procedure of the dependency analysis by the analysis device 1 according to the present embodiment. The processing of Step S102 according to the present embodiment includes the following processing of Steps S201 to S205. However, the processing procedure described below is just an example, and each processing may be changed as much as possible. Further, regarding the processing procedure described below, steps can be omitted, replaced, and added as appropriate according to the embodiment.

(Step S201)

In Step S201, the control part 11 generates an abstract syntax tree from the control program 221 by executing a syntax analysis on the control program 221. A known syntax analysis method by a top-down syntax analysis or a bottom-up syntax analysis may be used to generate the abstract syntax tree. In addition, a parser which handles character strings according to a specific formal grammar may be used to generate the abstract syntax tree. The syntax analysis method may not be particularly limited, and may be appropriately selected according to the embodiment.

Figure 7:
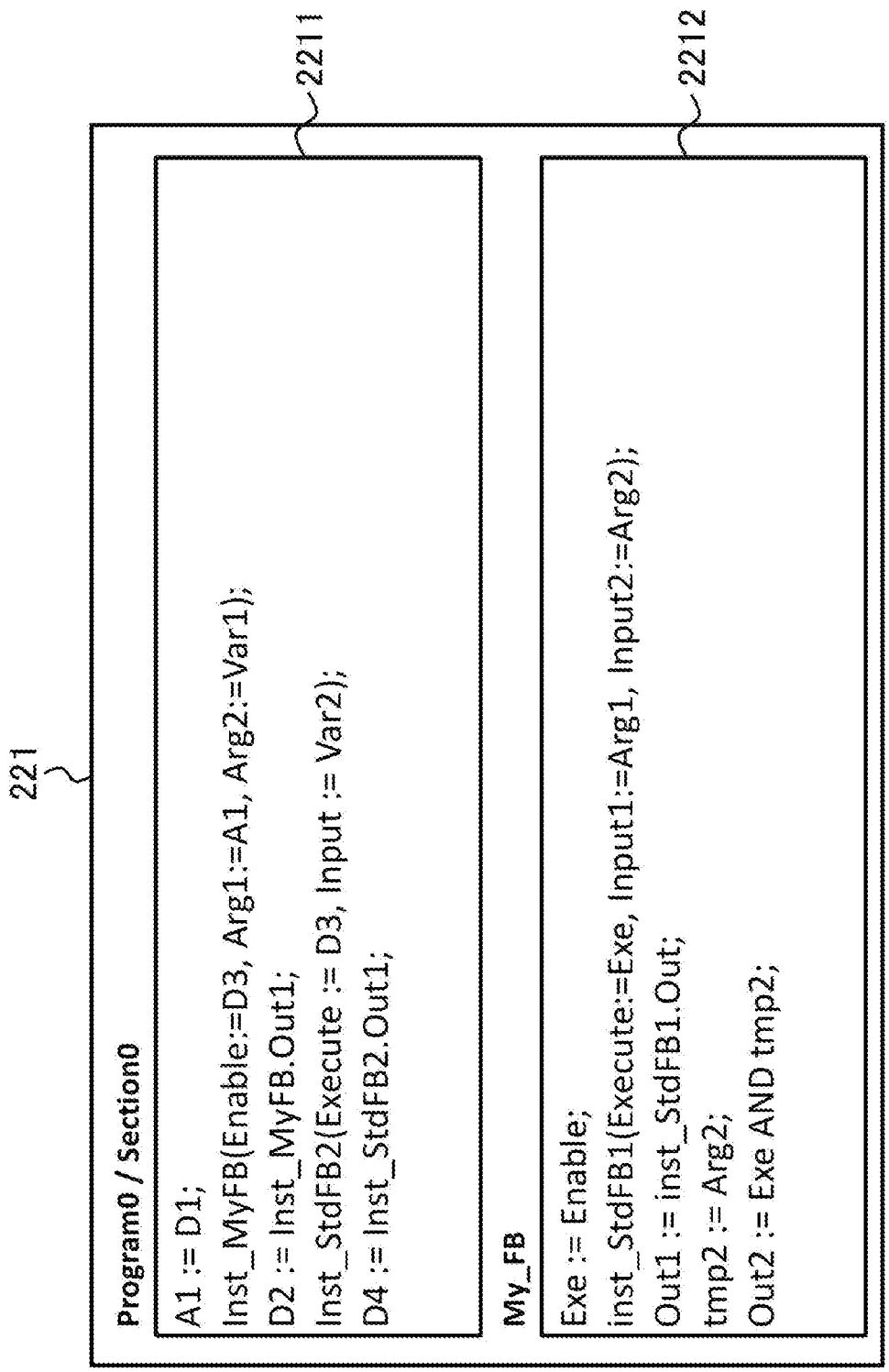
FIG. 7 shows an example of a control program according to the embodiment.

An example of the generated abstract syntax tree will be described with reference to FIGS. 7 and 8. FIG. 7 shows an example of the control program 221 to be acquired. FIG. 8 shows an example of an abstract syntax tree 222 generated from the control program 221 of FIG. 7. In the example of FIG. 7, it is assumed that the control program 221 written in a structured•text (ST) language is acquired. The control program 221 illustrated in FIG. 7 includes four device variables (D1, D2, D3, and D4), an instance (Inst_MyFB) of one user-defined function (My_FB), and instances (Inst_StdFB1 and Inst_StdFB2) of two standard functions (Std_FB1 and Std_FB2). The user-defined function (My_FB) includes three input parameters (Enable, Arg1, and Arg2) and two output parameters (Out1 and Out2). The standard function (Std_FB1) includes three input parameters (Execute, Input1, and Input2) and one output parameter (Out). The standard function (Std_FB2) includes two input parameters (Execute and Input) and two output parameters (Out1 and Out2) (also refer to FIG. 14 which will be described below).

The control program 221 illustrated in FIG. 7 is divided into two subprograms (2211 and 2212). The subprogram 2211 (Program0/Section0) is first called and executed. The contents of the user-defined function (My_FB) are described in the subprogram 2212. The abstract syntax tree 222 shown in FIG. 8 can be obtained by executing the syntax analysis on the control program 221. In the example of FIG. 8, the abstract syntax tree is obtained for each of the subprograms (2211 and 2212). The abstract syntax tree 222 shows variables (including parameters), operators, and relations between nodes (relations between a calculation and an operand, and the like) used in the control program 221.

In FIG. 8, the abstract syntax tree is represented by a nest structure using parentheses. For example, an abstract syntax tree "(=a(±b1))" can be obtained by executing a syntax analysis on "a=b+1." In the abstract syntax tree represented by the nest structure, "=" is a root node. "a" is a leaf node connected to the root node "=," and "+" is an internal node connected to the root node "=." "b" and "1" are leaf nodes connected to the internal node "+." When the generation of the abstract syntax tree is completed, the control part 11 proceeds to next Step S202.

(Step S202)

Returning to FIG. 6, in Step S202, the control part 11 performs a flow analysis using the generated abstract syntax tree. A method of the flow analysis may not be particularly limited, and may be appropriately selected according to the embodiment. A known method may be adopted for the flow analysis. Thus, the control part 11 generates a control flow graph showing a route, on which each of instructions included in the control program 221 depends, from the abstract syntax tree.

Figure 9:
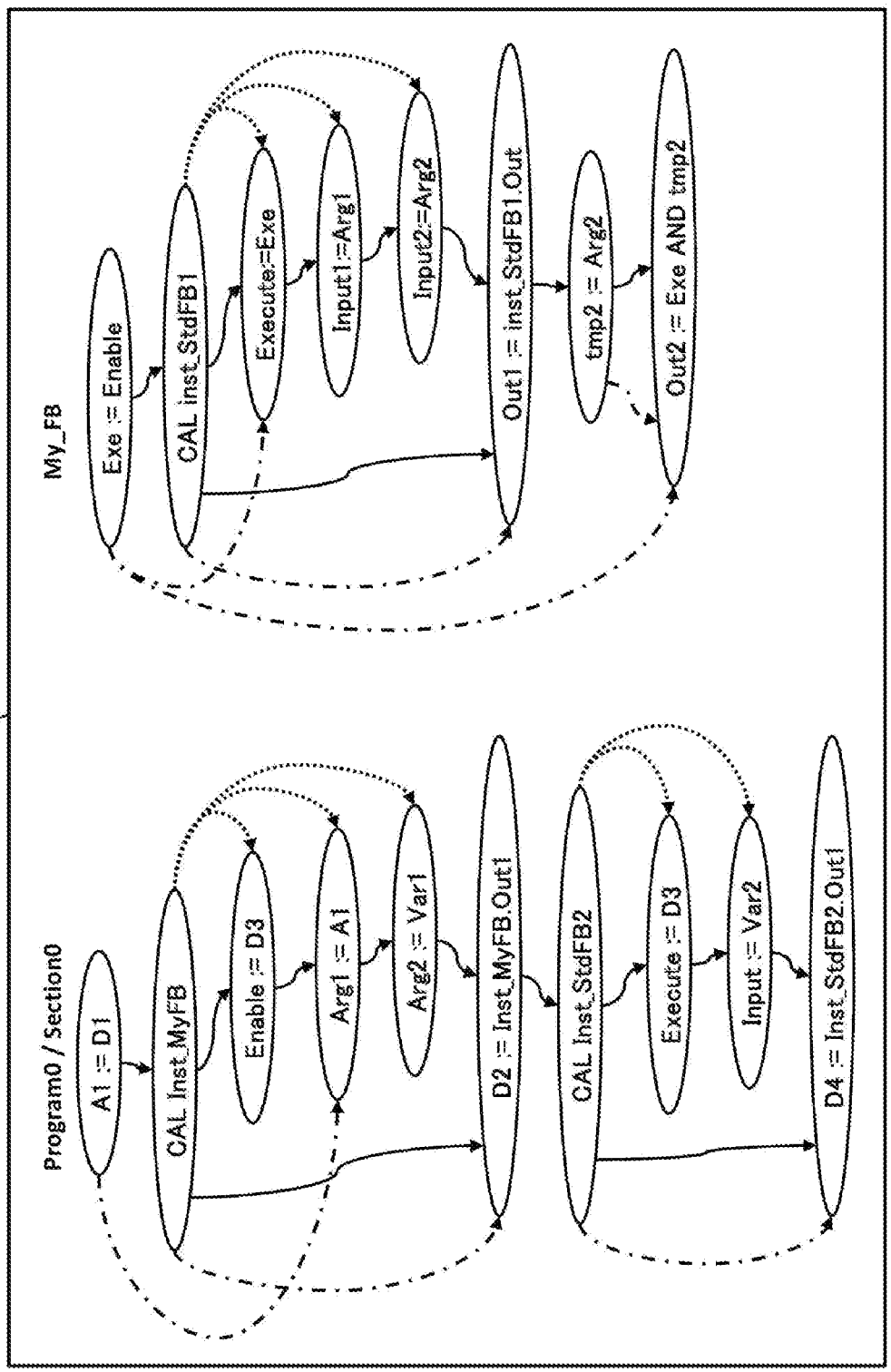
FIG. 9 shows an example of a control flow graph obtained from the abstract syntax tree of FIG.

FIG. 9 shows an example of a control flow graph 223 obtained from the abstract syntax tree 222 of FIG. 8. The control flow graph 223 indicates a processing flow (a solid line arrow), data dependency (an alternated long and short dash line arrow), and control dependency (a dotted line arrow) of the control program 221. The processing flow indicates the order in which the processing in the control program 221 is executed. For example, in the control program 221, processing of "CAL Inst_MyFB" is executed after processing of "A1:=D1." Therefore, in the control flow graph 223, "A1:=D1" and "CAL Inst_MyFB" are connected by an arrow indicating the processing flow.

Data dependency indicates a relation of processing to which an influence is applied. For example, in the control program 221 the results of the processing of "A1:=D1" affects the processing of "Arg1:=A1." Therefore, in the control flow graph 223, "A1:=D1" and "Arg1:=A1" are connected by an arrow indicating the data dependency. Further, control dependency indicates a relation of processing which determines whether or not the execution is possible by conditional branching or the like. For example, in the control program 221, "Enable:=D3," "Arg1:=A1," and "Arg2:=Var1" are executed according to the execution of "CAL Inst_MyFB." Therefore, "CAL Inst_MyFB" is connected to "Enable:=D3," "Arg1:=A1" and "Arg2:=Var1" by an arrow indicating the control dependency.

According to the generated control flow graph, it is possible to identify the dependency relation between the types of processing including a calculation of a variable in the control program 221. When the generation of the control flow graph is completed, the control part 11 proceeds to next Step S203.

(Step S203 and Step S204)

Returning to FIG. 6, in Step S203, the control part 11 extracts each of the device variables 31 used in the control program 221 from the abstract syntax tree or the control flow graph. A method for extracting each of the device variables 31 used in the control program 221 may be appropriately selected according to the embodiment.

As an example, the control part 11 may extract each of the device variables 31 being used from the abstract syntax tree or the control flow graph with reference to a list of device variables. Specifically, the control part 11 identifies each of variables used in the control program 221 from the abstract syntax tree or the control flow graph. Next, the control part 11 determines whether or not each of the identified variables is the device variable by comparing each of the identified variables with the list of device variables. Thus, the control part 11 can extract each of the device variables 31 used in the control program 221. A format of the list of device variables may not be particularly limited, and may be appropriately set according to the embodiment. Further, the list of device variables may be provided by user's designation or may be held in the system in advance. This list of device variables may be stored in the storage part 12.

In next Step S204, the control part 11 extracts a function call expression for calling an instance of the function (the user-defined function and the standard function) used in the control program 221 from the abstract syntax tree or the control flow graph. A method of extracting the calling expression of the function being used may be appropriately selected according to the embodiment.

As an example, the control part 11 may extract the call expression of the function being used from the abstract syntax tree or the control flow graph with reference to a list of functions in the same manner as the extraction method of the device variable 31. A format of the list of functions may not be particularly limited, and may be appropriately set according to the embodiment. Also, the list of functions may be provided by user's designation or may be held in the system in advance. The list of functions may be stored in the storage part 12. A list of standard functions among the functions may be obtained from the function structure information 121. Further, the list of user-defined functions may be obtained from names of the subprograms and the like in the control program 221. As another example of extracting the function call expression, the control part 11 may extract a pattern corresponding to the function call expression based on a language specification of the control program 221.

In the above example, in Step S203, four device variables (D1, D2, D3, and D4) can be extracted from the abstract syntax tree 222 (FIG. 8) or the control flow graph 223 (FIG. 9). Further, in Step S204, the call expression of the instance (Inst_MyFB) of one user-defined function (My_FB) and the instances (Inst_StdFB1 and Inst_StdFB2) of two standard functions (Std_FB1 and Std_FB2) can be extracted from the abstract syntax tree 222 or the control flow graph 223. The processing procedure of Steps S203 and S204 may be interchanged. When the extraction of each of the device variables 31 and the call expression of the function which are being used in the control program 221 is completed, the control part 11 proceeds to next Step S205.

(Step S205)

In Step S205, the control part 11 extracts the pattern of the dependency relation of each of the extracted device variables 31 on the input parameter or the output parameter of the instance of the extracted function by tracing the route on which each of the instructions depends with reference to the control flow graph. The method of extracting the pattern of the dependency relation based on the control flow graph may not be particularly limited, and may be appropriately set according to the embodiment.

It is assumed that an instance of the standard function is not interposed between two device variables which have a dependency relation with each other. In this case, when the two device variables have a direct dependency relation, a route from one device variable to the other device variable can be traced in the control flow graph. Among the plurality of device variables 31 included in the control program 221, there may be a device variable which has a direct dependency relation with another device variable in this way. Further, even when an instance of at least one user-defined function is interposed between the two device variables, the contents of the user-defined function are described in the control program 221, and thus the route from one device variable to the other device variable can be traced in the control flow graph. At this time, the internal structure of the user-defined function is identified in the process of tracing this route.

On the other hand, it is assumed that an instance of the standard function is interposed between two device variables which have the dependency relation with each other. In this case, since the contents of the standard function are not described in the control program 221, the route from one device variable to the other device variable cannot be traced in the control flow graph. That is, a search for the route starting from the device variable ends when the parameter of the standard function is reached.

Therefore, in the present embodiment, in the control flow graph, the control part 11 traces a route of the data or control dependency from each of the extracted device variables 31 to the input parameter or the output parameter of the terminal instance or another device variable. For the above-described reasons, the terminal instance is an instance of the standard function. Thus, the control part 11 extracts the pattern of the dependency relation of each of the device variables 31.

<Extraction Processing>

Figure 10A:
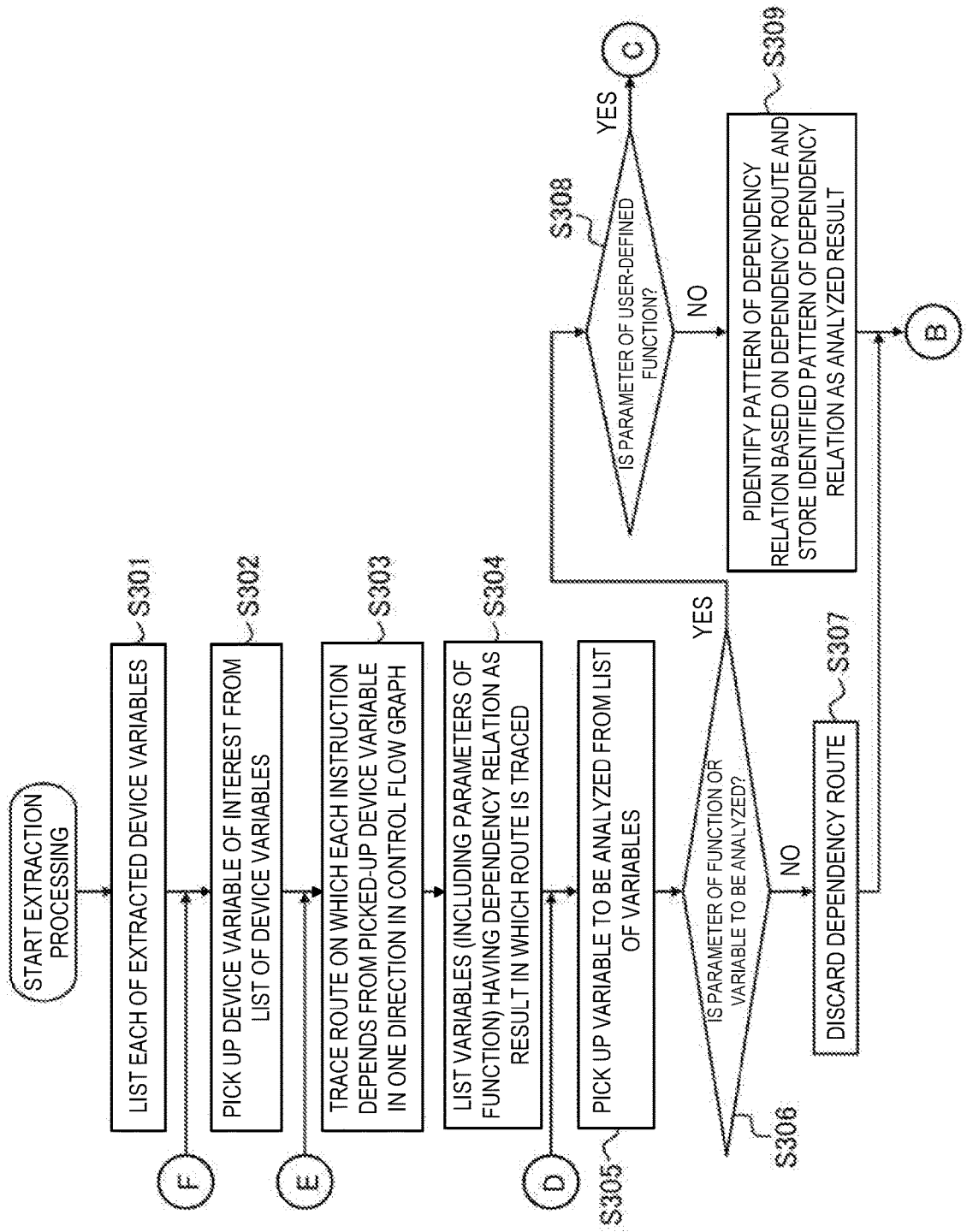
FIG. 10A illustrates an example of a processing procedure for extracting a dependency pattern by the analysis device according to the embodiment.
Figure 10B:
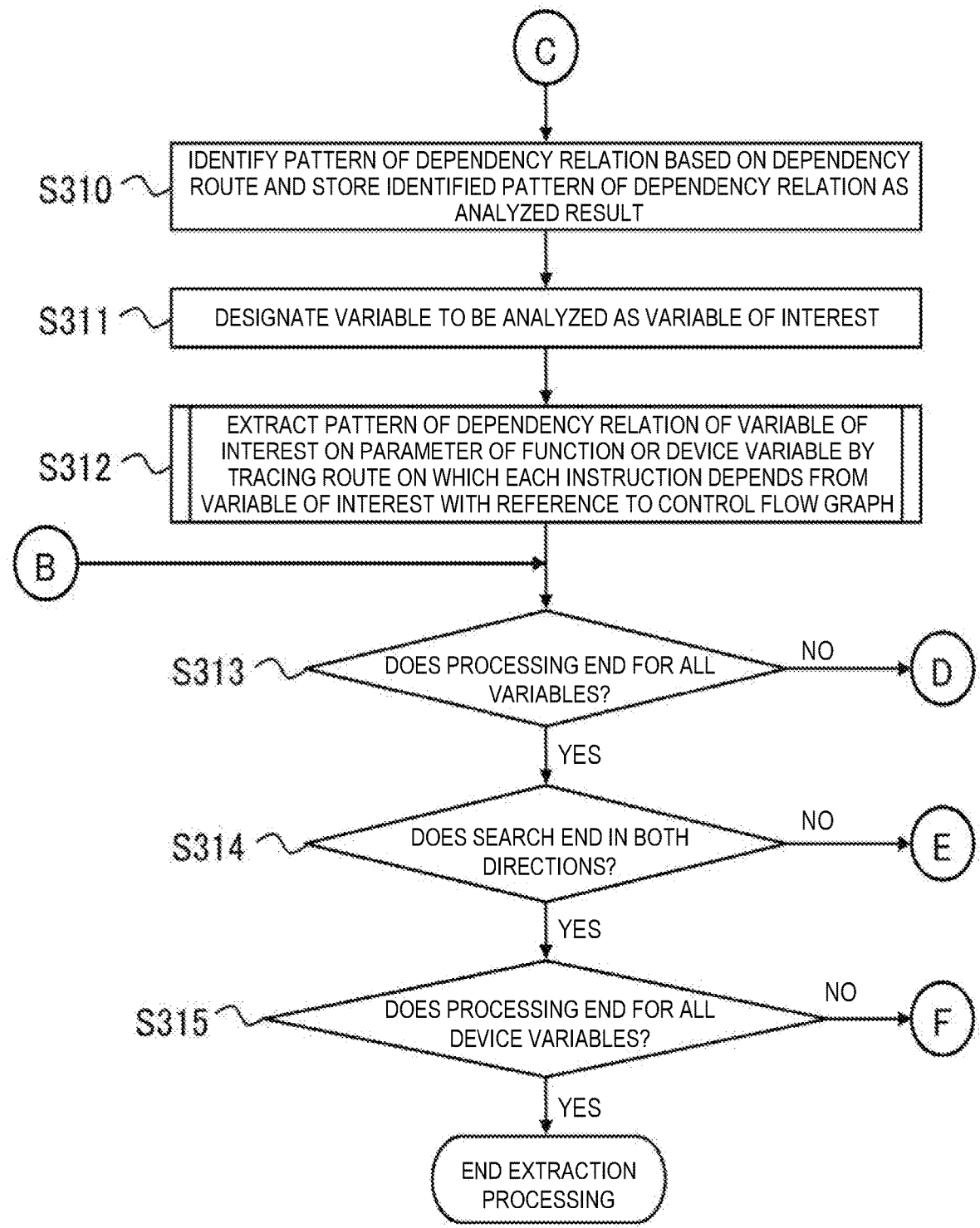
FIG. 10B illustrates the example of the processing procedure for extracting the dependency pattern by the analysis device according to the embodiment.

Here, an example of processing of Step S205 will be described in detail with reference to FIGS. 10A and 10B. FIGS. 10A and 10B illustrate an example of a processing procedure for extracting the pattern of the dependency relation by the analysis device 1 according to the present embodiment. The processing of Step S205 according to the present embodiment includes the following processing of Steps S301 to S315. However, the processing procedure described below is only an example, and each processing may be changed as much as possible. Further, regarding the processing procedure described below, steps can be omitted, replaced, and added as appropriate according to the embodiment.

(Step S301)

In Step S301, the control part 11 lists each of the device variables 31 extracted in Step S203. In the example of FIGS. 8 and 9, four device variables (D1, D2, D3, and D4) are listed. When each of the extracted device variables 31 is listed, the control part 11 proceeds to next Step S302.

(Step S302 to Step S304)

In Step S302, the control part 11 picks up a device variable of interest (hereinafter, also referred to as "device variable of interest") from the list of extracted device variables 31. In Step S303, in the control flow graph, the control part 11 traces a route (a route indicating the data or control dependency), on which each of instructions depends, starting from the picked-up device variable of interest in one direction. The route of the data or control dependency can be traced in two directions including a forward direction which follows a direction of an arrow and a reverse direction which is opposite to the direction of the arrow. Therefore, in Step S303, the control part 11 selects one of these two directions as the one direction, and follows the route in the selected direction. In Step S304, the control part 11 lists variables (including parameters of the instance of the function) which have a dependency relation with the device variable of interest as the results of tracing the route. The variables which have a dependency relation are variables which appear on the route.

In the examples of FIGS. 8 and 9, it is assumed that the device variable "D1" is picked up as the device variable of interest in Step S302. In this case, in Step S303, the route of dependency can be traced from "A1:=D1" to "Arg1:=A1." In next Step S304, variables "A1" and "Arg1" are listed. The variable "A1" is an example of the variables other than the device variable 31, and the variable "Arg1" is an example of the input parameters of an instance of the user-defined function (My_FB). When the variables having the dependency relation with each other are listed, the control part 11 proceeds to next Step S305.

(Step S305 and Step S306)

In Step S305, the control part 11 picks up a variable to be analyzed from the list of variables having the dependency relation. The variable to be analyzed is one of the parameter (the input parameter or the output parameter) of the instance of the function (the standard function or the user-defined function), the device variable, and another variable other than the device variable.

Therefore, in next Step S306, the control part 11 determines whether or not the picked-up variable to be analyzed is a parameter of the instance of the function or a device variable. When it is determined that the variable to be analyzed is a parameter of the instance of the function or a device variable, the control part 11 proceeds to next Step S308. On the other hand, when it is determined that the variable to be analyzed is neither a parameter of the instance of the function nor a device variable, that is, when the variable to be analyzed is a variable other than the device variable, the control part 11 proceeds to next Step S307.

For example, in the above example, when the variable "Arg1" is picked up as the variable to be analyzed in Step S305, the control part 11 determines that the variable to be analyzed is a parameter of the instance of the function, and proceeds to next Step S308. On the other hand, in the above-described example, when the variable "A1" is picked up as the variable to be analyzed in Step S305, the control part 11 determines that the variable to be analyzed is neither a parameter of the instance of the function nor a device variable, and proceeds to next Step S307.

(Step S307)

Step S307 is performed when the variable to be analyzed picked up in Step S305 is a variable other than the device variable. In this case, the route of dependency from the variable of interest to the variable to be analyzed only indicates the dependency relation between the device of interest and other variables. Therefore, in Step S307, the control part 11 discards the route of dependency to the variable to be analyzed. After the route of dependency is discarded, the control part 11 proceeds to next Step S313.

(Step S308)

In Step S308, the control part 11 determines whether or not the picked up variable to be analyzed is a parameter of the instance of the user-defined function. When it is determined that the variable to be analyzed is a parameter of the instance of the user-defined function, the control part 11 proceeds to next Step S310. On the other hand, when it is determined that the variable to be analyzed is not a parameter of the instance of the user-defined function, that is, when the variable to be analyzed is a parameter of the instance of the standard function or a device variable, the control part 11 proceeds to next Step S309.

(Step S309)

Step S309 is performed when the variable to be analyzed picked up in Step S305 is a parameter of the instance of the standard function or a device variable. From the viewpoint of identifying the dependency relation between the device variables 31, the device variable (particularly, the device variable other than the device variable of interest) is a termination of the search for the route starting from the device variable of interest. Further, since the contents of the standard function are not described in the control program 221, the parameter of the instance of the standard function is also the termination of the search for the route starting from the device variable of interest. That is, the search for the route starting from the device variable of interest ends when the parameter of the instance of the standard function or the device variable is reached.

Therefore, in Step S309, the control part 11 identifies the pattern of the dependency relation with the device variable of interest based on the route of dependency which has passed from the variable of interest to the variable to be analyzed. When the variable to be analyzed is a device variable, the pattern of the dependency relation between the device variable and the device variable of interest is identified. On the other hand, when the variable to be analyzed is a parameter of the instance of the standard function, the control part 11 identifies the pattern of the dependency relation between the parameter of the instance of the standard function and the variable of interest. The control part 11 saves the identified pattern of the dependency relation as analysis results thereof. When a variable other than the device variable is included in the route of dependency from the device variable of interest to the variable to be analyzed, the control part 11 also saves information on other variables included in the route as the analysis results. After the analysis results are saved, the control part 11 proceeds to next Step S313.

(Step S310 to Step S312)

Steps S310 to S312 are performed when the variable to be analyzed picked up in Step S305 is a parameter of the instance of the user-defined function. When the variable to be analyzed is the parameter of the instance of the user-defined function, since the contents of the user-defined function are described in the control program 221, the route of dependency can be further traced from the variable to be analyzed toward the inside of the user-defined function. Therefore, the control part 11 saves the analysis results up to the instance of the user-defined function, then sets the variable to be analyzed as a new starting point, and continues the processing of tracing the route of dependency.

Specifically, in Step S310, the control part 11 identifies the pattern of the dependency relation with the device variable of interest based on the route of dependency which has passed from the device variable of interest to the variable to be analyzed. In this situation, the pattern of the dependency relation between the parameter of the instance of the user-defined function and the device variable of interest is identified. The control part 11 saves the identified pattern of the dependency relation as the analysis results. Similar to Step S309, when a variable other than the device variable is included in the route of dependency from the device variable of interest to the variable to be analyzed, the control part 11 also saves information on other variables included in the route as the analysis results.

In next Step S311, the control part 11 designates the variable to be analyzed as a new variable of interest. Then, in next Step S312, the control part 11 extracts the pattern of the dependency relation of the variable of interest on the parameter of the function or the device variable by tracing the route, on which each of instructions depends, starting from the variable of interest with reference to the control flow graph. Details of a subroutine in Step S312 will be described later. When the extraction of the pattern of the dependency relation by Step S312 is completed, the control part 11 proceeds to next Step S313.

(Step S313)

In Step S313, the control part 11 determines whether or not the processing of Step S305 and subsequent steps thereof ends for all the variables listed in Step S304. When variables which have not been processed in Step S305 and subsequent steps thereof remain in the list, the control part 11 determines that the processing in Step S305 and subsequent steps thereof has not yet ended for all the listed variables. In this case, the control part 11 returns the processing to Step S305, picks up another variable remaining in the list as the variable to be analyzed, and repeats the processing of Step S306 and subsequent steps thereof. On the other hand, otherwise, the control part 11 determines that the processing has ended for all the listed variables, and proceeds to next Step S314.

(Step S314)

In Step S314, the control part 11 determines whether or not the series of processing of Steps S303 to S313 related to the search for the route starting from the device variable of interest has ended in both the forward direction and the reverse direction. At a stage in which the series of processing of Steps S303 to S313 is performed only once, the processing related to the search of the route has not yet ended in both directions. At this stage, the control part 11 determines that the processing related to the search for the route has not yet ended in both directions, returns the processing to Step S303, changes the direction in which the route is traced to another direction, and repeats the processing in Step S303 and subsequent steps thereof. For example, when the route of dependency is traced in the forward direction for the first time, the control part 11 traces the route of dependency in the reverse direction in the next processing related to the search for the route. On the other hand, when the series of processing is performed twice by repeating this processing, the processing related to the search for the route in both directions ends. At this stage, the control part 11 determines that the processing related to the search for the route in both directions has ended, and proceeds to next Step S315.

(Step S315)

In Step S315, the control part 11 determines whether or not the processing of Step S302 and subsequent steps thereof has ended for all the device variables listed in Step S301. When a device variable which has not processed by the processing of Step S302 and subsequent steps thereof remains in the list, the control part 11 determines that the processing of Step S302 and subsequent steps thereof has not yet ended for all the listed device variables. In this case, the control part 11 returns the processing to Step S302, picks up another device variable remaining in the list as the device variable of interest, and repeats the processing of Step S303 and subsequent steps thereof. On the other hand, otherwise, the control part 11 determines that the processing has ended for all the listed device variables, and ends the processing for extracting the pattern of the dependency relation. Thus, the series of processing in Step S205 ends, and thus the processing of the dependency analysis in Step S102 is completed. When the processing of the dependency analysis in Step S102 is completed, the control part 11 proceeds to next Step S103.

<Subroutine of Extraction Processing>

Figure 11A:
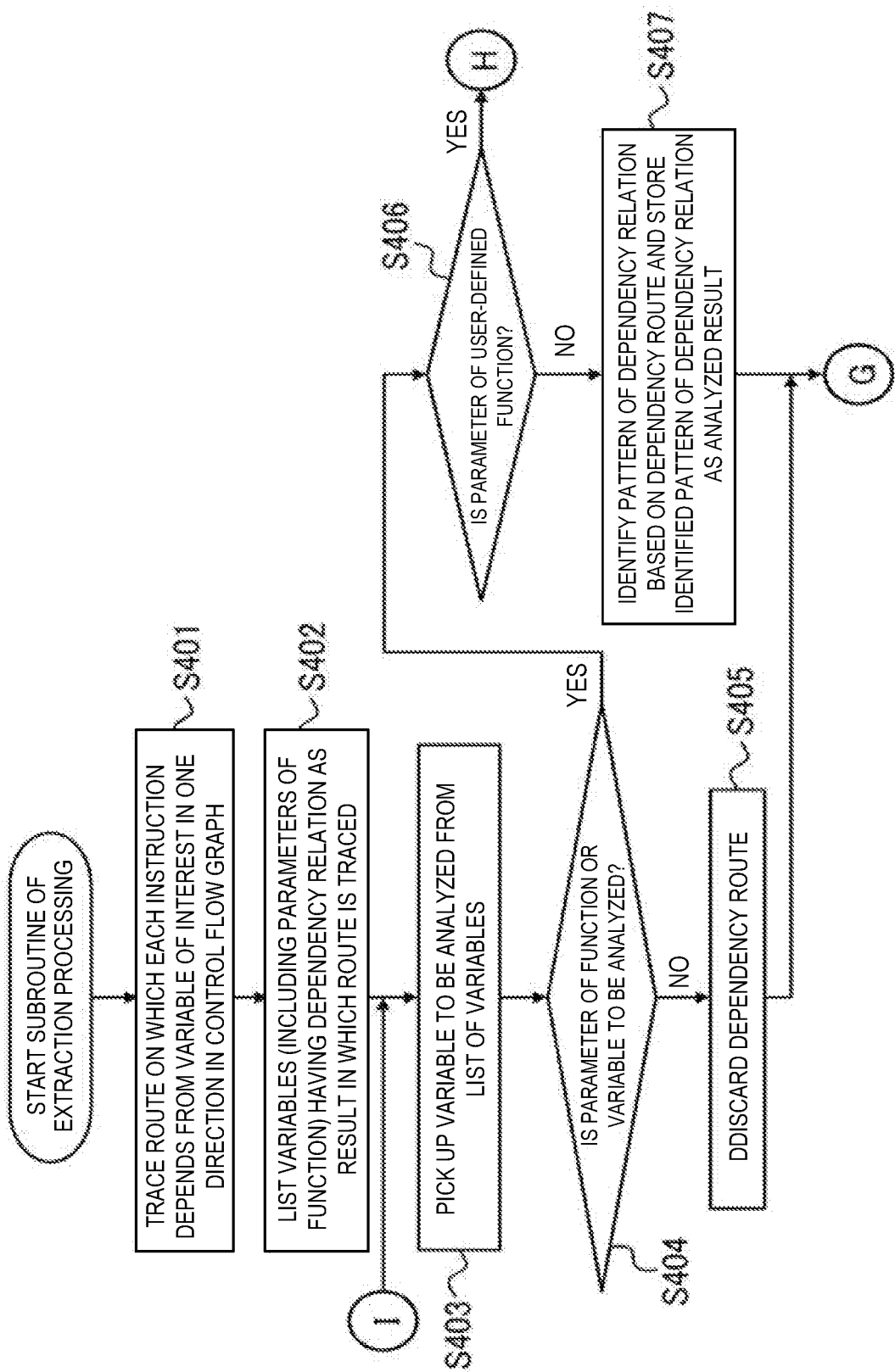
FIG. 11A illustrates an example of a processing procedure (a subroutine) for extracting a dependency pattern related to a user-defined function by the analysis device according to the embodiment.
Figure 11B:
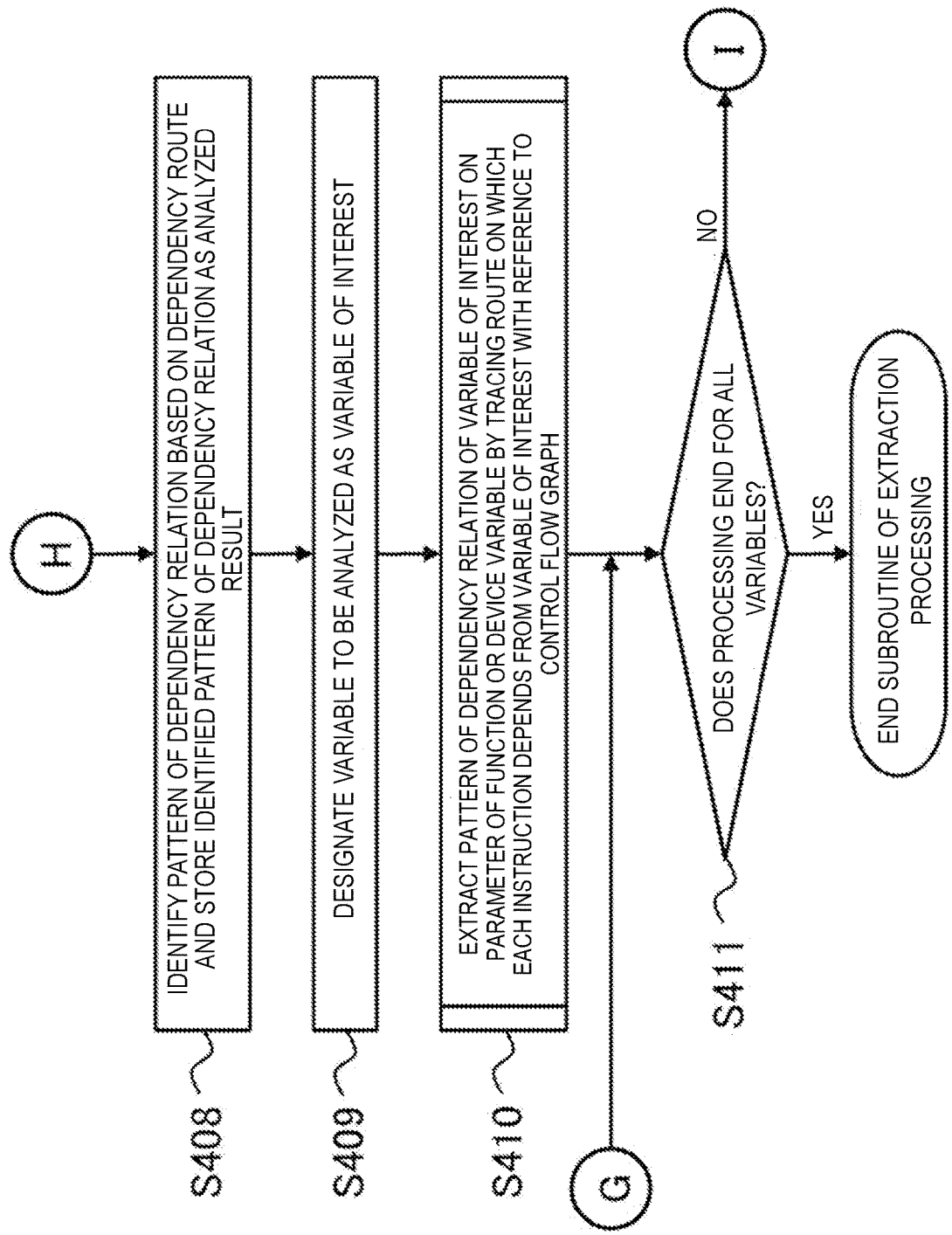
FIG. 11B illustrates the example of the processing procedure (the subroutine) for extracting the dependency pattern related to the user-defined function by the analysis device according to the embodiment.

Next, an example of processing of Step S312 will be described in detail with reference to FIGS. 11A and 11B. FIGS. 11A and 11B illustrate an example of a processing procedure (a subroutine) for extracting the dependency pattern on the user-defined function by the analysis device 1 according to the present embodiment. The processing of Step S312 according to the present embodiment includes the following processing of Steps S401 to S411. However, the processing procedure described below is only an example, and each processing may be changed as much as possible. Further, regarding the processing procedure described below, steps can be omitted, replaced, and added as appropriate according to the embodiment.

In the series of processing from Step S401 to Step S411, the search for the route of dependency is performed starting from the parameter of the instance of the user-defined function. Therefore, the series of the processing from Step S401 to Step S411 is the same as the series of the processing from Step S303 to Step S313 in which the device variable of interest picked up in Step S302 is replaced with the variable of interest designated in Step S311.

(Step S401 and Step S402)

That is, in Step S401, in the control flow graph, the control part 11 traces the route, on which each of instructions depends, starting from the designated variable of interest in one direction. In Step S401, the control part 11 traces the route of dependency in the direction selected in Step S303. In Step S402, the control part 11 lists variables (including the parameter of the instance of the function) having the dependency relation with the variable of interest as the result of tracing the route.

(Step S403 and Step S404)

In Step S403, the control part 11 picks up the variable to be analyzed from the list of variables having the dependency relation. In Step S404, the control part 11 determines whether or not the picked-up variable to be analyzed is a parameter of the instance of the function or a device variable. When it is determined that the variable to be analyzed is a parameter of the instance of the function or a device variable, the control part 11 proceeds to next Step S406. On the other hand, when it is determined that the variable to be analyzed is neither the parameter of the instance of the function nor the device variable, that is, when the variable to be analyzed is a variable other than the device variable, the control part 11 proceeds to next Step S405.

(Step S405)

In Step S405, the control part 11 discards the route of dependency to the variable to be analyzed. After the route of dependency is discarded, the control part 11 proceeds to next Step S411.

(Step S406)

In Step S406, the control part 11 determines whether or not the variable to be analyzed picked up in Step S403 is a parameter of the instance of the user-defined function. When it is determined that the variable to be analyzed is a parameter of the instance of the user-defined function, the control part 11 proceeds to next Step S408. On the other hand, when it is determined that the variable to be analyzed is not a parameter of the instance of the user-defined function, that is, when the variable to be analyzed is the parameter of the instance of the standard function or the device variable, the control part 11 proceeds to next Step S407.

(Step S407)

In Step S407, the control part 11 identifies the pattern of the dependency relation with the variable of interest based on the route of dependency which has passed from the variable of interest to the variable to be analyzed. Then, the control part 11 saves the identified pattern of the dependency relation as the analysis results. When a variable other than the device variable is included in the route of dependency from the variable of interest to the variable to be analyzed, the control part 11 also saves information of the other variable included in the route as the analysis results. After the analysis results are saved, the control part 11 proceeds to next Step S411.

(Step S408 to Step S410)

In Step S408, the control part 11 identifies the pattern of the dependency relation with the attention variable based on the route of dependency from the variable of interest to the variable to be analyzed, and saves the identified pattern of the dependency relation as the analysis results. Similar to Step S407, when a variable other than the device variable is included in the route of dependency from the variable of interest to the variable to be analyzed, the control part 11 also saves information of the other variable included in the route as the analysis results.

In Step S409, the control part 11 designates the variable to be analyzed as a new variable of interest. Then, in Step S410, the control part 11 extracts the pattern of the dependency relation of the variable of interest on the parameter of the function or the device variable by tracing the route, on which each of instructions depends, starting from the variable of interest with reference to the control flow graph. The processing of Step S410 is the same as that of Step S312. That is, the control part 11 performs the processing of Steps S401 to S411 for the newly designated variable of interest. When the extraction of the pattern of the dependency relation in Step S410 is completed, the control part 11 proceeds to next Step S411.

It is assumed that an instance of a user-defined function of the new variable of interest is different from the instance of the user-defined function of the original variable of interest. In this case, in the processing of Step S410, the control part 11 traces the route of dependency from the new variable of interest to the inside of the user-defined function. On the other hand, it is assumed that the instance of the user-defined function of the new variable of interest is the same as the instance of the user-defined function of the original variable of interest. In this case, the search for the inside of the user-defined function is completed by tracing the route of dependency from the original variable of interest to the new variable of interest. That is, the internal structure of the user-defined function is identified by the route from the original variable of interest to the new variable of interest. Therefore, in the processing of Step S410, the control part 11 traces the route of dependency from the newly designated variable of interest toward the outside of the user-defined function.

(Step S411)

In Step S411, the control part 11 determines whether or not the processing of Step S403 and subsequent steps thereof has ended for all the variables listed in Step S402. When a variable which has not been processed in Step S403 and subsequent steps thereof remains in the list, the control part 11 determines that the processing in Step S403 and subsequent steps thereof has not yet ended for all the listed variables. In this case, the control part 11 returns the processing to Step S403, picks up another variable remaining in the list as the variable to be analyzed, and repeats the processing of Step S404 and subsequent steps thereof. On the other hand, otherwise, the control part 11 determines that the processing has ended for all the listed variables, and completes the processing of this subroutine. When the processing of this subroutine is completed, the control part 11 proceeds to next Step S313 (Step S411 of the previous subroutine when the processing of the subroutine is repeated in Step S410).

Step S312 and step S410 are processing for continuing the processing of tracing the route of dependency on the same device variable of interest, which is processed before these steps, from the new variable of interest. Therefore, the control part 11 stores the analysis results obtained after the continuation in association with the analysis results obtained before the continuation. Specifically, the control part 11 stores the analysis results in Step S407 or S408 depending on the analysis results in Step S310 (Step S408 of the previous subroutine when the processing of the subroutine is repeated in Step S410).

An example of the result of extracting the pattern of the dependency relation by the above-described extraction processing will be described with reference to FIG. 12. FIG. 12 shows an example of extraction result data 224 showing the result of extracting the pattern of the dependency relation from the control flow graph 223 of FIG. 9. In the example of FIG. 12, the extraction result data 224 has a table structure, and each of records (row data) has fields for "NO," "PARENT," "DEVICE," "FOCUS," "DIRECTION," "VARIABLE," "PROGRAM," "INSTANCE," "FUNCTION," "PARAMETER" and "IO." One record corresponds to one analysis result. However, a data structure of the extraction result may not be limited to such an example, and may be appropriately determined according to the embodiment.

A number of each of the records is stored in the "NO" field. A number of each of the records is used to distinguish the analysis result. In the "PARENT" field, the number of each of the records indicating the analysis results on which the analysis result indicated by a target record depends is stored to indicate the dependency relation of each of the analysis results. For example, the analysis results in Steps S309 and S310 do not depend on any of the other analysis results. Therefore, the "PARENT" field of the record indicating the analysis result is blank (for example, the first, third, fifth, seventh, and eighth records in FIG. 12). On the other hand, for example, the analysis results in Step S407 or S408 depends on the analysis result in Step S310 (Step S408 of the previous subroutine when the processing of the subroutine is repeated in Step S410). Therefore, the number of each of the records indicating analysis results of a dependent destination is stored in the "PARENT" field of the record indicating the analysis result (for example, the second, fourth, and sixth records in FIG. 12).

In the "DEVICE" field, a name of each of the device variables of interest for extracting the pattern of the dependency relation is stored. The "FOCUS" field stores a name of each of the variables which are the starting points when the route of dependency is traced. For example, the name of the device variable of interest is stored in the "FOCUS" field of the record indicating the analysis results in Steps S309 and S310. On the other hand, for example, the name of each of the variables of interest is stored in the "FOCUS" field of the record indicating the analysis results in Step S407 or S408.

The "VARIABLE" field stores a name of each of the variables which have the dependency relations on the variables indicated by the "FOCUS" field. Information on other variables included in the routes of dependency extracted in Step S309, Step S310, Step S407, and Step S408 is stored in the "VARIABLE" field. The "DIRECTION" field stores information indicating the direction of the dependency relation between the variable indicated by the "FOCUS" field and the variable indicated by the "VARIABLE" field. The direction of the dependency relation is identified according to the direction in which the route of dependency is traced. In the "PROGRAM" field, information indicating a location of a program portion, which provides the analysis results indicated by the target record, in the control program 221 is stored.

The "INSTANCE" field stores a name of the instance of the function which has the dependency relation with the variable indicated by the "FOCUS" field. When the variable to be analyzed picked up in Steps S305 and S403 is a parameter of the instance of the standard function or the user-defined function, the name of the instance of the standard function or the user-defined function is stored in the "INSTANCE" field. The "FUNCTION" field stores a name of the function having the instance indicated by the "INSTANCE" field. The "PARAMETER" field stores a name of each of the parameters of the function which have the dependency relations on the variables indicated by the "FOCUS" field. The 10" field stores information indicating the types of parameters (whether it is the input parameter or the output parameter) indicated by the "PARAMETER" field. When the variable to be analyzed is a device variable, the pattern of the dependency relation with this device variable is extracted instead of the dependency relation with the parameter of the instance of the function. Therefore, the "INSTANCE," "FUNCTION," "PARAMETER," and "IO" fields of the obtained records are blank.

In the example of FIG. 9, it is assumed that the processing of Step S303 is performed with the device variable "D1" as the device variable of interest. In this case, the first record (the record in which the "NO" is "1") illustrated in FIG. 12 indicates the pattern of the dependency relation extracted as the result of tracing the route of dependency from "A1:=D1" to "Arg1:=A1." That is, the first record indicates the analysis result obtained by performing the processing of Step S310 after the variable "Arg1" is picked up as the variable to be analyzed.

The variable "Arg1" is an example of the input parameters of the instance of the user-defined function (My_FB). Therefore, the variable "Arg1" is designated as a new variable of interest, and the processing of Step S312 is performed. The second record (the record in which the "NO" is "2") indicates the pattern of the dependency relation extracted by Step S407 as the analysis result obtained by performing the processing of Step S312 after the first record is obtained, that is, the result of referring to "Input1:=Arg1." Therefore, a number of the first record is stored in the "PARENT" field of the second record. In detail, the second record indicates that a variable of interest "Arg1" has the dependency relation with an input parameter "Input1" of the instance of the standard function (Std_FB1).

[Step S103 and Step S104]

Returning to FIGS. 5A and 5B, in Step S103, the control part 11 operates as the definition determination part 113 and refers to the function structure information 121 which defines the dependency relation between the input parameter and the output parameter in the standard function. Then, the control part 11 determines whether or not the control program 221 includes instances of one or more undefined standard functions in which the dependency relations are not defined in the function structure information 121. Before Step S103 is performed, the control part 11 acquires the function structure information 121. In the present embodiment, the function structure information 121 is stored in the storage part 12. Therefore, the control part 11 acquires the function structure information 121 from the storage part 12. However, an acquisition destination of the function structure information 121 may not be limited to such an example, and may be appropriately selected according to the embodiment.

A method for determining whether or not an instance of an undefined standard function is included in the control program 221 may be appropriately determined according to the embodiment. For example, the control part 11 compares whether or not the standard function 41 among the functions extracted in Step S204 is defined in the function structure information 121. When the standard function undefined in the function structure information 121 is included in the standard functions 41 extracted in Step S204, the control part 11 determines that the instances of one or more undefined standard functions are included in the control program 221. On the other hand, when the definitions of all the standard functions 41 extracted in Step S204 are present in the function structure information 121, the control part 11 determines that the instances of the undefined standard functions are not included in the control program 221.

In Step S104, the control part 11 determines a branch destination of the processing based on the determination results of Step S103. When it is determined in Step S103 that the instances of one or more undefined standard function are included in the control program 221, the control part 11 proceeds to next Step S105. On the other hand, when it is determined in Step S103 that the instances of the undefined standard functions are not included in the control program 221, the control part 11 skips the process of Step S105 and proceeds to next Step S106.

[Step S105]

In Step S105, the control part 11 operates as the definition reception part 114 and receives an input of the additional function structure information 123 which defines the dependency relation between the input parameter and the output parameter in the undefined standard function. A method of receiving the input of the additional function structure information 123 may be appropriately determined according to the embodiment. For example, the control part 11 may receive an input of a definition about the undefined standard function via the input device 14. Further, for example, the control part 11 may receive data which describes the definition of the undefined standard function. Thus, when the additional function structure information 123 is input, the control part 11 proceeds to next Step S106.

[Step S106 and Step S107]

In Step S106, the control part 11 operates as the definition assignment part 115, and identifies the dependency relation between the input parameter 43 and the output parameter 44 in the instances of one or more standard functions 41 included in the control program 221 based on the function structure information 121. When the above-described Step S105 is performed, the control part 11 identifies the dependency relation between the input parameter 43 and the output parameter 44 in the instances of one or more standard functions 41 included in the control program 221 based on the function structure information 121 and the additional function structure information 123. That is, the control part 11 identifies the dependency relation between the input parameter and the output parameter in the instances of one or more undefined standard functions of the one or more standard functions 41 based on the input additional function structure information 123.

In Step S107, the control part 11 operates as the relation identification part 116, and recognizes that one device variable having the dependency relation with the input parameters of an instance of a function has the dependency relation with another device variable having the dependency relation with the output parameter of the instance of the same function which has the dependency on the input parameter in the extracted pattern of the dependency relation. Thus, the control part 11 identifies the dependency relation between the device variables 31.

<Identification Processing>

Figure 13A:
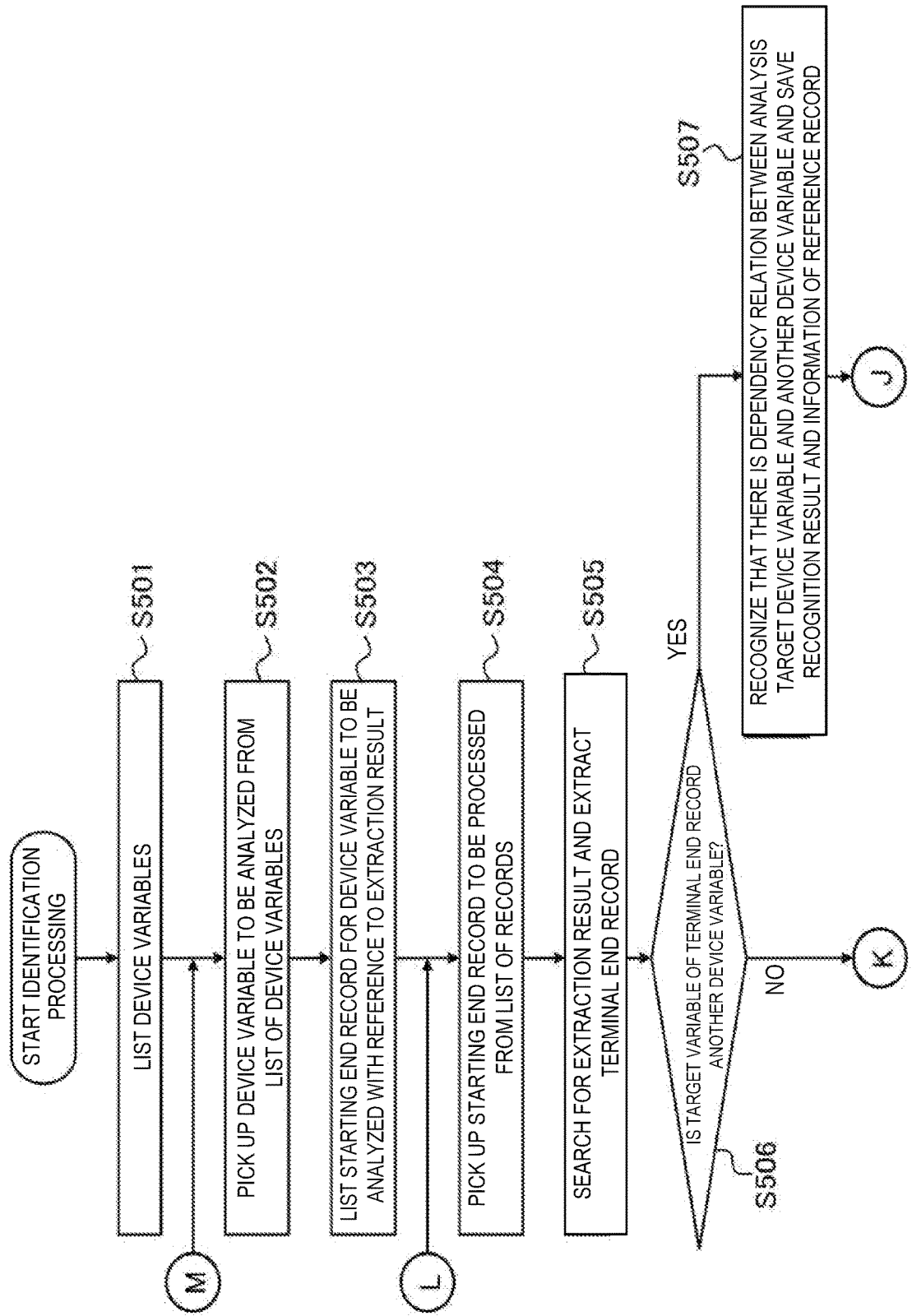
FIG. 13A illustrates an example of a processing procedure for identifying a dependency relation between device variables by the analysis device according to the embodiment.
Figure 13B:
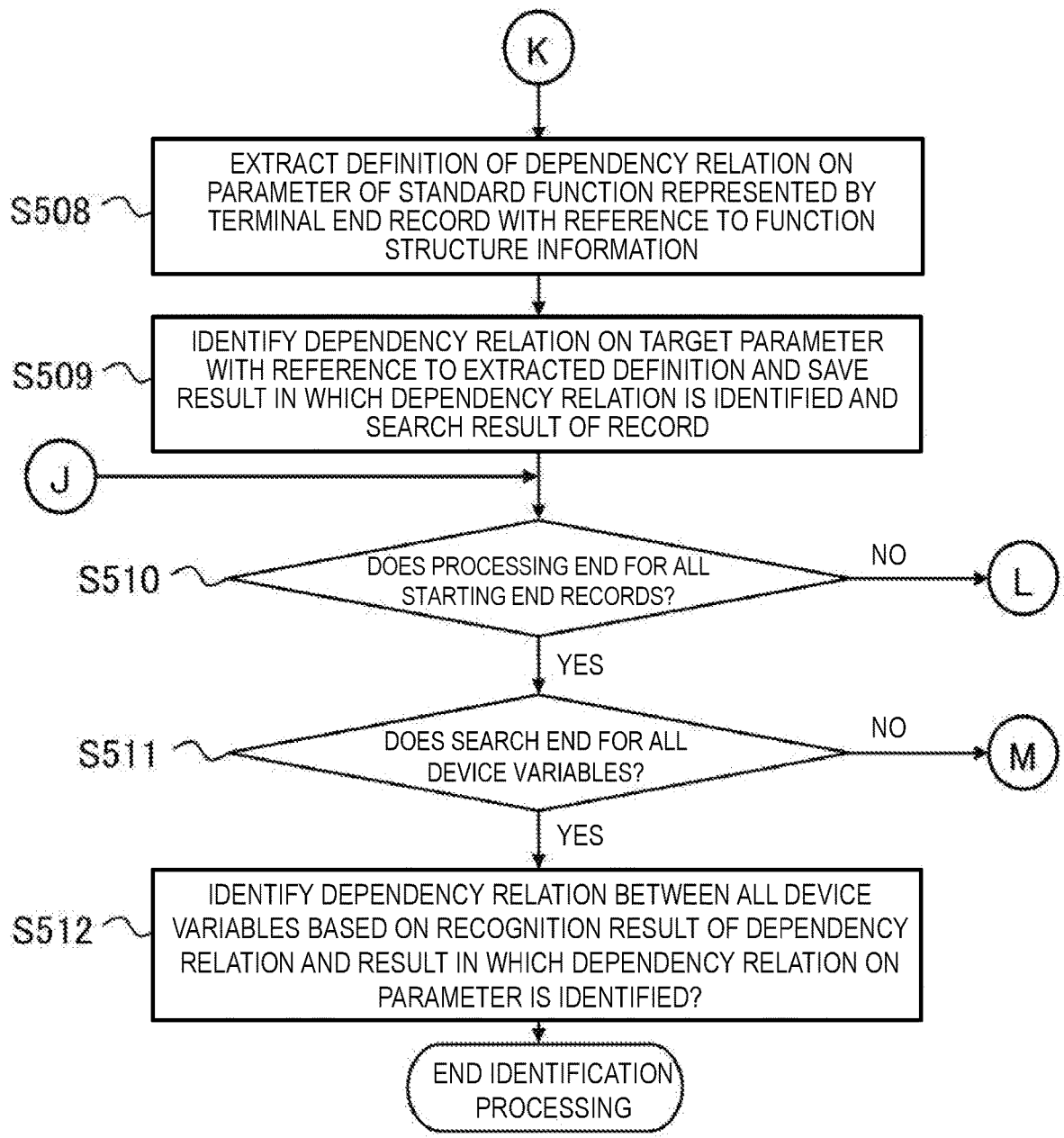
FIG. 13B illustrates the example of the processing procedure for identifying the dependency relation between the device variables by the analysis device according to the embodiment.

Here, an example of the processing of Steps S106 and S107 will be described in detail with reference to FIGS. 13A and 13B. FIGS. 13A and 13B exemplify an example of a processing procedure for identifying the dependency relation between the device variables 31 by the analysis device 1 according to the present embodiment. The processing of Steps S106 and S107 according to the present embodiment includes the following processing of Steps S501 to S512. However, the processing procedure described below is only an example, and each processing may be changed as much as possible. Further, regarding the processing procedure described below, steps can be omitted, replaced, and added as appropriate according to the embodiment.

(Step S501 to Step S503)

In Step S501, the control part 11 lists the device variables 31 used in the control program 221. Step S501 may be processed in the same manner as in Step S301. In Step S502, the control part 11 picks up a device variable to be analyzed for the dependency relation (hereinafter, also referred to as a "device variable to be analyzed") from the list of device variables. In Step S503, the control part 11 lists starting end records for the device variables to be analyzed with reference to the extraction results (the extraction result data 224).

The starting end record indicates the pattern of the dependency relation which was first extracted as the result of tracing the route of dependency. That is, the starting end record is not dependent on other records, and the "PARENT" field of the starting end record is blank. The control part 11 can list the starting end records for the device variables to be analyzed with reference to the "PARENT" and "DEVICE" fields.

In the example of FIG. 12, for example, when the device variable "D1" is picked up as the device variable to be analyzed, the control part 11 picks up the first record as the starting end record for the device variable "D1." On the other hand, for example, when the device variable "D3" is picked up as the device variable to be analyzed, the control part 11 picks up the fifth and seventh records as the starting end records for the device variable "D3."

When the list of starting end records for the device variables to be analyzed is completed, the control part 11 proceeds to next Step S504.

(Step S504 and Step S505)

In Step S504, the control part 11 picks up the starting end record to be analyzed from the list of starting end records (the listed starting end records). In Step S505, the control part 11 searches each of the records of the extraction results from the starting end records and extracts a terminal end record.

The terminal end record indicates the pattern of the dependency relation which was finally extracted as the result of tracing the route of dependency. That is, there are no other dependent records in the terminal end records. The control part 11 can extract the terminal end record by tracing each of the records of the extraction results from the starting end records with reference to the "PARENT" and "DEVICE" fields. When there is a plurality of terminal end records for one starting end record, the control part 11 extracts all the terminal end records.

In the example of FIG. 12, for example, when the fifth record is picked up as the starting end record to be processed, the control part 11 extracts the sixth record as the terminal end record corresponding to the fifth record. Also, for example, when the seventh record is picked up as the starting end record to be processed, since there is no record which is dependent on this seventh record, the control part 11 extracts the seventh record as it is as the terminal end record.

When the extraction of the terminal end record corresponding to the picked up starting end record is completed, the control part 11 proceeds to next Step S506.

(Step S506)

In the above-described extraction processing, when the variable to be analyzed is a parameter of the instance of the user-defined function, the processing of tracing the route of dependency is continued. On the other hand, when the variable to be analyzed is a parameter of the instance of the standard function or another device variable, the processing of tracing the route of dependency ends. Therefore, the terminal end record indicates the dependency relation with the parameter of the instance of the standard function or another device variable.

Therefore, in Step S506, the control part 11 determines whether or not the extracted terminal end record relates to the parameter of the instance of the standard function or to another device variable. This determination method may be appropriately determined according to the embodiment. In the present embodiment, when the extracted terminal end record relates to the parameter of the instance of the standard function, a name of the parameter is stored in the "PARAMETER" field of the terminal end record. On the other hand, when the extracted terminal end record relates to another device variable, the "PARAMETER" field of the terminal end record is blank. Therefore, the control part 11 may determine whether the extracted terminal end record relates to the parameter of the instance of the standard function or another device variable with reference to a value of the "PARAMETER" field.

When it is determined that the extracted terminal end record relates to the parameter of the instance of the standard function, the control part 11 proceeds to Step S508. On the other hand, when it is determined that the extracted terminal end record relates to another device variable, the control part 11 proceeds to next Step S507.

(Step S507)

In Step S507, the control part 11 recognizes that there is the dependency relation between the other device variable indicated by the terminal end record and the device variable to be analyzed, and saves the recognition result and information of the reference record (not shown). The control part 11 can acquire the name of the other device variable from the "VARIABLE" field of the terminal end record. A data format of the recognition result and the information of the reference record may be appropriately determined according to the embodiment. When the storage of the recognition result and the information of the reference record is completed, the control part 11 proceeds to next Step S510.

(Step S508 and Step S509)

In Step S508, the control part 11 extracts the definition of the dependency relation with the parameter of the standard function indicated by the terminal end record with reference to the function structure information 121. When the input of the additional function structure information 123 is received in Step S105, the control part 11 extracts the definition of the dependency relation with the parameter of the standard function indicated by the terminal end record with reference to the function structure information 121 and the additional function structure information 123. In Step S509, the control part 11 identifies the dependency relation with the target parameter with reference to the extracted definition, and saves information of the result in which the dependency relation is identified and search results of the record.

Here, an example of the processing of identifying the dependency relation with the parameters of the standard function indicated by the terminal end record will be described with reference to FIGS. 14A and 14B. FIG. 14A schematically illustrates an example of the function structure information 121 (and the additional function structure information 123) according to the present embodiment. FIG. 14B illustrates an example of intermediate data 226 obtained as the results of the processing in Step S509.

In the example of FIG. 14A, the function structure information 121 has a table structure, and each of the records (the row data) has fields of "ID," "FB," "RAR_X," and "RAR_Y". An identifier for identifying the dependency relation is stored in the "ID" field. The "FB" field stores the name of the standard function on which the dependency relation is defined. The "RAR_X" field stores the name of each of the input parameters on which the dependency relations are defined. The "RAR_Y" field stores the names of each of the output parameters having the dependency relations with the input parameters indicated by the "RAR_X" field. One record corresponds to one dependency relation between the input parameter and the output parameter in the standard function. However, a data structure of the function structure information 121 may not be limited to such an example, and may be appropriately determined according to the embodiment. The additional function structure information 123 is also configured in the same manner as the function structure information 121.

In the present embodiment, in Step S508, the control part 11 compares a value of the "FUNCTION" field of the terminal end record with a value of the "FB" field of each of the records of the function structure information 121. Further, the control part 11 compares a value of the "PARAMETER" field of the terminal end record with a value of the "PAR_X" or "PAR_Y" field of each of the records of the function structure information 121. When a value of the "IO" field of the terminal end record indicates that it is an input parameter, the control part 11 compares the value of the "PARAMETER" field of the terminal end record with "PAR_X" of each of the records of the function structure information 121. On the other hand, when the value in the "IO" field of the terminal end record indicates that it is an output parameter, the control part 11 compares the value of the "PARAMETER" field of the terminal end record with the "PAR_Y" of each of the records of the function structure information 121. Thus, the control part 11 searches each of the records of the function structure information 121, and extracts a record which defines the dependency relation with the parameter of the standard function indicated by the terminal end record. When the input of the additional function structure information 123 is received in Step S105, the control part 11 further performs the search for the additional function structure information 123. Hereinafter, the processing for the additional function structure information 123 is the same as that for the function structure information 121, and thus the description thereof will be omitted.

In Step S509, the control part 11 identifies another parameter having the dependency relation with a target parameter with reference to the record extracted from the function structure information 121, and stores the result in which the dependency relation is identified and information of the search route of the record in each of the records of the intermediate data 226.

In the example of FIG. 14B, the intermediate data 226 has a table structure, and each of the records (the row data) has fields of "DEVICE," "INSTANCE," "DEP," "ID," and "TRACE." One record corresponds to one result in which the dependency relation is identified, that is, one result in which the definition is provided by the function structure information 121. However, the configuration of the intermediate data 226 may not be limited to such an example, and may be appropriately determined according to the embodiment.

The name of the device variable to be analyzed is stored in the "DEVICE" field. The name of the instance of the standard function in which the dependency relation is identified by the record extracted from the function structure information 121 is stored in the "INSTANCE" field. The name of the instance of this standard function is obtained from the "INSTANCE" field of the terminal end record extracted in Step S505.

The "DEP" field stores the types of parameters which are parameters in the instance of the standard function having the dependency relation with the device variable to be analyzed and of which the definitions are provided by the function structure information 121. In the above-described search, when a value of the "PARAMETER" field of the terminal end record is compared with "PAR_X" of each of the records of the function structure information 121, information indicating that it is an input parameter ("PAR_X" in the drawing) is stored in the "DEP" field. On the other hand, when the value of the "PARAMETER" field of the terminal end record is compared with "PAR_Y" of each of the records of the function structure information 121, information indicating that it is an output parameter ("PAR_Y" in the drawing) is stored in the "DEP" field.

An identifier (the value of the "ID" field) of the record extracted in Step S508 is stored in the "ID" field. In the "TRACE" field, information indicating the search for the route from the starting end record to the terminal end record in Step S505 is stored.

In the example of FIG. 12, when the device variable to be analyzed is "D1," in Step S503, the first record is extracted as the starting end record. In Step S505, the second record is extracted as the terminal end record. Accordingly, in Step S508, the second record (the record in which the "ID" is "2") of the function structure information 121 illustrated by FIG. 14A is extracted. As a result, in Step S509, the first record (the record in which the "DEVICE" is "D1") of FIG. 14B can be obtained as the result in which the dependency relation is identified and the information of the search route of the record.

Further, for example, when the device variable to be analyzed is "D2," in Step S503, the third record is extracted as the starting end record. In Step S505, the fourth record is extracted as the terminal end record. Accordingly, in Step S508, each of the first to third records (each of the records in which the "ID" is "1" to "3") of the function structure information 121 illustrated by FIG. 14A is extracted. As a result, in Step S509, the second to fourth records (each of the records in which the "DEVICE" is "D2") of FIG. 14B are obtained as the result in which the dependency relation is identified and the information of the search route of the record.

When the dependency relation of the target parameter is identified and the save of the result in which the dependency relation is identified and the information of the search result of the record is completed, the control part 11 proceeds to next Step S510.

(Step S510)

In Step S510, the control part 11 determines whether or not the processing of Step S504 and subsequent steps thereof is completed for all the starting end records listed in Step S503. When the starting end record which has not performed the processing of Step S504 and subsequent steps thereof remains in the list, the control part 11 determines that the processing of Step S504 and subsequent steps thereof has not yet ended for all the listed starting end records. In this case, the control part 11 returns the processing to Step S504, picks up another starting end record remaining in the list as the starting end record to be processed, and repeats the processing of Step S505 and subsequent steps thereof. On the other hand, otherwise, the control part 11 determines that the processing has ended for all the starting end records listed, and proceeds to next Step S511.

(Step S511)

In Step S511, the control part 11 determines whether or not the processing of Step S502 and subsequent steps thereof has ended for all the device variables listed in Step S501. When a device variable which has not been processed in Step S502 and subsequent steps thereof remains in the list, the control part 11 determines that the processing of Step S502 and subsequent steps thereof has not yet ended for all the listed device variables. In this case, the control part 11 returns the processing to Step S502, picks up another device variable remaining in the list as the device variable to be analyzed, and repeats the processing of Step S503 and subsequent steps thereof. On the other hand, otherwise, the control part 11 determines that the processing has ended for all the listed device variables, and proceeds to next Step S512.

(Step S512)

In Step S512, the control part 11 identifies the dependency relations between all the device variables based on the recognition result of the dependency relation in Step S507 and the result in which the dependency relation with the parameter is identified in Step S509.

Figures 15, 16:
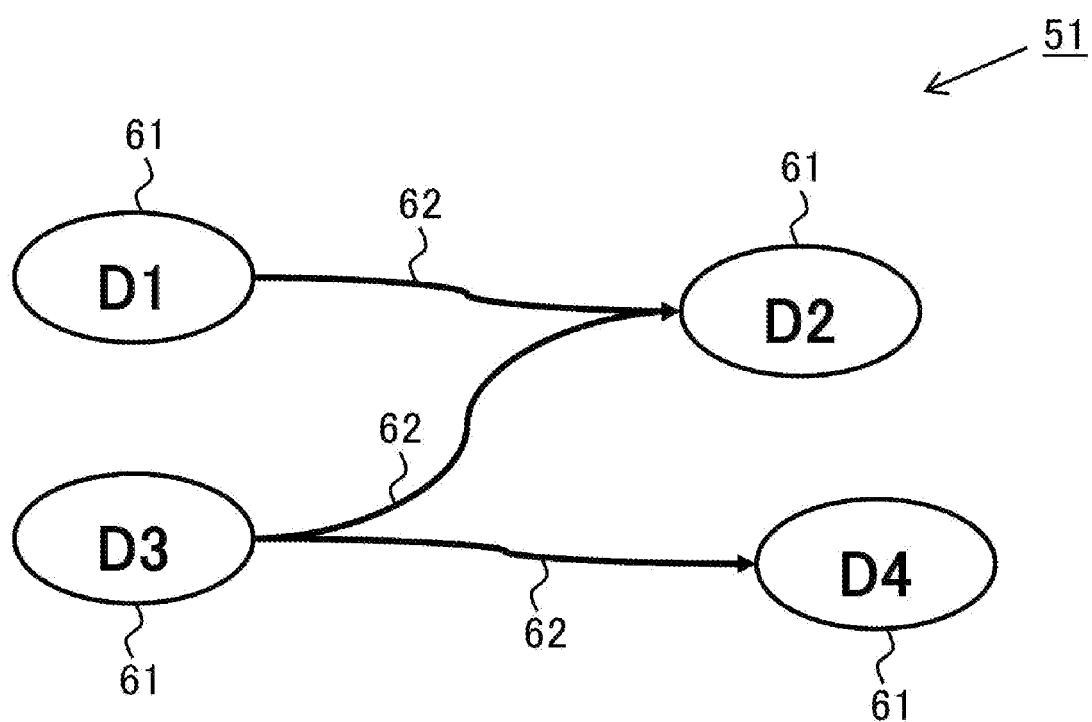
FIG. 15 illustrates an example of identification result data showing the dependency relation between the device variables identified by the analysis device according to the embodiment.
FIG. 16 illustrates an example of a directed graph generated by the analysis device according to the embodiment based on a result in which the dependency relation is identified.

FIG. 15 illustrates an example of identification result data 227 indicating the result in which the dependency relation between device variables is identified by the analysis device 1 according to the present embodiment. In the example of FIG. 15, the identification result data 227 is represented by an adjacency matrix, and an element (a component) corresponding to a set of device variables having the dependency relation with each other is "1," and the other element (a component) is "0." A column indicates a dependency source and a row indicates a dependency destination. However, the configuration of the identification result data 227 may not be limited to such an example, and may be appropriately determined according to the embodiment.

The recognition result in Step S507 indicates that the device variable corresponding to the starting end record and another device variable corresponding to the terminal end record have the dependency relation. Therefore, the control part 11 identifies the dependency relation between the device variables using the recognition result in Step S507 as it is. Specifically, the control part 11 sets the element corresponding to the set of device variables recognized as having the dependency relation with each other in Step S507 to "1."

On the other hand, the identification result in Step S509 indicates the dependency relation of each of the device variable on the parameter of the instance of the standard function, and the dependency relation between the input and the output in the standard function. Therefore, the control part 11 recognizes that one device variable having the dependency relation with an input parameter in any one of the standard functions used in the control program 221 has the dependency relation with another device variable having the dependency relation with the output parameter of the standard function having the dependency relation with the input parameter with reference to the intermediate data 226.

Specifically, the control part 11 extracts from the intermediate data 226 a combination of the records in which the values of the "INSTANCE" and "ID" fields match. It is assumed that a value of the "DEP" field of one record in the extracted combinations is "PAR_X" and a value of the "DEP" field of the other record is "PAR_Y." In this case, the control part 11 recognizes that there is the dependency relation from the device variable indicated by the "DEVICE" field of one record to the device variable indicated by the "DEVICE" field of the other record. Then, the control part 11 sets the element corresponding to the set of device variables recognized to have the dependency relation to "1."

In the example of FIG. 14B, it can be recognized by the first record and the third record that there is the dependency relation from the device variable "D1" to the device variable "D2." Similarly, it can be recognized by the second record and the fifth record that there is the dependency relation from the device variable "D3" to the device variable "D2." It can be recognized by the sixth record and the eighth record that there is the dependency from the device variable "D3" to the device variable "D4." Therefore, in the identification result data 227 illustrated in FIG. 15, an element in the first row and second column, an element in the third row and second column, and an element in the third row and fourth column corresponding to each of them are "1," and the other elements are "0."

When the dependency relations between all the device variables are identified in this way and the generation of the identification result data 227 is completed, the control part 11 ends the processing for identifying the dependency relations between the device variables 31. Thus, when the series of processing of Steps S106 and S107 is completed, the control part 11 proceeds to next Step S108.

[Step S108 and Step S109]

In Step S108, the control part 11 operates as the graph generation part 117, and generates a directed graph showing the dependency relation between the identified device variables 31 based on the result in which the dependency relation is identified. In Step S109, the control part 11 operates as the output part 118, and outputs the generated directed graph to the display device 15 as information regarding the result in which the dependency relation between the device variables 31 is identified. In the present embodiment, the control part 11 generates a directed graph in any one of the following first to tenth modes, and outputs the generated directed graph to the display device 15.

(1) First Mode

An example of the directed graph of the first mode will be described with reference to FIG. 16. FIG. 16 schematically illustrates an example of a directed graph 51 of the first mode generated by the analysis device 1 according to the present embodiment. The first mode is the simplest mode which indicates the dependency relation between the device variables. The directed graph 51 of the first mode includes a plurality of nodes 61 which represents each of the device variables 31 and one or more edges 62 which represent having the dependency relation. The node 61 is an example of the "first node" of the present invention.

The control part 11 generates the directed graph 51 based on the result in which the dependency relation is identified in Step S108. Specifically, the control part 11 generates the directed graph 51 of the first mode with reference to the identification result data 227. In the example of FIG. 15, the identification result data 227 indicates that the four device variables D1 to D4 have the dependency relation from D1 to D2, from D3 to D2, and from D3 to D4. Therefore, in the example of FIG. 16, the directed graph 51 includes four nodes 61 corresponding to the four device variables D1 to D4. An edge 62 extends from the node 61 of "D1" to the node 61 of "D2." An edge 62 extends from the node 61 of "D3" to the node 61 of "D2." An edge 62 extends from the node 61 of "D3" to the node 61 of "D4."

In Step S109, the control part 11 outputs the directed graph 51 generated in this way to the display device 15. According to the directed graph 51, the dependency relation between the devices 28 constituting the production line 27 can be simply shown through the expression of each of the device variables 31. Therefore, it is possible to accurately show the dependency relation between the devices 28 to a user while a consumption of a display region of the display device 15 is curbed.

(2) Second Mode

Figure 17A:
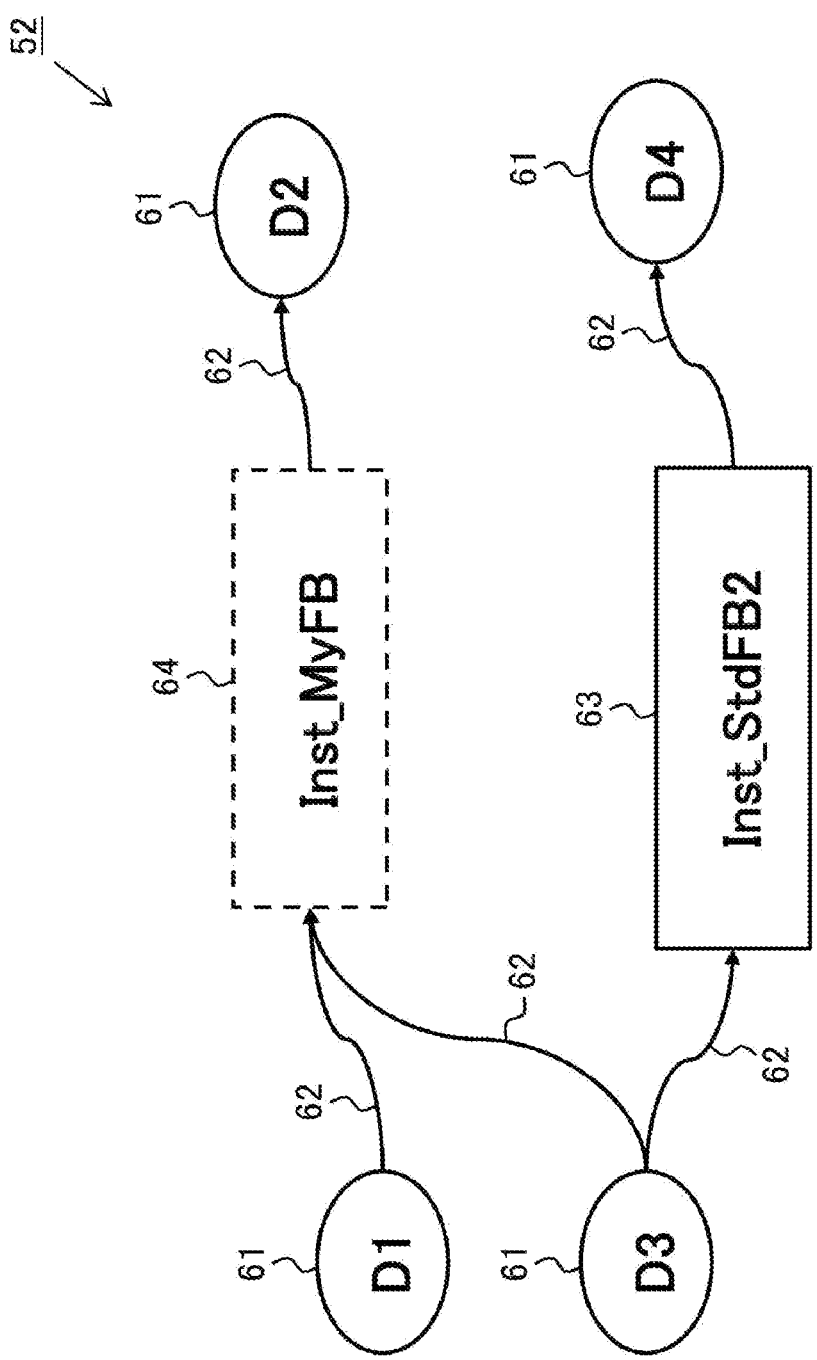
FIG. 17A illustrates an example of the directed graph generated by the analysis device according to the embodiment based on the result in which the dependency relation is identified.

Next, an example of a directed graph of the second mode will be described with reference to FIG. 17A. FIG. 17A schematically illustrates an example of a directed graph 52 of the second mode generated by the analysis device 1 according to the present embodiment. The second mode is a mode which further indicates a function.

In the second mode, the directed graph 52 is generated to further include one or more blocks (63 and 64) representing the instance of the function, in addition to the plurality of nodes 61 and the one or more edges 62. Each of the blocks (63 and 64) is connected via the edge 62 to the node 61 representing a device variable having the dependency relation with the input parameter or the output parameter in the instance of the represented function.

The control part 11 generates the directed graph 52 based on the result in which the dependency relation is identified in Step S108. Specifically, the control part 11 retroactively refers to the intermediate data 226 and the extraction result data 224 from the identification result data 227. For example, the dependency relation between the device variable "D1" and the device variable "D2" is derived from the first and third records of the intermediate data 226. Further, the first and third records of the intermediate data 226 are derived from the first to fourth records of the extraction result data 224. Information indicating a corresponding relation between the intermediate data 226 and the extraction result data 224 is stored in the "TRACE" field of the intermediate data 226. The control part 11 refers to the intermediate data 226 retroactively from the identification result data 227, and refers to the extraction result data 224 retroactively from the intermediate data 226 based on the value in the "TRACE" field of the corresponding record.

From the corresponding record of the extraction result data 224, the control part 11 can identify that the instance "Inst_MyFB" of the user-defined function is interposed between the device variable "D1" and the device variable "D2." Similarly, from the corresponding record of the extraction result data 224, the control part 11 can identify that the instance "Inst_MyFB" of the user-defined function is interposed between the device variable "D3" and the device variable "D2," and the instance "Inst_StdFB2" of the standard function is interposed between the device variable "D3" and the device variable "D4." The control part 11 generates the directed graph 52 of the second mode based on the reference results.

In Step S109, the control part 11 outputs the directed graph 52 generated in this way to the display device 15. According to the directed graph 52, the dependency relation between the device variables 31 in the control program 221 and the dependency relation of each of the device variable 31 on each of the parameters of the function can be shown in association with each other. Therefore, the dependency relation of each of the device variables 31 on each of the parameters of the function can be understood in association with the dependency relation between the device variables 31.

In the above example, the standard function "Std_FB1" is used inside the user-defined function "My_FB." The control part 11 can identify the relation of each of the functions from the corresponding record of the extraction result data 224. For example, the second record of the extraction result data 224 is dependent on the first record, as shown by the value in the "PARENT" field. The first record shows that the device variable "D1" has the dependency relation with the input parameter "Arg1" of the instance "Inst_MyFB" of the user-defined function "My_FB." The second record shows that the "Arg1" has the dependency relation with the input parameter "Input1" of the instance "Inst_StdFB1" of the standard function "Std_FB1." The control part 11 can identify a nesting relation of each of the functions from the corresponding record of the extraction result data 224. In this second mode, the control part 11 generates the directed graph 52 to indicate the most externally used function. Therefore, in the example of FIG. 17A, the control part 11 selects the instance "Inst_MyFB" of the user-defined function and generates the directed graph 52 including the block 64 corresponding to the selected instance "Inst_MyFB."

Here, in the above example, the control program 221 includes the instance "Inst_MyFB" of the user-defined function in addition to the instance "Inst_StdFB2" of the standard function. As described above, a plurality of instructions in the control program 221 may include instances of a plurality of functions, and the instances of the plurality of functions may include instances of one or more user-defined functions different from the standard function in addition to the instances of one or more standard functions. The user-defined function is defined by the user in the control program 221. In this case, the directed graph may be generated so that, among the plurality of blocks representing each of the functions, a first block which represents the instance of the standard function among the instances of the plurality of functions is shown in a first form, and a second block which represents the instance of the user-defined function is shown in a second form different from the first form.

In the example of FIG. 17A, the block 63 which represents the instance "Inst_StdFB2" of the standard function is an example of the first block, and the block 64 which represents the instance "Inst_MyFB" of the user-defined function is an example of the second block. Further, in the example of FIG. 17A, a solid line representing the block 63 is an example of the first form, and a dotted line representing the block 64 is an example of the second form. A method of representing each of the blocks (63 and 64) in a different form is not limited to the method according to the type of line, and may be appropriately selected according to the embodiment. For example, the form of each of the blocks (63 and 64) may be defined by attributes such as colors, shapes, and character fonts, in addition to the type of line illustrated in FIG. 17A. Further, a symbol corresponding to each of the blocks (63 and 64) may be defined, and each of the defined symbols may be used for displaying each of the blocks (63 and 64).

As described above, the directed graph 52 may be generated to show the block 63 representing the instance of the standard function and the block 64 representing the instance of the user-defined function in different forms. However, the method of representing each of the blocks (63 and 64) of the function may not be limited to such an example. The block 63 which represents the instance of the standard function and the block 64 which represents the instance of the user-defined function may be shown in the same form.

(3) Third Mode

Figure 17B:
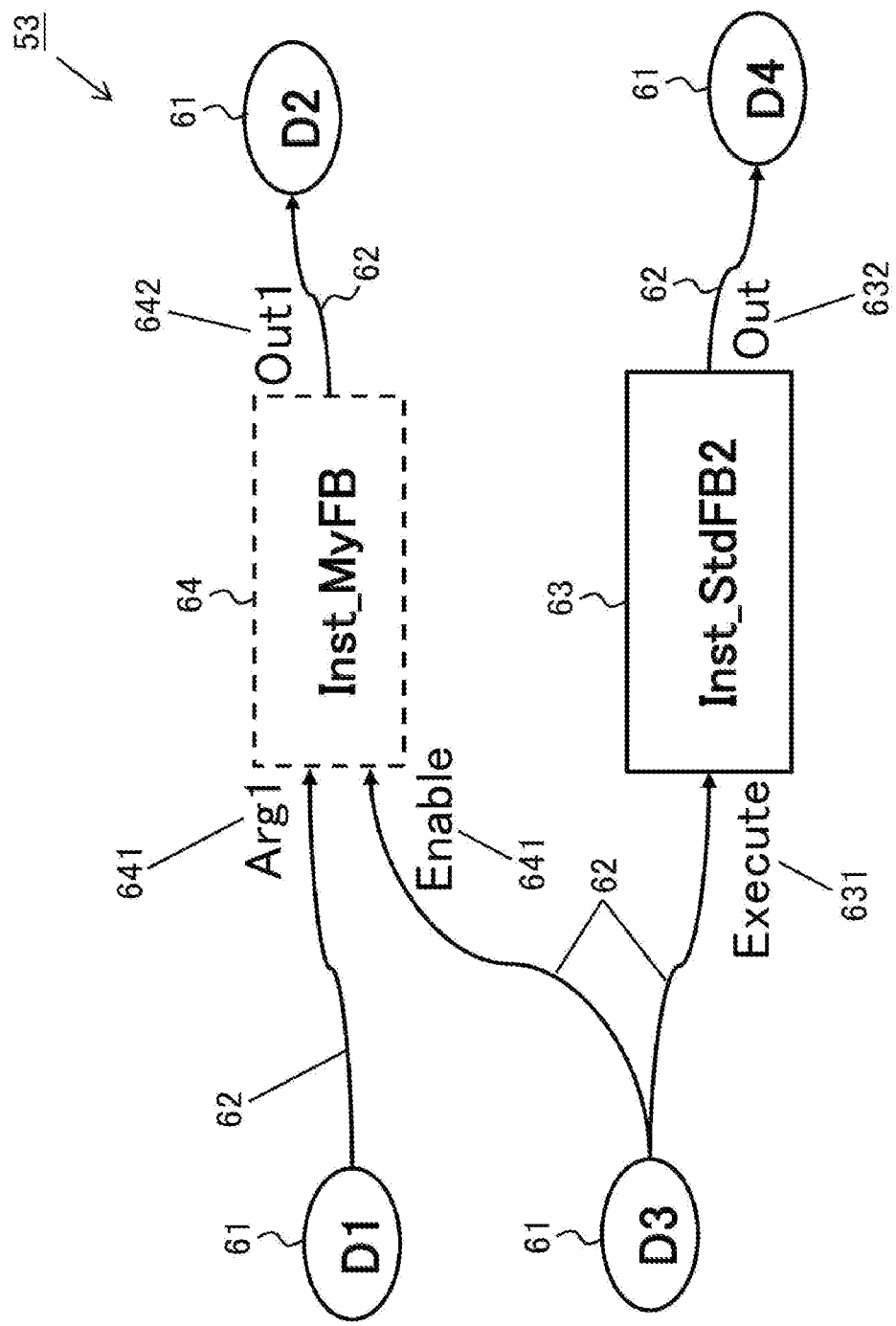
FIG. 17B illustrates an example of the directed graph generated by the analysis device according to the embodiment based on the result in which the dependency relation is identified.

Next, an example of a directed graph of the third mode will be described with reference to FIG. 17B. FIG. 17B schematically illustrates an example of a directed graph 53 of the third mode generated by the analysis device 1 according to the present embodiment. The third mode is a mode in which each of the parameters of the function is distinguished and shown.

In the second mode, the directed graph 52 has a display form in which the node 61 representing the device variable 31 having the dependency relation is connected to the blocks (63 and 64) via the edge 62 without showing the names of the input parameters and the output parameters in the instance of the represented function. On the other hand, in the third mode, the directed graph 53 is generated to distinguish each of the input parameters and the output parameters in the instance of the function to be represented, to connect the blocks (63 and 64) to the node 61 representing the device variable 31 having the dependency relation via the edge 62, and to have a display form indicating the name of the corresponding input parameter or output parameter in the vicinity of the edge 62.

The control part 11 generates the directed graph 53 based on the result in which the dependency relation is identified in Step S108. Specifically, as in the second mode, the control part 11 retroactively refers to the intermediate data 226 and the extraction result data 224 from the identification result data 227. The control part 11 identifies each of the device variables 31 which have the dependency relation with each of the parameters of the function based on the corresponding record of the extraction result data 224. The control part 11 can obtain the name of each of the parameters from the "PARAMETER" field of each of the records of the extraction result data 224. In this third mode, the control part 11 disposes a notation of the name of each of the parameters identified from the "PARAMETER" field at a corresponding portion of each of the blocks.

In the above-described example, the device variable "D1" has the dependency relation with the input parameter "Arg1" in the instance "Inst_MyFB" of the user-defined function, and the device variable "D3" has the dependency relation with the input parameter "Enable." The control part 11 distinguishes between the edge 62 extending from the node 61 representing the device variable "D1" and the edge 62 extending from the node 61 representing the device variable "D3," and connects to the block 64 representing the instance "Inst_MyFB" of the user-defined function. Then, the control part 11 disposes a notation 641 of the name of each of the input parameters in the vicinity of each of the edges 62.

The control part 11 disposes a notation 642 of the name of the output parameter having the dependency relation with the device variable "D2" in the vicinity of the edge 62 which connects the device variable "D2" to the block 64 by the same processing. The control part 11 disposes a notation 631 of the name of the input parameter having the dependency relation with the device variable "D3" in the vicinity of the edge 62 which connects the device variable "D3" to the block 63. The control part 11 disposes a notation 632 of the name of the output parameter having the dependency relation with the device variable "D4" in the vicinity of the edge 62 which connects the device variable "D4" to the block 63. Thus, the control part 11 can generate the directed graph 53 of the third mode.

In Step S109, the control part 11 outputs the directed graph 53 generated in this way to the display device 15. According to the directed graph 53, it becomes possible to distinguish the parameters of the function on which each of the device variables 31 has the dependency relation. Therefore, the dependency relation of each of the device variables 31 on each of the parameters of the function can be more clearly shown in association with the dependency relation between the device variables 31.

Also in this third mode, as in the second mode, the directed graph 53 may be generated so that the block 63 representing the instance of the standard function and the block 64 representing the instance of the user-defined function are shown in different forms. In the example of FIG. 17B, each of the blocks (63 and 64) is shown in the same form as that in FIG. 17A. However, a method of representing each of the blocks (63 and 64) of the function in the third mode may not be limited to such an example. Also in this third mode, the block 63 representing the instance of the standard function and the block 64 representing the instance of the user-defined function may be shown in the same form as that in the second mode.

(4) Fourth Mode

Figure 17C:
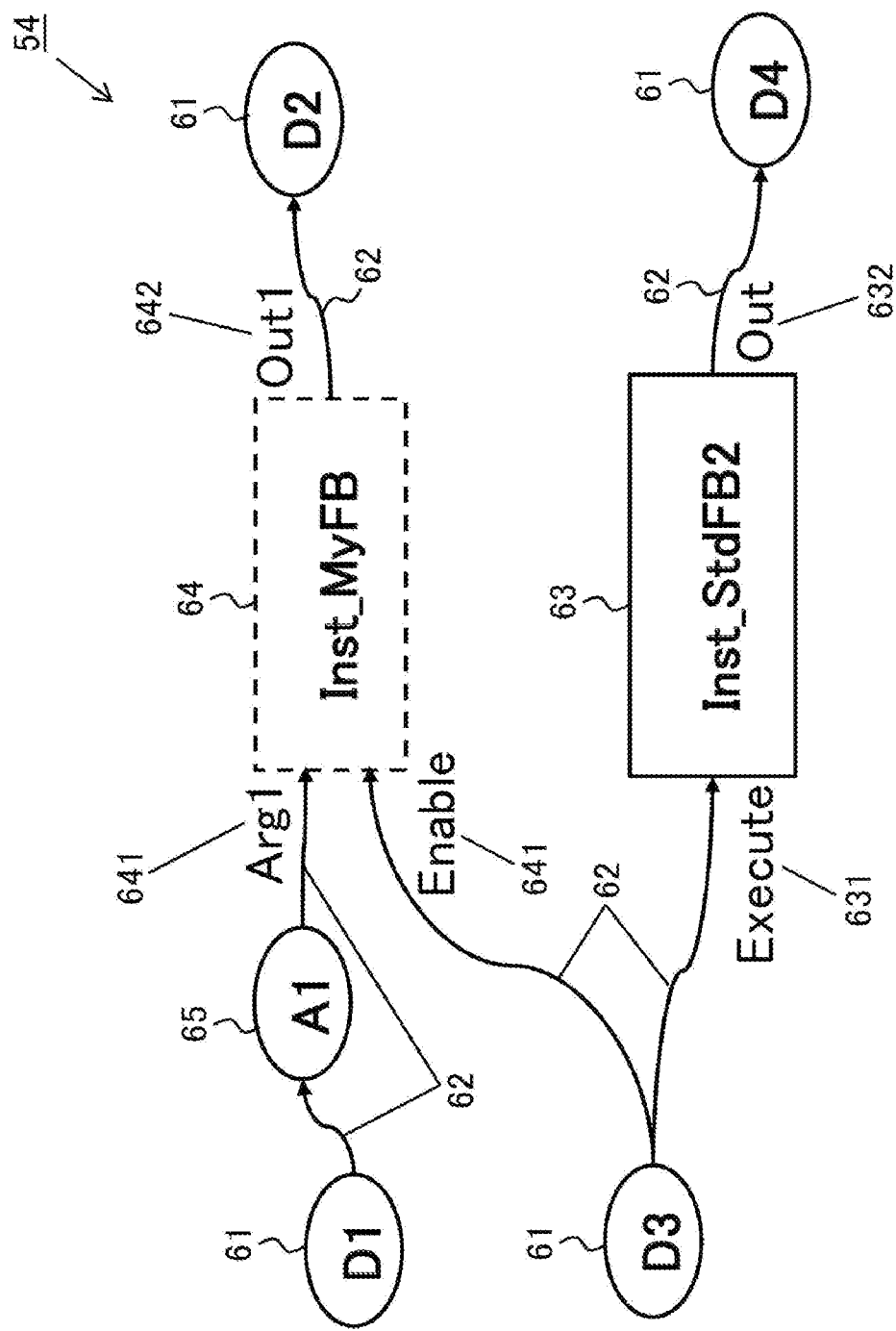
FIG. 17C illustrates an example of the directed graph generated by the analysis device according to the embodiment based on the result in which the dependency relation is identified.

Next, an example of a directed graph of the fourth mode will be described with reference to FIG. 17C. FIG. 17C schematically illustrates an example of a directed graph 54 of the fourth mode generated by the analysis device 1 according to the present embodiment. The fourth mode indicates another variable used outside the function as another variable different from the device variable.

In the above-described example, the control program 221 includes another variable "A1" which is different from each of the device variables 31, and the other variable "A1" is used between the device variable "D1" and the input parameter "Arg1" in the instance of the function. As described above, the plurality of variables in the control program 221 may include one or more other variables which are different from each of the device variables 31 and are used between any one of the plurality of device variables 31 and the input parameter or output parameter of any function. In this case, the directed graph 54 of the fourth mode is generated to include one or more nodes 65 representing one or more other variables, which are disposed between the node 61 representing one of the plurality of device variables 31 and the blocks (63 and 64) representing the function and are respectively connected via the edge 62. The node 65 is an example of the "second node" of the present invention.

The control part 11 generates the directed graph 53 based on the result in which the dependency relation is identified in Step S108. Specifically, as in the second mode and the third mode, the control part 11 retroactively refers to the intermediate data 226 and the extraction result data 224 from the identification result data 227. The control part 11 can identify other variables used between the device variable and each of the parameters of the function from the "VARIABLE" field of each of the records of the extraction result data 224. In this fourth mode, the control part 11 disposes the nodes 65 representing other variables identified from the "VARIABLE" field at corresponding locations.

In the above-described example, the control part 11 can identify that another variable "A1" is interposed between the device variable "D1" and the input parameter "Arg1" of the user-defined function instance "Inst_MyFB" from the first record of the extraction result data 224. Based on this reference result, the control part 11 disposes the node 65 representing another variable "A1" between the node 61 representing the device variable "D1" and the block 64 representing the instance "Inst_MyFB" of the user-defined function. Then, the control part 11 connects the node 65, the node 61, and the block 64 with the edge 62. The control part 11 determines a direction of each of the edges 62 connected to the node 65 based on a value of the "DIRECTION" field of each of the records of the extraction result data 224. Thus, the control part 11 can generate the directed graph 54 of the fourth mode.

In Step S109, the control part 11 outputs the directed graph 54 generated in this way to the display device 15. According to the directed graph 54, not only each of the device variables 31 but also other variables used in the control program 221 can be represented. Therefore, when another variable is interposed between the device variables 31, the dependency relation with the other variable can be shown in association with the dependency relation between the device variables 31.

Figure 17D:
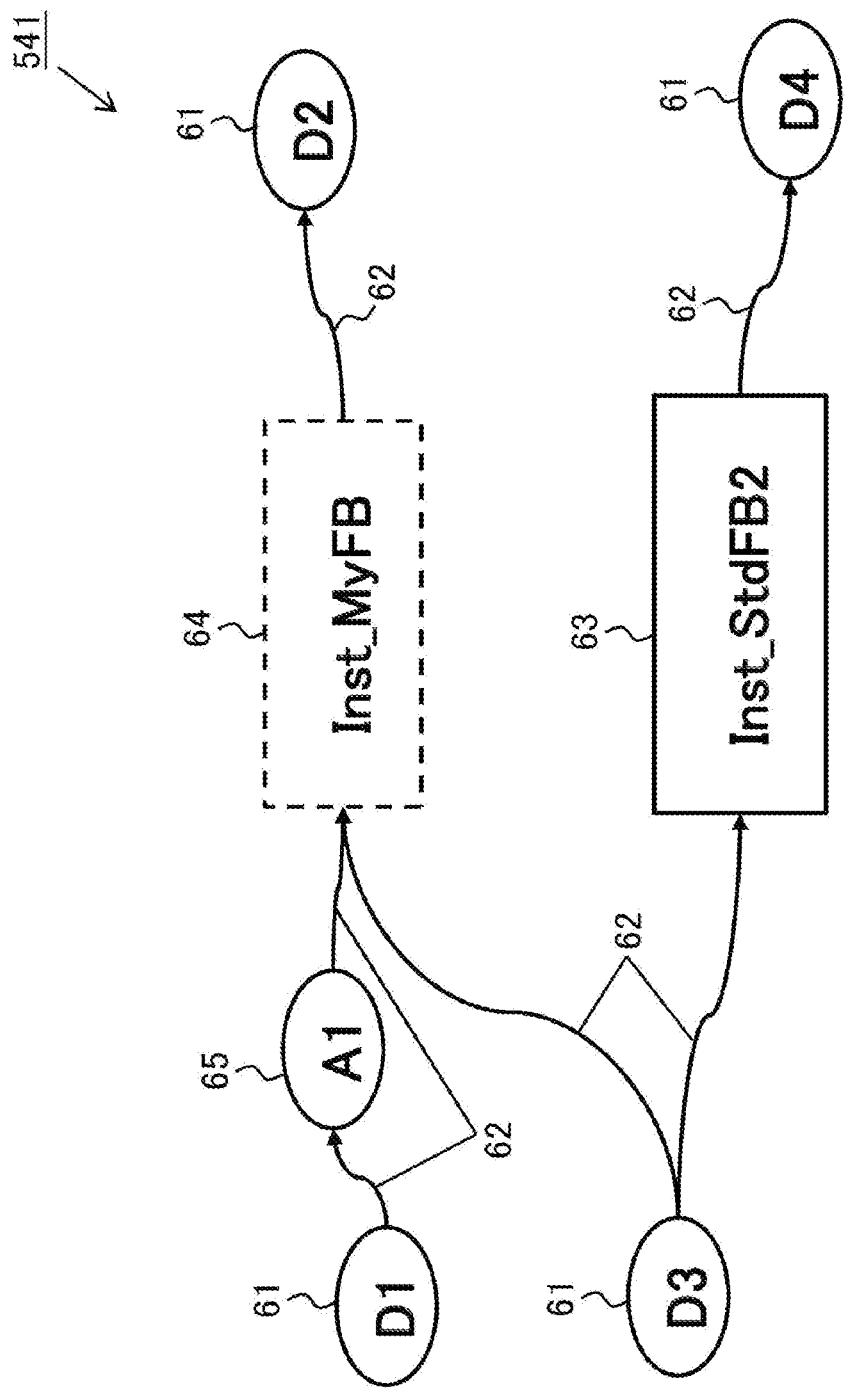
FIG. 17D illustrates an example of the directed graph generated by the analysis device according to the embodiment based on the result in which the dependency relation is identified.

Here, an example of a different display form of the directed graph of the fourth mode will be described with reference to FIG. 17D. FIG. 17D schematically illustrates an example of a directed graph 541 of the fourth mode generated by the analysis device 1 according to the present embodiment in a display form different from that of FIG. 17C. In the example of FIG. 17C, the directed graph 54 is generated in a display form indicating the names of the input parameters and the output parameters in the instance of the function by each of notations (631, 632, 641, and 642) as in the third mode. On the other hand, the directed graph 541 illustrated in FIG. 17D is generated in a representation form in which the names of the input parameters and the output parameters in the instance of the function are not shown, as in the second mode. Except for this point, the directed graph 541 is generated in the same manner as the directed graph 54. As described above, the display form of the directed graph of the fourth mode is not limited to the display form of the third mode, and may be appropriately selected according to the embodiment.

Further, also in the fourth mode, as in the second mode and the third mode, each of the directed graphs (54 and 541) may be generated to represent the block 63 representing the instance of the standard function and the block 64 representing the instance of the user-defined function in different forms. In the examples of FIGS. 17C and 17D, each of the blocks (63 and 64) is shown in the same manner as in FIG. 17A. However, a method of representing each of the blocks (63 and 64) of the function in the fourth mode may not be limited to such an example. Also, in the fourth mode, as in the second mode and the third mode, the block 63 representing the instance of the standard function and the block 64 representing the instance of the user-defined function may be shown in the same form.

(5) Fifth Mode

Figure 18A:
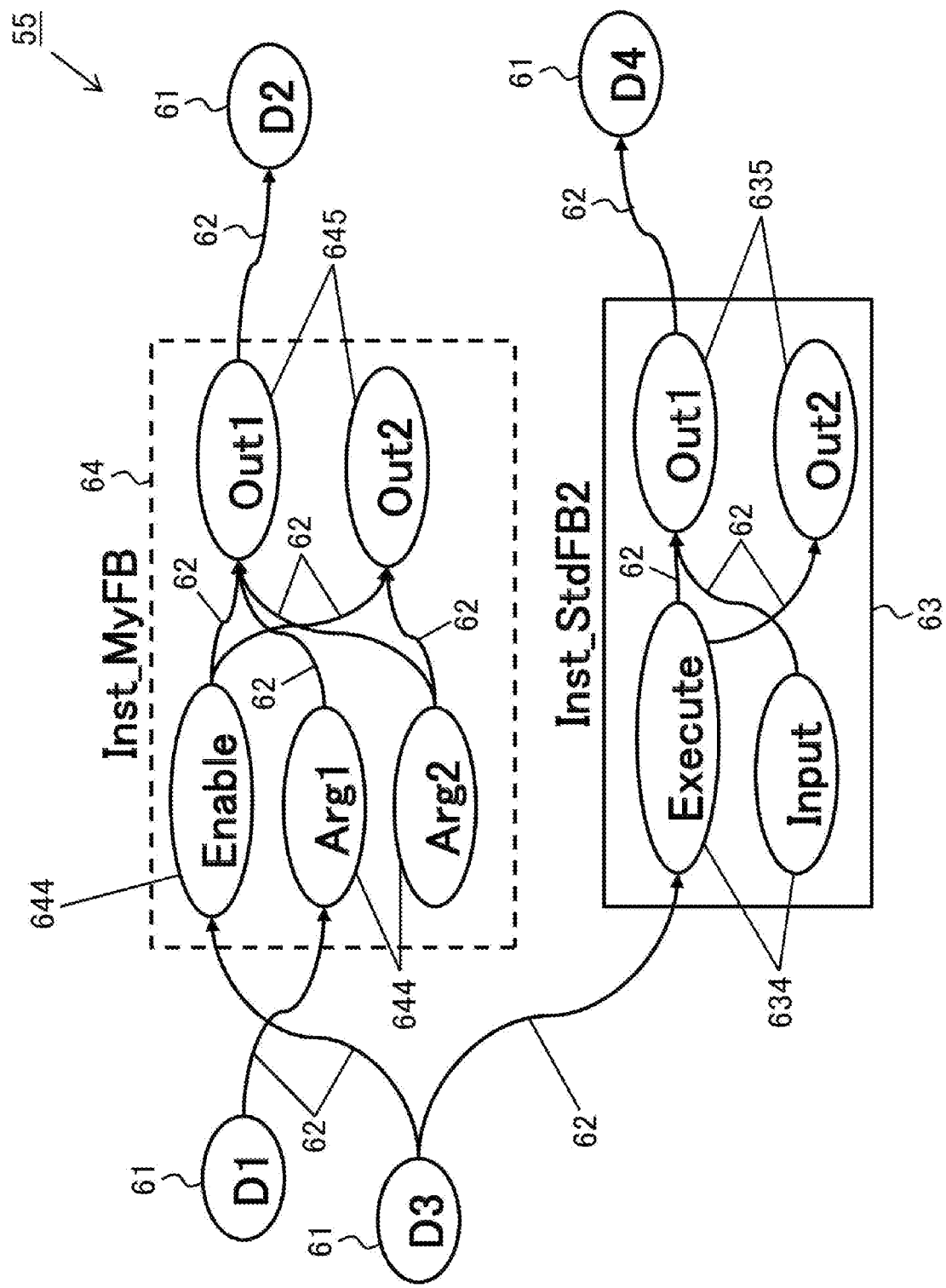
FIG. 18A illustrates an example of the directed graph generated by the analysis device according to the embodiment based on the result in which the dependency relation is identified.

Next, an example of a directed graph of the fifth mode will be described with reference to FIG. 18A. FIG. 18A schematically illustrates an example of a directed graph 55 of the fifth mode generated by the analysis device 1 according to the present embodiment. The fifth mode is a mode which shows the internal structure of the function.

In the fifth mode, the directed graph 55 is generated to further include a plurality of nodes (634, 635, 644, and 645) representing each of the input parameters and the output parameters in the instance of the function represented and disposed within the blocks (63 and 64), in addition to the plurality of nodes 61, one or more edges 62, and the blocks (63 and 64). Each of the nodes (634, 635, 644, and 645) is connected via the edge 62 to the node 61 representing the device variable 31 having the dependency relation with each of the represented input parameters and output parameters. Further, the nodes (634 and 635) (644 and 645) representing the input parameters and the output parameters having the dependency relation with each other in the represented function are connected via the edge 62. Each of the nodes (634, 635, 644, and 645) is an example of the "third node" of the present invention.

The control part 11 generates the directed graph 55 based on the result in which the dependency relation is identified in Step S108. Specifically, as in the second to fourth modes, the control part 11 retroactively refers to the intermediate data 226 and the extraction result data 224 from the identification result data 227. As in the third mode, the control part 11 identifies each of the device variables 31 having the dependency relation with each of the parameters of the function based on the corresponding record of the extraction result data 224. The control part 11 determines a combination of each of the nodes 61 connected by the edge 62 and each of the nodes (634, 635, 644, and 645) based on the identification result.

Further, the control part 11 disposes the node 634 representing the input parameter and the node 635 representing the output parameter in the block 63 representing the instance of the standard function. Then, the control part 11 identifies the dependency relation between the input parameter and the output parameter in the instance of the standard function with reference to the function structure information 121 (and the additional function structure information 123). In the above-described example, for example, the control part 11 can identify the dependency relation between the input parameter and the output parameter in the instance "Inst_StdFB2" of the standard function with reference to the fourth to sixth records of the function structure information 121. The control part 11 determines a combination of the node 634 and the node 635 connected by the edge 62 based on the identification result.

Further, the control part 11 disposes the node 644 representing the input parameter and the node 645 representing the output parameter in the block 64 representing the instance of the user-defined function. The dependency relation between the input parameter and the output parameter in the instance of the user-defined function may be identified as appropriate. For example, the control part 11 may identify the dependency relation between the input parameter and the output parameter in the instance of the user-defined function based on the corresponding record of the extraction result data 224. Further, for example, the control part 11 may identify the dependency relation between the input parameter and the output parameter in the instance of the user-defined function by handling each of the parameters in the instance of the user-defined function in the same manner as the device variable 31 and performing the processing of Steps S102 to S107. The control part 11 determines a combination of the node 644 and the node 645 connected by the edge 62 based on the identification result. Thus, the control part 11 can generate the directed graph 55 of the fifth mode.

In Step S109, the control part 11 outputs the directed graph 55 generated in this way to the display device 15. According to the directed graph 55, the dependency relation between the device variables 31 in the control program 221 can be shown through the function by a graph representation including each of the nodes (634, 635, 644, and 645) representing each of the parameters. Therefore, the dependency relation between the device variables 31 via the function can be appropriately understood.

Also, in the fifth mode, as in the second to fourth modes, the directed graph 55 may be generated to show the block 63 representing the instance of the standard function and the block 64 representing the instance of the user-defined function in different forms. In the example of FIG. 18A, each of the blocks (63 and 64) is shown in the same manner as in FIG. 17A. However, the method of representing each of the blocks (63 and 64) of the function in the fifth mode may not be limited to such an example. Also, in the fifth mode, as in the second to fourth modes, the block 63 representing the instance of the standard function, and the block 64 representing the instance of the user-defined function may be shown in the same form.

(6) Sixth Mode

Figure 18B:
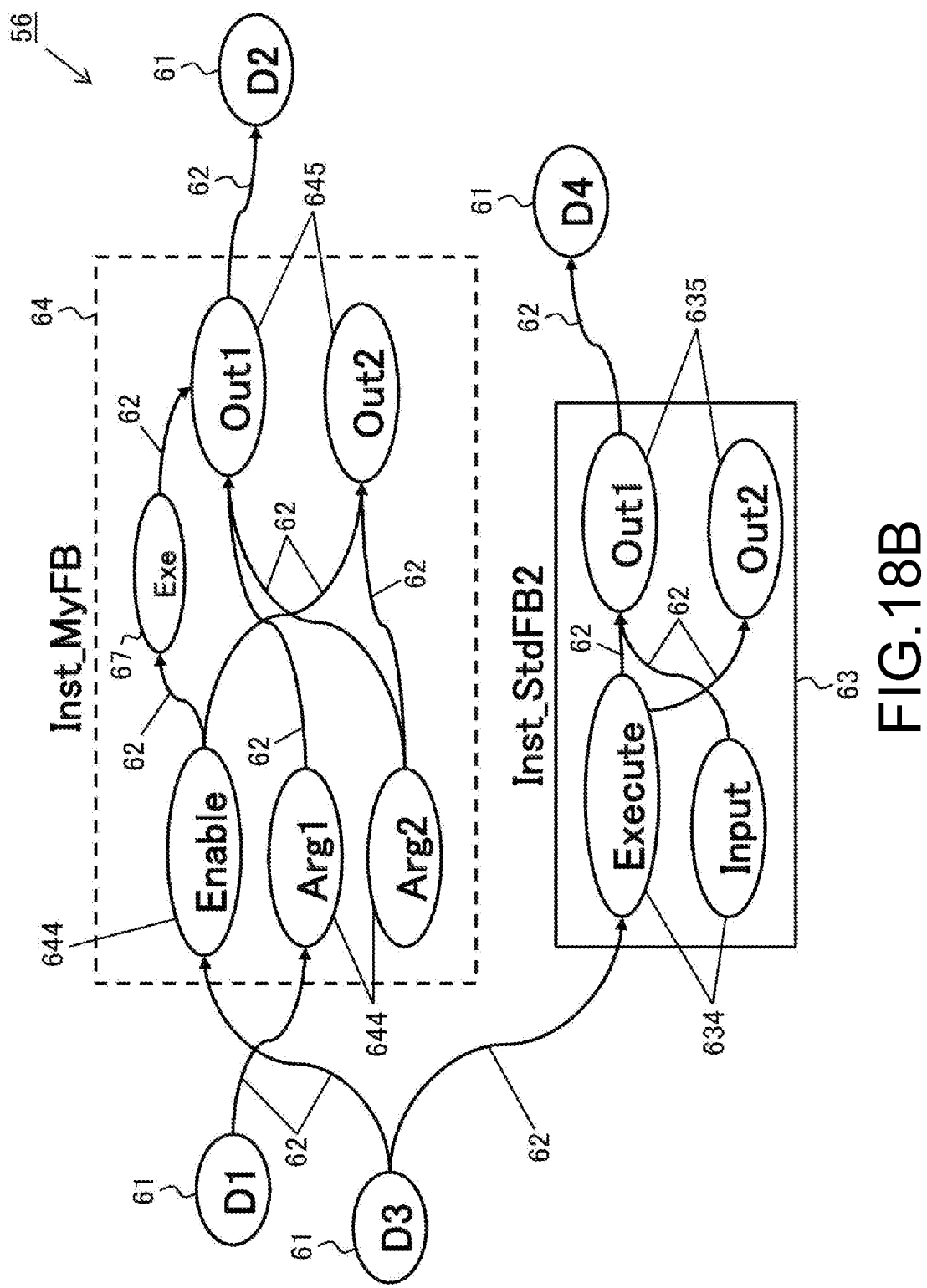
FIG. 18B illustrates an example of the directed graph generated by the analysis device according to the embodiment based on the result in which the dependency relation is identified.

Next, an example of a directed graph of the sixth mode will be described with reference to FIG. 18B. FIG. 18B schematically illustrates an example of a directed graph 56 of the sixth mode generated by the analysis device 1 according to the present embodiment. The sixth mode is a mode which indicates the variable used inside the user-defined function.

In the above example, the control program 221 includes a local variable "Exe" different from each of the device variables 31. This local variable "Exe" is used between an input parameter "Enable" and an output parameter "Out1," which have the dependency relation with each other, inside the user-defined function "My_FB." As described above, the plurality of variables in the control program 221 is one or more local variables different from each of the device variables 31, and may include one or more local variables which are used between the input parameter and the output parameter which have the dependency relation with each other within the user-defined function. In this case, the directed graph 56 of the sixth mode may be generated to further include one or more nodes 67 which represent one or more local variables, are disposed between the nodes (644 and 645) representing each of the input parameters and the output parameters which have the dependency relation with each other, and are connected via the edge 62 in the block 64 representing the instance of the user-defined function, in addition to the fifth mode. The node 67 is an example of the "fourth node" of the present invention.

In the processing of identifying the dependency relation of each of the device variables 31 on each of the parameters of the function, the presence of other variables used between each of the device variables 31 and each of the parameters of the function can be identified. Information indicating the results is stored in the "VARIABLE" field of each of the records of the extraction result data 224, and in the fourth mode, the control part 11 determines the arrangement of the nodes 65 representing other variables and the connection of the edges 62 using the information. Similarly, in the processing of identifying the dependency relation between the input parameter and the output parameter in the instance of the user-defined function, it is possible to identify the presence of the local variables used between the input parameter and the output parameter.

For example, in Step S108, the control part 11 may identify the dependency relation between the input parameter and the output parameter in the instance of the user-defined function in the same manner as in the fifth mode. In the process, the control part 11 identifies a location at which the local variable is used. The control part 11 disposes the node 67 representing the local variable in the block 64 using the identification result, and connects each of the nodes (644 and 645) representing each of the parameters having the dependency relation with the local variable to the node 67 by the edge 62. Thus, the control part 11 can generate the directed graph 56 of the sixth mode.

In Step S109, the control part 11 outputs the directed graph 56 generated in this way to the display device 15. According to the directed graph 56, the local variable used in the user-defined function can be represented. Therefore, the dependency relation between the device variables 31 in the control program 221 via the user-defined function can be shown in association with the internal structure of the user-defined function.

Further, also in the sixth mode, as in the second to fifth modes, the directed graph 56 may be generated to show the block 63 representing the instance of the standard function and the block 64 representing the instance of the user-defined function in different forms. In the example of FIG. 18B, each of the blocks (63 and 64) is shown in the same manner as in FIG. 17A. However, a method of representing each of the blocks (63 and 64) of the function in the sixth mode may not be limited to such an example. Also in the sixth mode, as in the second to fifth modes, the block 63 representing the instance of the standard function and the block 64 representing the instance of the user-defined function may be shown in the same form.

(7) Seventh Mode

Figure 18C:
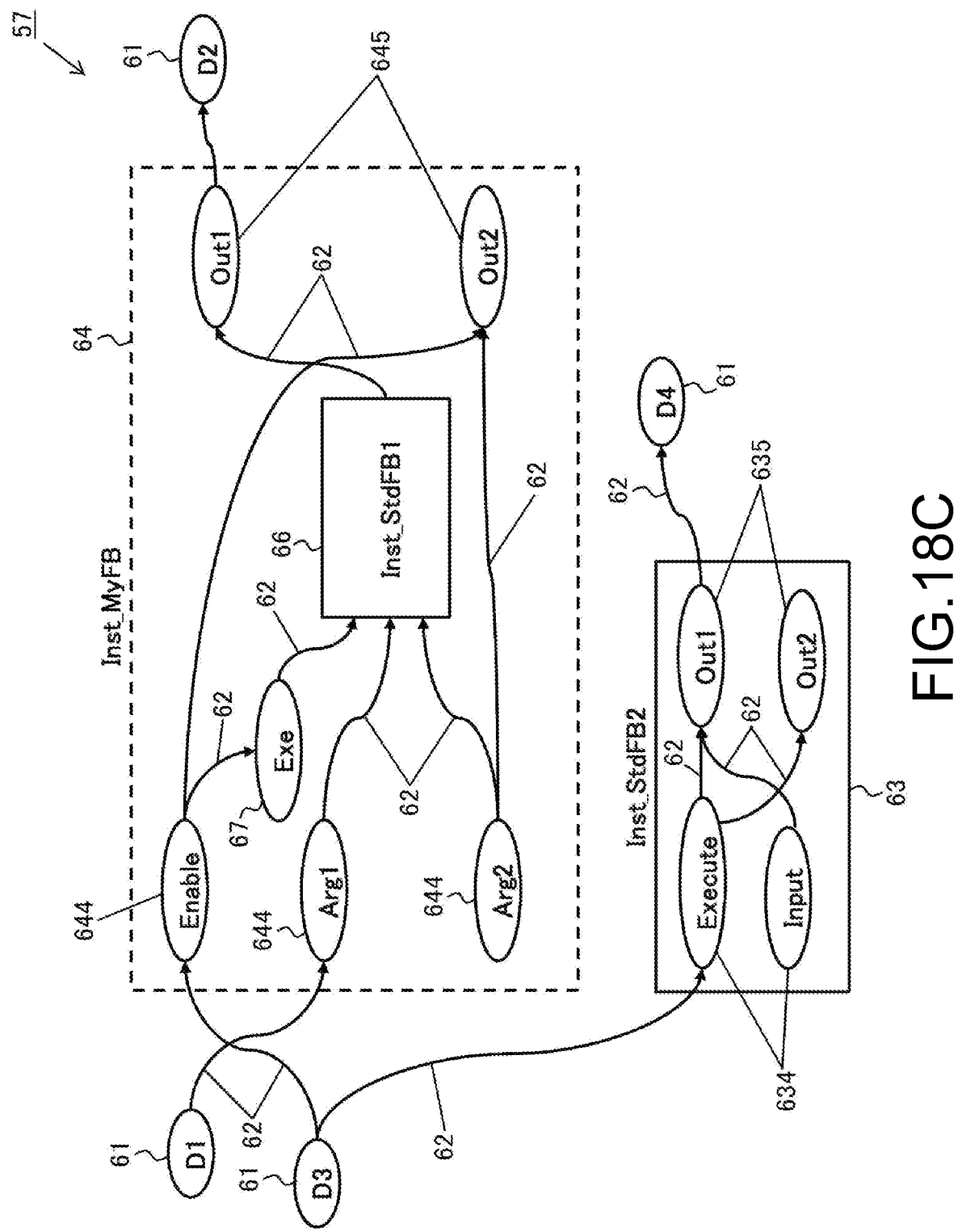
FIG. 18C illustrates an example of the directed graph generated by the analysis device according to the embodiment based on the result in which the dependency relation is identified.

Next, an example of a directed graph of the seventh mode will be described with reference to FIG. 18C. FIG. 18C schematically illustrates an example of a directed graph 57 of the seventh mode generated by the analysis device 1 according to the present embodiment. The seventh mode is a mode indicating the standard function used inside the user-defined function.

In the above-described example, the control program 221 includes the standard function "STD_FB1" used between the input parameters "Arg1" and "Exe" and the output parameter "Out1" which have the dependency relation with each other inside the user-defined function "My_FB." As described above, the instances of the plurality of functions in the control program 221 may include instances of one or more standard functions used between the input parameter and the output parameter having the dependency relation with each other inside the user-defined function. In this case, the directed graph 57 of the seventh mode is generated so that the blocks 66 which represent the instance of the standard function used inside the instance of the user-defined function are disposed between the nodes (644 and 645) which represent the input parameter and the output parameter having the dependency relation with each other and are connected via the edge 62 in the block 64 which represents the instance of the user-defined function. The block 66 is an example of the "first block" of the present invention.

In Step S108, similar to the local variables in the sixth mode, the control part 11 can identify the arrangement of the blocks 66 representing the instance of the standard function used inside the instance of the user-defined function and each of the nodes (644 and 645) connected to the block 66 via the edge 62. Further, the control part 11 can identify the arrangement of the block 66 and each of the nodes (644 and 645) connected to the block 66 via the edge 62 from the corresponding record of the extraction result data 224. The control part 11 disposes the block 66 representing the instance of the standard function in the block 64 using the identification results, and connects each of the nodes (644 and 645) representing each of the parameters having the dependency relation with each of the parameters of the instance of the standard function to the block 66 by the edge 62. Thus, the control part 11 can generate the directed graph 57 of the seventh mode.

In Step S109, the control part 11 outputs the directed graph 57 generated in this way to the display device 15. According to the directed graph 57, the standard function used in the user-defined function can be represented. Therefore, the dependency relation between the device variables 31 via the user-defined function in the control program 221 can be shown in association with the internal structure of the user-defined function.

In the example of FIG. 18C, the directed graph 57 is generated to include the node 67 representing the local variable, as in the sixth mode. As described above, the display form of the sixth mode may be adopted also in the display form of the seventh mode. However, the display form of the seventh mode may not be limited to such an example. In the display form of the seventh mode, the display form of the sixth mode may be omitted. From the directed graph 57 illustrated by FIG. 18C, the display of the node 67 may be omitted. In this case, the edge 62 is connected to the block 66 from the node 644 representing the input parameter "Enable."

Further, in the seventh mode, as in the second to sixth modes, the directed graph 57 may be generated to show the blocks (63 and 66) representing the instance of the standard function and the block 64 representing the instance of the user-defined function in different forms. In the example of FIG. 18C, each of the blocks (63, 64, and 66) is shown in the same manner as in FIG. 17A. However, a method of representing each of the block (63, 64, and 66) of the function in the seventh mode may not be limited to such an example. Also, in the seventh mode, as in the second to sixth modes, the blocks (63 and 66) representing the instance of the standard function and the block 64 representing the instance of the user-defined function may be shown in the same form.

Further, in the example of FIG. 18C, the block 63 is shown in the same form as in the fifth mode, and the block 66 is shown in the same form as that of the block 63 in the second mode and the like. However, a method of representing the block 66 in the seventh mode may not be limited to such an example. The block 66 may also be shown in the same form as that of the block 63 in the fifth mode.

(8) Eighth Mode

Figure 18D:
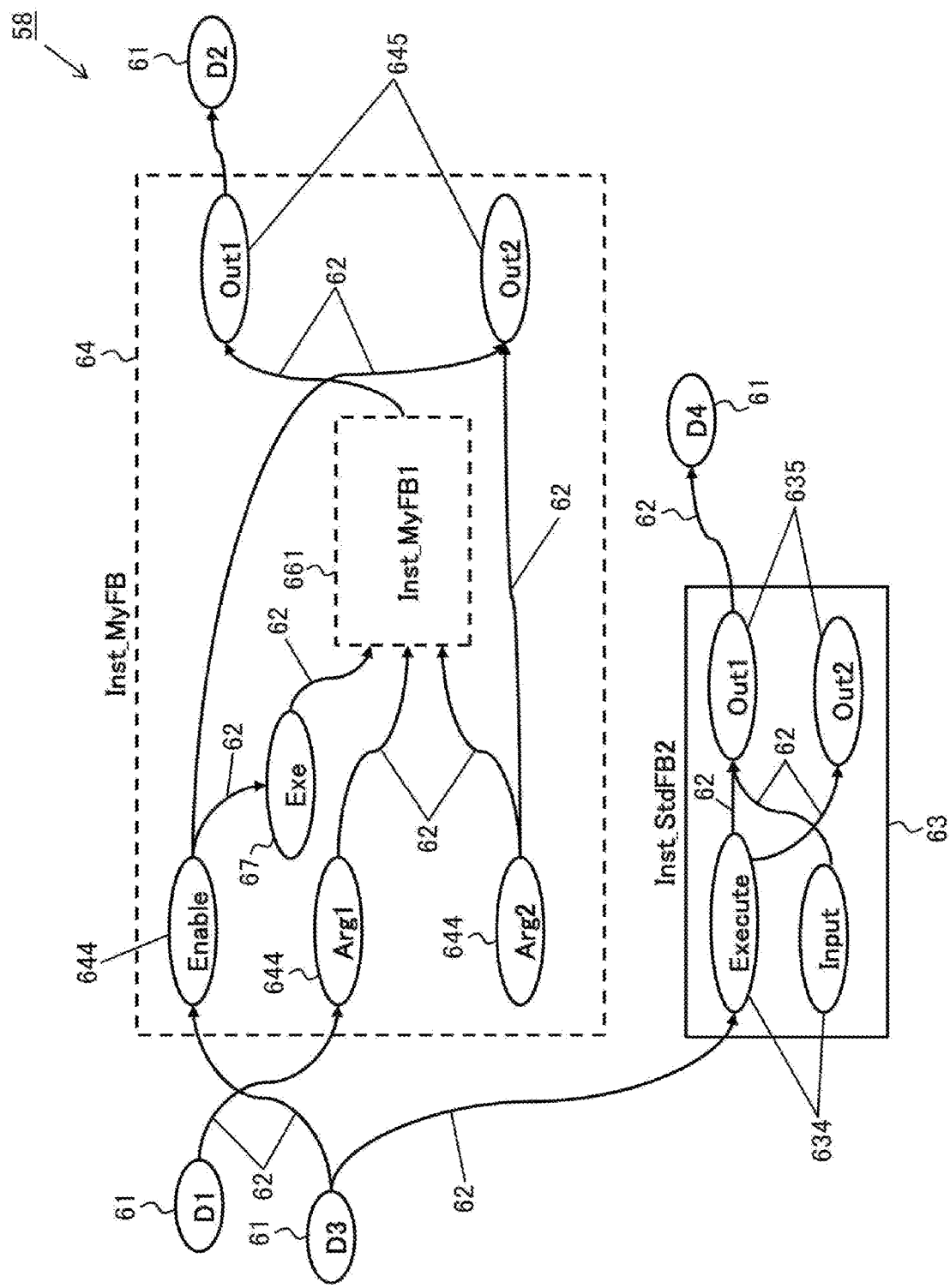
FIG. 18D illustrates an example of the directed graph generated by the analysis device according to the embodiment based on the result in which the dependency relation is identified.

Next, an example of a directed graph of the eighth mode will be described with reference to FIG. 18D. FIG. 18D schematically illustrates an example of a directed graph 58 of the eighth mode generated by the analysis device 1 according to the present embodiment. The eighth mode is a mode indicating another user-defined function used inside the user-defined function.

In the above-described example, the control program 221 includes the standard function "STD_FB1" used inside the user-defined function "My_FB." A user-defined function may be used in place of the standard function "STD_FB1" or inside the user-defined function "My_FB" together with the standard function "STD_FB1." That is, the plurality of functions in the control program 221 may include another user-defined function used between the input parameter and the output parameter having the dependency relation with each other inside the user-defined function. In this case, the directed graph 58 of the eighth mode is generated so that blocks 661 representing the instances of another user-defined function used inside the instance of the user-defined function are disposed between the nodes (644 and 645) which represent each of the input parameter and the output parameter having the dependency relation with each other in the block 64 representing the instance of the user-defined function, and are connected via the edge 62. The block 661 is an example of the "another second block" of the present invention.

The eighth mode is the same as the seventh mode except that the type of function displayed in the user-defined function is different. Therefore, in Step S108, the control part 11 can identify the arrangement of blocks 661 representing instances of other user-defined functions used inside the instance of the user-defined function, and each of the nodes (644 and 645) connected to the blocks 661 via the edge 62 by the same method as that in the seventh mode. The control part 11 disposes the blocks 661 representing the instances of other user-defined functions in the block 64 using the identification results, and connects each of the nodes (644 and 645) representing each of the parameters having the dependency relation with each of the parameters of the instances of the other user-defined functions to the blocks 661 by the edge 62. Thus, the control part 11 can generate the directed graph 58 of the eighth mode.

In Step S109, the control part 11 outputs the directed graph 58 generated in this way to the display device 15. According to this directed graph 58, another user-defined function used in the user-defined function can be represented. Therefore, the dependency relation between the device variables 31 via the user-defined function in the control program 221 can be shown in association with the internal structure of the user-defined function.

In the example of FIG. 18D, the directed graph 58 is generated to include the node 67 representing the local variable, as in the sixth mode. As described above, the display form of the sixth mode may be adopted also in the eighth mode. However, the display form of the eighth mode may not be limited to such an example. In the display form of the eighth mode, the display form of the sixth mode may be omitted. From the directed graph 58 illustrated by FIG. 18D, the display of the node 67 may be omitted. In this case, the edge 62 is connected to the block 661 from the node 644 representing the input parameter "Enable."

Further, as in the seventh mode, when the control program 221 includes the standard function used in the user-defined function, the display form of the seventh mode may be further adopted in the display form of the eighth mode.

Further, as illustrated by FIG. 18D, in the eighth mode, as in the second to seventh modes, the directed graph 58 may be generated to show the block 63 representing the instance of the standard function and the blocks (64 and 661) representing the instances of the user-defined function in different forms. However, a method of representing each of the blocks (63, 64 and 661) of the function in the eighth mode may not be limited to such an example. Also in the eighth mode, as in the second to seventh modes, the block 63 representing the instance of the standard function and the blocks (64 and 661) representing the instances of the user-defined function may be shown in the same form.

Further, in the example of FIG. 18D, the block 661 is shown in the same form as that of the block 64 in the second to fourth modes, unlike the block 64 in the fifth to seventh modes. However, a method of representing the block 661 in the eighth mode may not be limited to such an example. The block 661 may also be shown in the same form as that of the block 64 in the fifth to seventh modes, that is, in a state in which the internal structure of another user-defined function is represented.

(9) Ninth Mode

Figure 19:
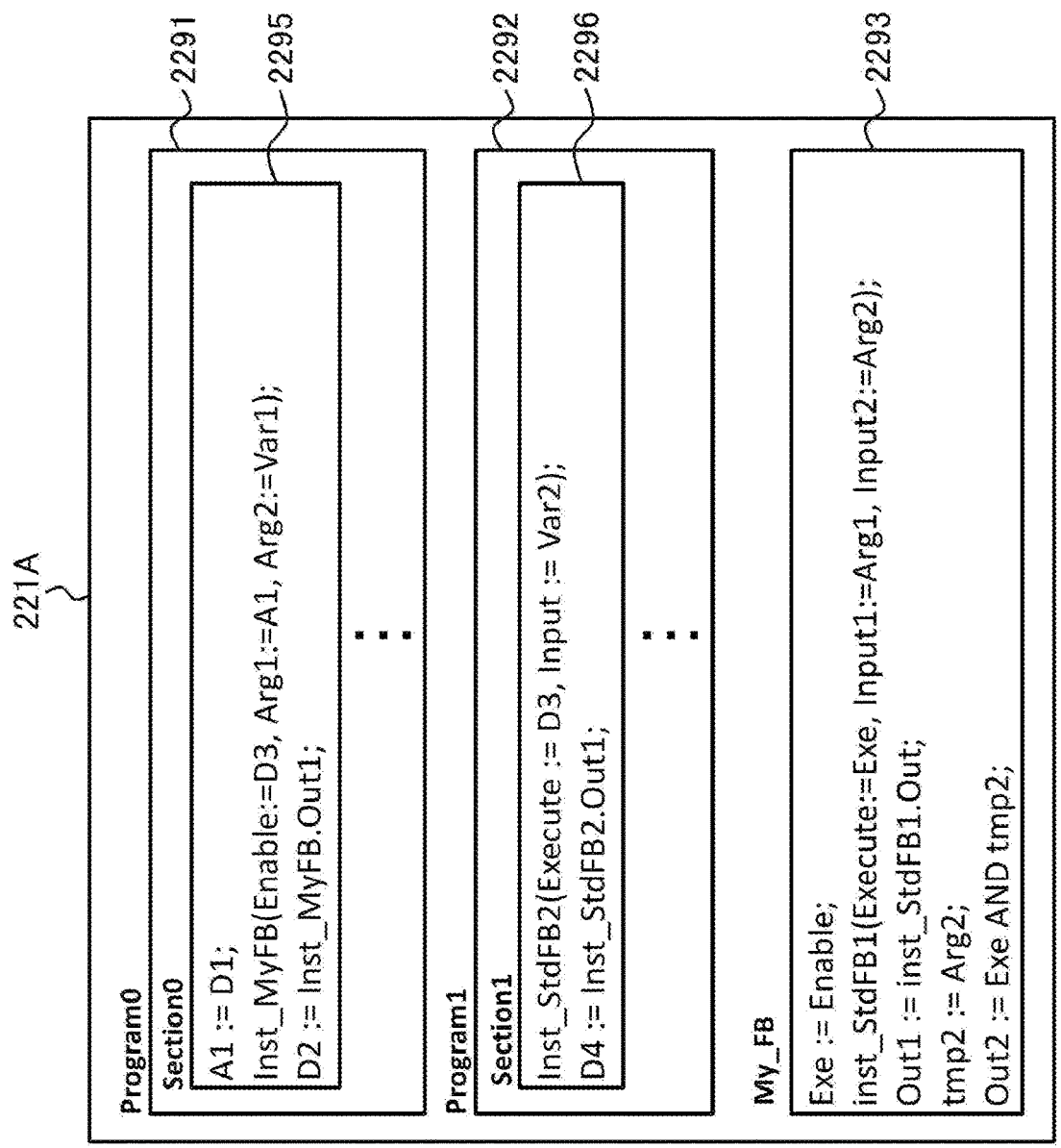
FIG. 19 shows an example of another control program.
Figure 20A:
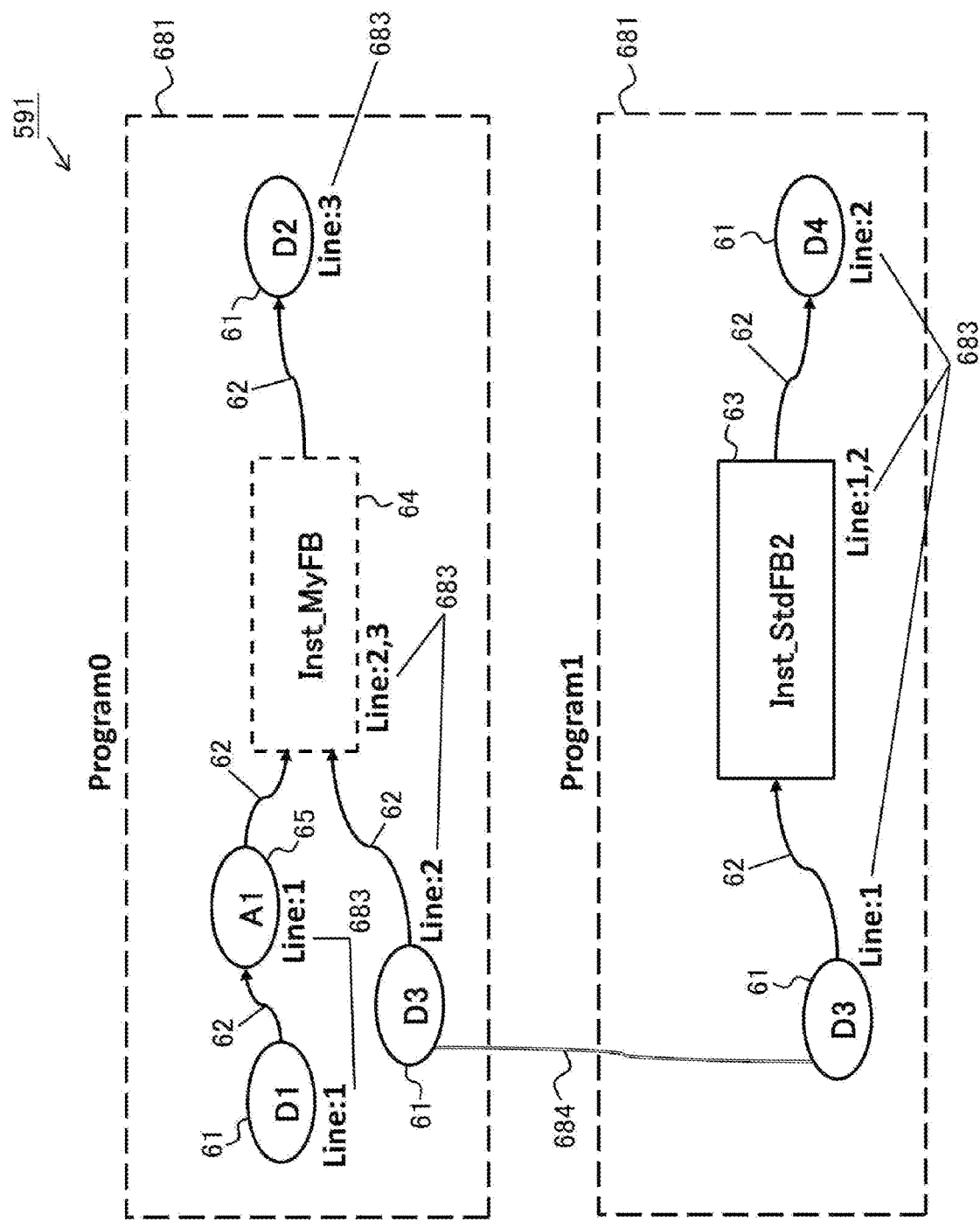
FIG. 20A illustrates an example of the directed graph generated by the analysis device according to the embodiment based on the result in which the dependency relation is identified on the control program of FIG. 19.

Next, an example of a directed graph of the ninth mode will be described with reference to FIGS. 19 and 20A. FIG. 19 shows an example of a control program 221A which is a modified example of the control program 221. FIG. 20A schematically illustrates an example of a directed graph 591 of the ninth mode generated by the analysis device 1 according to the present embodiment based on the result in which the dependency relation is identified on the control program 221A of FIG. 19. The ninth mode is a mode showing a corresponding relation between each of the device variables and a subprogram in the control program.

The control program 221A illustrated in FIG. 19 is the same as the above-described control program 221 illustrated in FIG. 7, except that the subprogram 2211 is divided into two subprograms (2291 and 2292). In the following description of the ninth mode and the tenth mode, it is assumed that the processing of Steps S101 to S109 are performed for the control program 221A illustrated in FIG. 19. When the control programs illustrated in FIG. 19 are referred to separately, they correspond to "221A," and when they are referred to without distinction, they correspond to "221."

The control program 221A illustrated in FIG. 19 is divided into three subprograms 2291 to 2293. In this way, the control program 221 may be divided into a plurality of subprograms. In this case, the directed graph 591 of the ninth mode is generated to include a plurality of regions 681 corresponding to each of the subprograms, and each of the nodes 61 is disposed in the region 681 of the subprogram using the device variable 31 to be represented among the plurality of regions 681.

In Step S108, the control part 11 identifies each of the subprograms 2291 to 2293 constituting the control program 221A. A method of identifying each of the subprograms 2291 to 2293 constituting the control program 221A may not be particularly limited. For example, the control part 11 may identify each of the subprograms 2291 to 2293 directly from the control program 221A. In addition, information indicating a location of a corresponding program portion is stored in the "PROGRAM" field of each of the records of the extraction result data 224 obtained as the result of the dependency analysis. Therefore, the control part 11 may identify each of the subprograms 2291 to 2293 with reference to a value in the "PROGRAM" field of each of the records of the extraction result data 224.

Next, the control part 11 sets the region 681 corresponding to each of the identified subprograms 2291 to 2293. Subsequently, the control part 11 identifies a subprogram which uses each of the device variables 31 from each of the identified subprograms 2291 to 2293. In the control program 221A of FIG. 19, for example, the device variable "D1" is used in the subprogram 2291. Further, for example, the device variable "D3" is used in the two subprograms (2291 and 2292). This usage relation may be identified as appropriate. For example, the control part 11 can identify a subprogram which uses each of the device variables 31 with reference to the value in the "PROGRAM" field of each of the records of the extraction result data 224. Then, the control part 11 disposes each of the nodes 61 representing each of the device variables 31 in the corresponding region 681. Regarding the generation processing of the directed graph 591, other points may be the same as those in the first to eighth modes. Thus, the control part 11 can generate the directed graph 591 of the ninth mode.

As illustrated in FIG. 20A, the directed graph 591 may be generated to include each of blocks (63 and 64) representing instances of the function, as in the second to eighth modes. In this case, the control part 11 identifies a subprogram which uses the function, similarly to each of the device variables 31. Then, the control part 11 disposes each of the blocks (63 and 64) representing the instances of the function in the corresponding region 681.

Similarly, the directed graph 591 may be generated to include the node 65 representing another variable, as in the fourth mode. In this case, the control part 11 identifies a subprogram which uses other variables, similarly to each of the device variables 31. Then, the control part 11 disposes the node 65 representing other variables in the corresponding region 681.

Further, when there is a device variable used by the plurality of subprograms such as the device variable "D3," the control part 11 may dispose the nodes 61 representing the device variable in each of the regions 681. In the example of FIG. 20A, the nodes 61 representing the device variable "D3" are disposed in each of the regions 681 corresponding to subprograms "Program 0" and "Program 1." In this case, as illustrated in FIG. 20A, the control part 11 may connect the nodes 61 corresponding to the same device variable with the edge 684. Thus, it can be shown that the nodes 61 connected to the edge 684 correspond to the same device variable. The same applies to a case in which each of the other variables and functions is used in the plurality of subprograms.

Further, as shown in FIG. 20A, the directed graph 591 may be generated to indicate a location of each of the device variables 31 to be represented in the control program 221A in the vicinity of each of the nodes 61. Information indicating this location may be acquired as appropriate. For example, the information indicating this location may be stored in the "PROGRAM" field of each of the records of the extraction result data 224. In this case, the control part 11 can acquire the information indicating the location of each of the device variables 31 with reference to the "PROGRAM" field of each of the records of the extraction result data 224. Further, the control part 11 may directly acquire the information indicating the location of each of the device variables 31 from the control program 221A. Then, the control part 11 displays the acquired information indicating the location in the vicinity of the node 61 representing each of device variables 31. The control part 11 may handle other variables and functions in the same manner. In the example of FIG. 20A, the directed graph 591 is generated so that each of location notations 683 indicating each of the device variables 31 to be represented, other variables, and the locations of the functions in the control program 221A is disposed in the vicinity of each of the nodes 61, the node 65, and each of the blocks (63 and 64).

In Step S109, the control part 11 outputs the directed graph 591 generated in this way to the display device 15. According to this directed graph 591, it is possible to show the corresponding relation between each of the device variables 31 and each of the subprograms 2291 to 2293. Therefore, when division programming is performed, the location of the device variable 31 corresponding to each of the devices 28 in the control program 221A and the dependency relation between the device variables 31 can be shown in association with each other.

The directed graph 591 illustrated in FIG. 20A is generated to include each of the blocks (63 and 64) representing the instances of the function. However, the directed graph 591 of the ninth mode may not be limited to such an example. In the directed graph 591 of the ninth mode, the display of each of the blocks (63 and 64) may be omitted as in the first mode.

Further, the directed graph 591 illustrated in FIG. 20A is generated to include the node 65 representing another variable, as in the fourth mode. However, the directed graph 591 of the ninth mode may not be limited to such an example. In the directed graph 591 of the ninth mode, the display of the node 65 may be omitted as in the case of the first mode and the like.

Further, the directed graph 591 illustrated in FIG. 20A is generated to show each of the location notations 683. However, the directed graph 591 of the ninth mode may not be limited to such an example. In the directed graph 591 of the ninth mode, each of the location notations 683 may be omitted.

(10) Tenth Mode

Figure 20B:
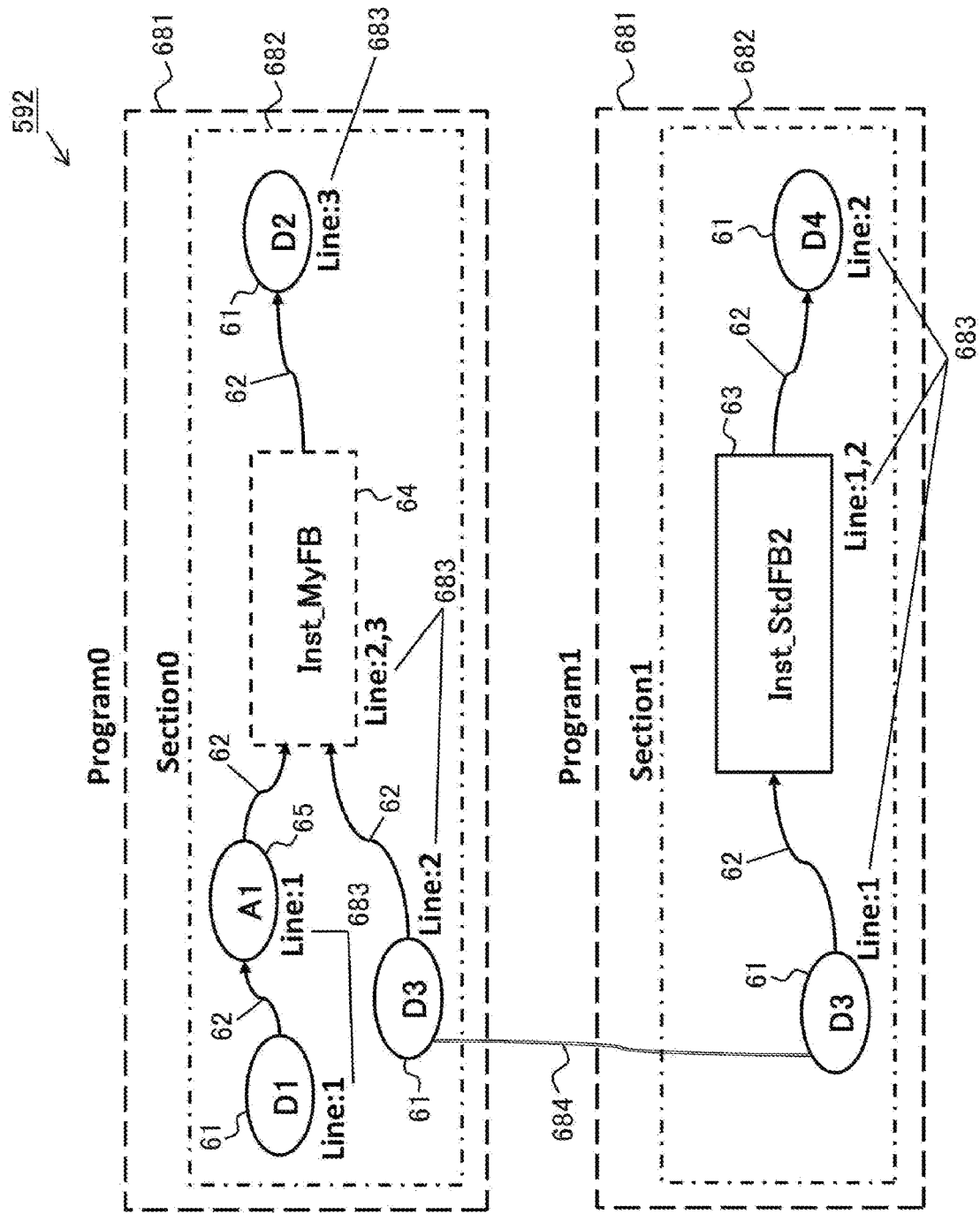
FIG. 20B illustrates an example of the directed graph generated by the analysis device according to the embodiment based on the result in which the dependency relation is identified on the control program of FIG. 19.

Next, an example of a directed graph in the tenth mode will be described with reference to FIG. 20B. FIG. 20B schematically illustrates an example of a directed graph 592 of the tenth mode generated by the analysis device 1 according to the present embodiment based on the result in which the dependency relation is identified on the control program 221A of FIG. 19. The tenth mode is a mode showing a corresponding relation between each of the device variables and a section in the subprogram.

In the example of FIG. 19, the subprogram 2291 of the control program 221A is divided into sections 2295, and the subprogram 2292 is divided into sections 2296. As described above, when the control program 221A is divided into a plurality of subprograms, at least one of the plurality of subprograms may be divided into one or more sections. In this case, the directed graph 592 of the tenth mode is generated so that the region 681 of the subprogram divided into one or more sections includes one or more sub-regions 682 corresponding to the one or more sections, and the node 61 representing the device variable 31 used in the section is disposed in the sub-region 682 corresponding to the section.

In Step S108, the control part 11 identifies the sections (2295 and 2296) used in each of the subprograms 2291 to 2293, as in the subprograms 2291 to 2293 in the ninth mode, and sets the sub-region 682 corresponding to each of the sections (2295 and 2296) in the corresponding region 681. In the ninth mode, the control part 11 identifies the usage relation between each of the sections (2295 and 2296) and each of the device variables 31 in the same manner as the method of identifying the usage relation between each of the subprograms 2291 to 2293 and each of the device variables 31. Then, the control part 11 disposes each of the nodes 61 representing each of the device variables 31 in the corresponding sub-region 682. Regarding the generation processing of the directed graph 592, other points may be the same as in the ninth mode. Thus, the control part 11 can generate the directed graph 592 of the tenth mode.

In Step S109, the control part 11 outputs the directed graph 592 generated in this way to the display device 15. According to the directed graph 592, the corresponding between each of the device variables 31 and each of the sections (2295 and 2296) of each of the subprograms 2291 to 2293 can be shown. Therefore, when the division programming is performed, the location of the device variable 31 corresponding to each of the devices 28 in the control program 221A and the dependency relation between the device variables 31 can be associated with each other and can be more clearly shown.

The directed graph 592 illustrated in FIG. 20B is generated to include each of the blocks (63 and 64) representing the instances of the function. However, the directed graph 592 in the tenth mode may not be limited to such an example. In the directed graph 592 of the tenth mode, the display of each of the blocks (63 and 64) may be omitted as in the first mode.

Further, the directed graph 592 illustrated in FIG. 20B is generated to include the node 65 representing another variable, as in the fourth mode. However, the directed graph 592 in the tenth mode may not be limited to such an example. In the directed graph 592 of the tenth mode, the display of the node 65 may be omitted as in the case of the first mode and the like.

Further, the directed graph 592 illustrated in FIG. 20B is generated to show each of the location notations 683, as in the ninth mode. However, the directed graph 592 in the tenth mode may not be limited to such an example. In the directed graph 592 of the tenth mode, each of the location notations 683 may be omitted.

(Display Control)

In Step S109, the control part 11 outputs any of the directed graphs (51 to 54, 541, 55 to 58, 591, and 592) of the first to tenth modes to the display device 15. At this time, the control part 11 may receive from the user a designation of the form of the directed graph to be output via the input device 14. Then, the control part 11 may switch the form of the directed graph from an arbitrary mode to another mode and may display it on the display device 15 according to the user's designation.

For example, the control part 11 may switch and display the directed graph 51 of the first mode and the directed graph 52 of the second mode on the display device 15 according to an instruction of the user. Further, the control part 11 may switch and display the directed graph 52 of the second mode and the directed graph 53 of the third mode on the display device 15 according to the instruction of the user. In this case, the control part 11 generates the directed graphs (52 and 53) so that the display form of the second mode and the display form of the third mode can be switched. Further, the control part 11 may switch and display the directed graph 51 of the first mode, the directed graph 52 of the second mode, and the directed graphs (54 and 541) of the fourth mode on the display device 15 according to the instruction of the user. In the directed graph 54 of the fourth mode, the display form of the third mode is adopted. In the directed graph 541 of the fourth mode, the display form of the second mode is adopted. When both the display forms of the second mode and the third mode are adopted in the fourth mode, the control part 11 may generate the directed graphs (54 and 541) of the fourth mode so that each of the display forms can be switched and displayed on the display device 15.

Further, for example, the control part 11 may switch and display the directed graph 52 of the second mode and the directed graph 55 of the fifth mode on the display device 15 according to the instruction of the user. In this case, the control part 11 may display the directed graph 53 of the third mode or the directed graphs (54 and 541) of the fourth mode on the display device 15 instead of the directed graph 52 of the second mode. In addition, the control part 11 may switch and display the directed graphs 55 to 58 of the fifth to eighth modes on the display device 15 according to the instruction of the user. In this case, the control part 11 generates the directed graphs 55 to 58 so that the display forms of the fifth to eighth modes can be switched. In this case, any one of the sixth to eighth modes may be omitted.

Further, for example, the control part 11 may switch and display the directed graph 51 of the first mode and the directed graph 591 of the ninth mode on the display device 15 according to the instruction of the user. In this case, the control part 11 may display any one of the directed graphs (52 to 54, 541, and 55 to 58) of the second to eighth modes on the display device 15 instead of the directed graph 51 of the first mode. In addition, the control part 11 may switch and display the directed graph 591 of the ninth mode and the directed graph 592 of the tenth mode on the display device 15 according to the instruction of the user. In this case, the control part 11 generates the directed graphs (591 and 592) so that the display form of the ninth mode and the display form of the tenth mode can be switched.

When the mode is changed from an arbitrary mode to another mode, the control part 11 may switch the display of the entire directed graph. Alternatively, the control part 11 may switch the display of a part of the directed graph. In this case, the control part 11 may receive a designation of a portion of the directed graph in which the mode is changed and may switch the display of the designated portion. As an example, while the directed graph 51 of the first mode is displayed on the display device 15, the control part 11 may receive a selection of the edge 62 as the designation of the portion in which the mode is changed. Then, the control part 11 may switch the display of the directed graph so that the dependency relation between the two device variables connected by the selected edge 62 is shown in the second mode.

In the second to tenth modes, "connecting via the edge" may include connecting directly via the edge the nodes and the blocks which represent the variables and the functions having the dependency relation directly on each other. In addition, in the second to tenth modes, the "connecting via the edge" may include a case in which the nodes and the blocks which represent the variables and the functions having the dependency relation indirectly with other variables or/and functions interposed therebetween are connected by the edges with nodes or/and blocks representing the other variables or/and functions interposed therebetween.

Further, as in the fourth to sixth modes, for example, when a plurality of nodes representing different types of variables such as each of the nodes (61, 65, 67, 634, 635, 644, and 645) is displayed, the control part 11 may indicate the nodes in different forms similarly to the above-described block of each of the functions. For example, the control part 11 may indicate the nodes in the different forms according to a difference in the type of any one of the device variable/another variable, the external variable/internal variable, and the local variable/global variable. The form of each of the nodes may be defined by attributes such as the types of lines, colors, shapes, and character fonts. Further, a symbol corresponding to each of the nodes may be defined, and each of the defined symbols may be used for displaying each of the nodes.

In this way, when any one of the directed graphs (51 to 54, 541, 55 to 58, 591, and 592) of the first to tenth modes is output to the display device 15, the control part 11 ends the processing related to this operation example.

[Feature]

As described above, in Step S106 (Step S508), the analysis device 1 according to the present embodiment identifies the dependency relation between the input parameter 43 and the output parameter 44 of the standard function 41 with reference to the function structure information 121. Thus, in Step S107 (Step S509), the analysis device 1 according to the present embodiment can identify the dependency relation between the plurality of device variables 31 with the standard function 41 interposed therebetween. Therefore, according to the present embodiment, even when the control program 221 includes the standard function 41, the dependency relation between the plurality of devices 28 constituting the production line 27 can be appropriately derived from the control program 221.

§ 4 Modified Example

Although the embodiment of the present invention has been described in detail, the above description is merely an example of the present invention in all respects. Needless to say, various improvements and modifications can be made without departing from the scope of the present invention. For example, the following changes can be made. In the following, the same reference numerals will be used for the same parts as those in the above-described embodiment, and the same points as in the above-described embodiment will be omitted as appropriate. The following modified examples can be combined as appropriate.

<4.1>

In the above-described embodiment, in Step S108, the control part 11 generates the directed graphs (51 to 54, 541, 55 to 58, 591, and 592) of the first to tenth modes. However, the directed graph which can be generated by the control part 11 may not be limited to such an example. For example, at least one of the first to tenth modes may be omitted. Further, for example, the control part 11 may generate a directed graph having a form different from those of the first to tenth modes.

Further, in the above-described embodiment, in Step S109, the control part 11 outputs the directed graphs (51 to 54, 541, 55 to 58, 591, and 592) as information on the result in which the dependency relation between the device variables 31 is identified. However, a form of the information on the result in which the dependency relation between the device variables 31 is identified may not be limited to such a directed graph, and may be appropriately selected according to the embodiment. For example, the control part 11 may show the result, in which the dependency relation between the device variables 31 is identified, by an undirected graph, or may show the result by a representation other than the graph (for example, a character representation).

Further, in the above-described embodiment, the control part 11 outputs the information on the result, in which the dependency relation between the device variables 31 is identified, to the display device 15. However, an output destination of the information is not limited to such an example, and may be appropriately selected according to the embodiment. For example, the control part 11 may output the information on the result, in which the dependency relation between the device variables 31 is identified, to a display device different from the display device 15, or may output the information to an output destination other than the display device (for example, a memory or an output device other than the display device).

<4.2>

In the above-described embodiment, in Step S103, the analysis device 1 determines whether or not an instance of the undefined standard function is included in the control program 221. Then, when it is determined that the instance of the undefined standard function is included in the control program 221, the analysis device 1 receives the input of the additional function structure information 123 in Step S105. The processing of Steps S103 to S105 may be omitted. In this case, the definition determination part 113 and the definition reception part 114 may be omitted in the software configuration of the analysis device 1.

<4.3>

In the above-described embodiment, the analysis device 1 specifies the dependency relation between the device variables 31 from the control program 221 by the processing of Steps S101 to S107. Then, the analysis device 1 generates a directed graph showing the identification result by the processing of Steps S108 and S109, and outputs the generated directed graph to the display device 15. The analysis device 1 which performs both the processing of identifying the dependency relation and the processing of outputting the identification result is an example of a "graph display device." The program acquisition part 111 to the relation identification part 116 are examples of the "information acquisition part." However, the processing does not necessarily have to be performed on the same computer. That is, the processing of identifying the dependency relation and the processing of outputting the identification result may be performed by separate computers. In this case, a computer which performs the processing of outputting the identification result may be referred to as the "graph display device."

(Hardware Configuration)

Figure 21:
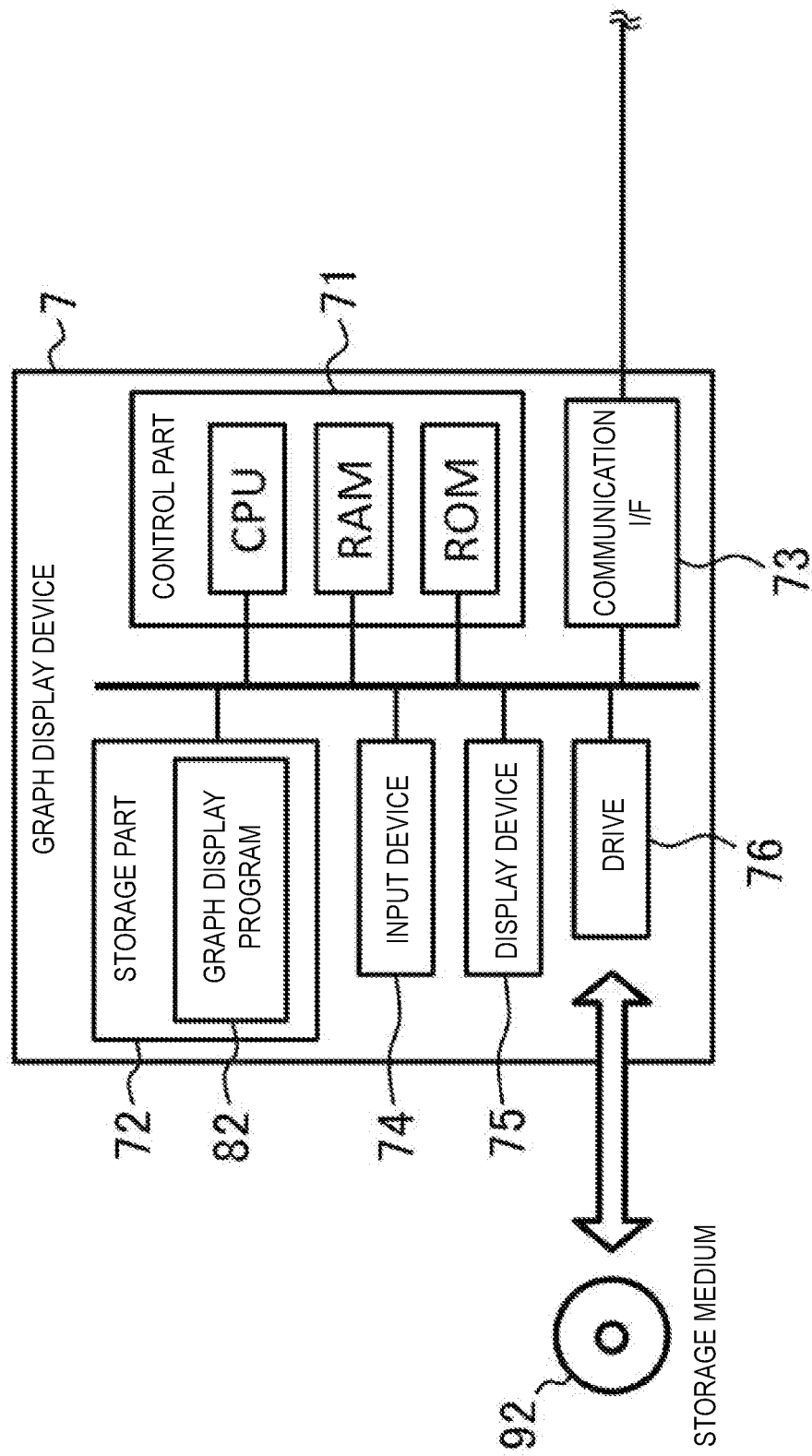
FIG. 21 illustrates an example of a hardware configuration of a graph display device according to a modified example.

FIG. 21 schematically illustrates an example of a hardware configuration of a graph display device 7 according to the present modified example. As shown in FIG. 21, the graph display device 7 according to the present modified example is a computer to which a control part 71, a storage part 72, a communication interface 73, an input device 74, a display device 75, and a drive 76 are electrically connected. In FIG. 21, a communication interface is described as a "communication I/F."

The control parts 71 to the drive 76 of the graph display device 7 may be the same as the control parts 11 to the drive 16 of the analysis device 1. In the present modified example, the storage part 72 stores a variety of information such as a graph display program 82. The graph display program 82 is a program for generating a directed graph representing the result of identifying a causal relation between the device variables 31 and causing the graph display device 7 to perform information processing (FIG. 23 described later) for outputting the generated directed graph to the display device (for example, the display device 75). The graph display program 82 includes a series of instructions for the information processing. The graph display program 82 may be stored in a storage medium 92. Further, the graph display device 7 may acquire the graph display program 82 from the storage medium 92 via the drive 76.

Similar to the analysis device 1, regarding the specific hardware configuration of the graph display device 7, the parts can be omitted, replaced, and added as appropriate according to the embodiment. The graph display device 7 may be configured of a plurality of computers. In this case, the hardware configurations of the computers may or may not be the same. Further, the graph display device 7 may be a general-purpose information processing device such as a desktop PC or a tablet PC, a general-purpose server device, or the like, in addition to an information processing device designed exclusively for the provided service.

(Software Configuration)

Figure 22:
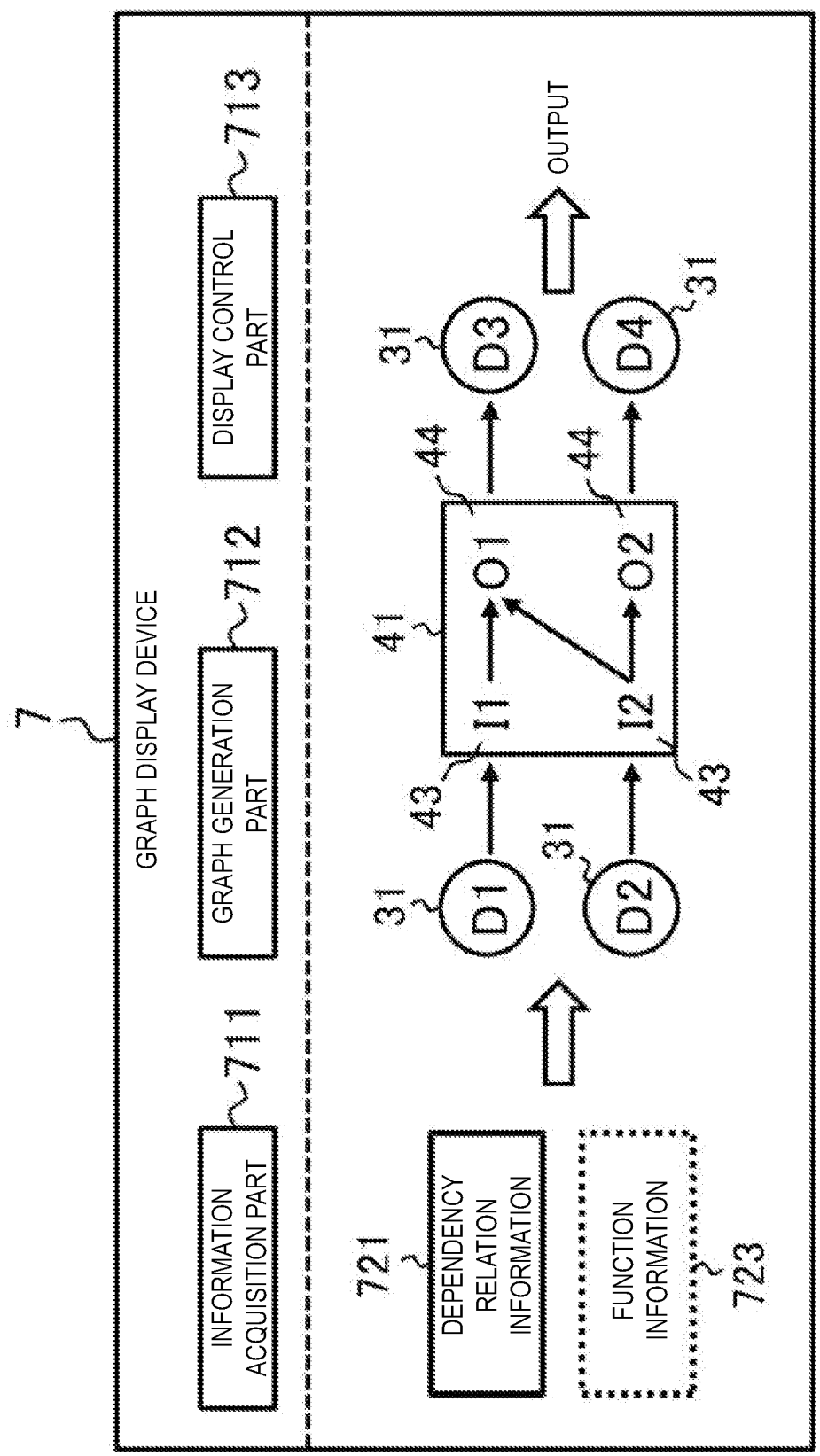
FIG. 22 illustrates an example of a software configuration of the graph display device according to the modified example.

FIG. 22 schematically illustrates an example of a software configuration of the graph display device 7 according to the present modified example. The control part 71 of the graph display device 7 decompresses the graph display program 82 stored in the storage part 72 into the RAM. Then, the control part 71 analyzes and executes the graph display program 82 decompressed in the RAM by the CPU to control each of the parts. Thus, as shown in FIG. 22, the graph display device 7 according to the present embodiment operates as a computer including an information acquisition part 711, a graph generation part 712, and a display control part 713 as software modules. That is, in the present modified example, each of the software modules of the graph display device 7 is realized by the control part 71 (a CPU).

The information acquisition part 711 acquires dependency relation information 721 indicating the dependency relation between the device variables 31 specified from the control program 221. The information acquisition part 711 may further acquire function information 723 indicating the dependency relation between the input parameter and the output parameter in the function. The dependency relation information 721 and the function information 723 may be configured of the function structure information 121, the additional function structure information 123, the extraction result data 224, the intermediate data 226, the identification result data 227, and the like. The graph generation part 712 generates a directed graph of each of the above-described modes based on the dependency relation information 721 (and the function information 723). The graph generation part 712 may be the same as the graph generation part 117. The display control part 713 switches and displays the generated directed graph of each of the modes on the display device (for example, the display device 75). The display control part 713 may be the same as the output part 118.

Each of software modules of the graph display device 7 will be described in detail in an operation example which will be described later. In the present embodiment, an example in which each of the software modules of the graph display device 7 is realized by a general-purpose CPU is described. However, some or all of the above-described software modules may be realized by one or a plurality of dedicated hardware processors. Further, regarding the software configuration of the graph display device 7, the software modules may be omitted, replaced, or added as appropriate according to the embodiment.

(Operation Example)

Figure 23:
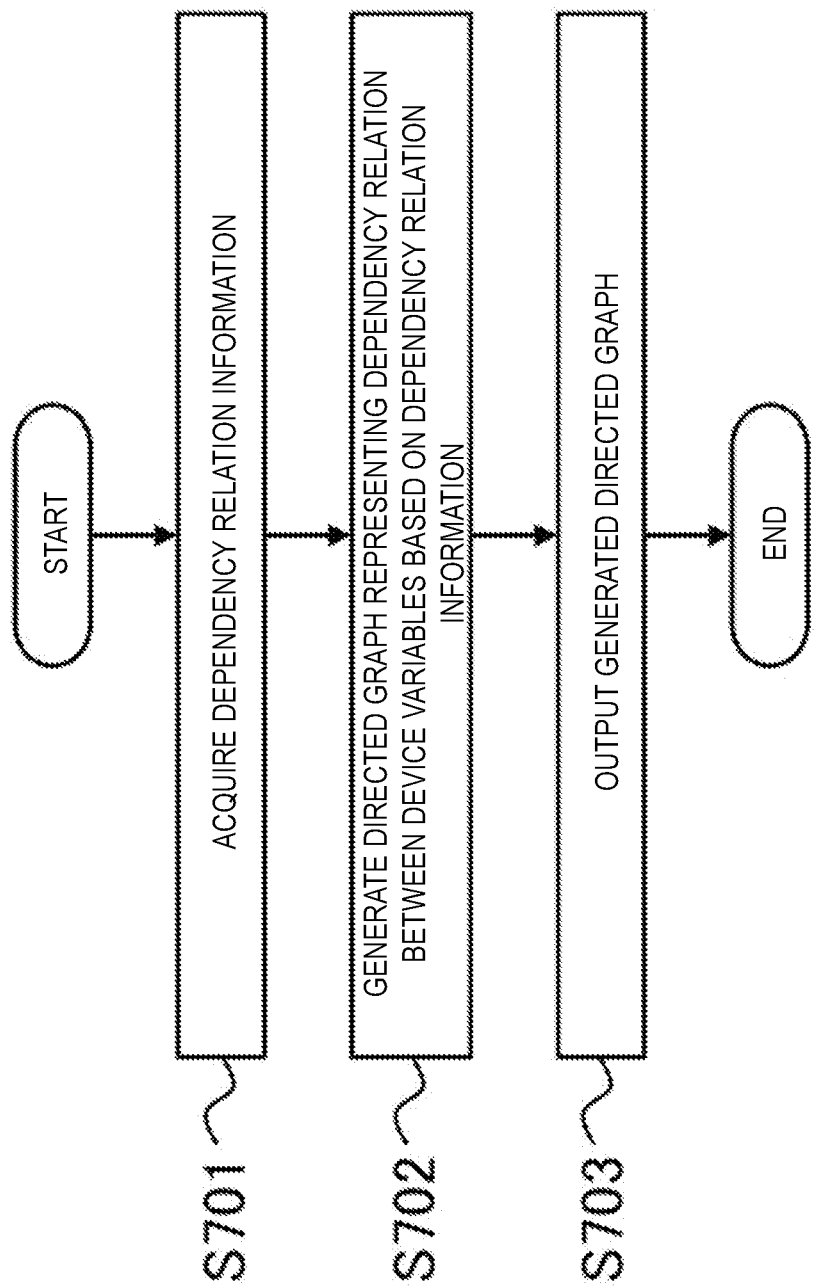
FIG. 23 illustrates an example of a processing procedure of the graph display device according to the modified example.

FIG. 23 illustrates an example of a processing procedure of the graph display device 7 according to the present modified example. The processing procedure of the graph display device 7 described below is an example of a "graph display method." However, the processing procedure described below is only an example, and each processing may be changed as much as possible. Further, regarding the processing procedure described below, steps can be omitted, replaced, and added as appropriate according to the embodiment.

In Step S701, the control part 71 operates as the information acquisition part 711 and acquires the dependency relation information 721. The dependency relation information 721 indicates the dependency relation between the device variables 31 identified from the control program 221. The dependency relation information 721 may be configured to include, for example, the identification result data 227. Further, when a directed graph of the second mode or the like including a block representing a function is generated, the dependency relation information 721 may further indicate the dependency relation of each of the device variables 31 on each of the parameters of the function. In this case, the dependency relation information 721 may be configured to further include the extraction result data 224 and the intermediate data 226. Further, when a directed graph showing the location of each of the device variables 31 in the control program 221 such as the subprogram or the section as in the ninth mode and the tenth mode is generated, the dependency relation information 721 may be configured to include information indicating the location, such as the "PROGRAM" field of each of the records of the extraction result data 224. However, the configuration of the dependency relation information 721 may not be limited to such an example. Further, a data format of the dependency relation information 721 may not be particularly limited, and may be appropriately set according to the embodiment.

In addition, when a directed graph showing the internal structure of the function is generated as in the fifth to eighth modes, the control part 71 may further acquire the function information 723. The function information 723 may be configured of the function structure information 121, the additional function structure information 123, the records related to the user-defined functions of the extraction result data 224, data showing the results of identifying the dependency relation with each of the parameters of the user-defined functions, and the like. However, the configuration of the function information 723 may not be limited to such an example. Further, a data format of the function information 723 may not be particularly limited, and may be appropriately set according to the embodiment.

The dependency relation information 721 and the function information 723 may be generated by another information processing device such as the analysis device 1 which is configured to identify the dependency relation between the device variables 31. The control part 71 may acquire the dependency relation information 721 and the function information 723 from another information processing device via, for example, the network, the storage medium 92, or the like. Further, the dependency relation information 721 and the function information 723 may be stored in an external storage device such as a network attached storage (NAS). In this case, the control part 71 may acquire the dependency relation information 721 and the function information 723 from the external storage device. Further, the dependency relation information 721 and the function information 723 may be stored in the storage part 72 in advance. In this case, the control part 71 may acquire the dependency relation information 721 and the function information 723 from the storage part 72. A method of acquiring the dependency relation information 721 and the function information 723 may not be particularly limited, and may be appropriately selected according to the embodiment. When the dependency relation information 721 (and the function information 723) is acquired, the control part 71 proceeds to next Step S702.

In Step S702, the control part 71 generates the directed graphs (51 to 54, 541, 55 to 58, 591, and 592) of each of the above-described modes based on the dependency relation information 721 (and the function information 723). The processing of Step S702 may be the same as the processing of Step S108. In Step S703, the control part 71 switches and displays the generated directed graphs (51 to 54, 541, 55 to 58, 591, and 592) of each of the modes on the display device. An output destination may be the display device 75 or another display device (for example, a display device of another information processing device). The processing of Step S703 may be the same as the processing of Step S109. When the output processing is completed, the control part 71 ends the processing related to the present modified example. According to the present modified example, a computer which performs the processing of identifying the dependency relation between the device variables 31 and a computer which performs the processing of outputting the identification result can be configured separately.

<4.4>

In the above-described embodiment, the analysis device 1 and the PLC 2 are configured by different computers. However, the configuration of the system to which the present invention is applicable may not be limited to such an example. The analysis device 1 and the PLC 2 may be configured by an integrated computer.

Figure 24:
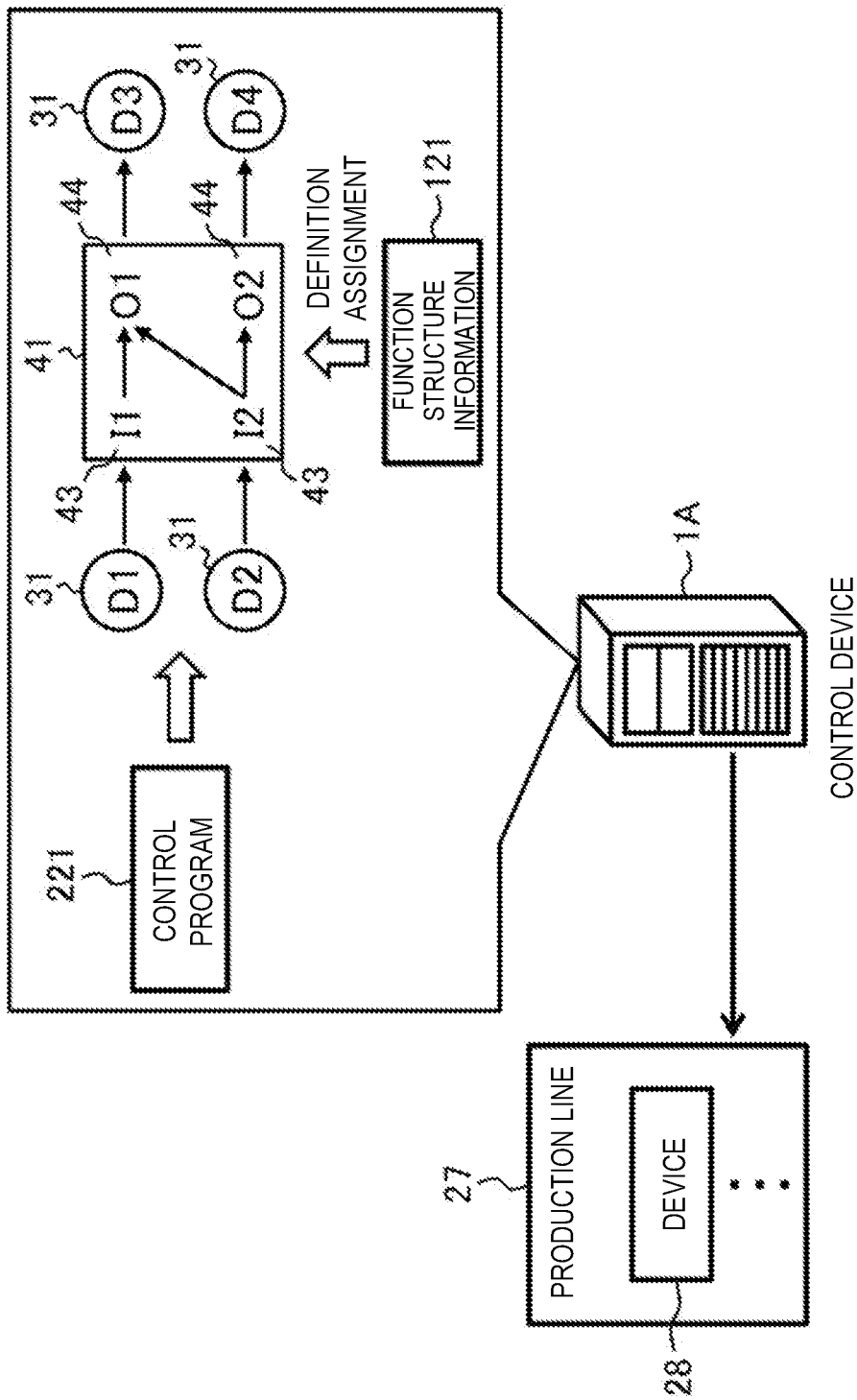
FIG. 24 schematically illustrates an example of another situation in which the present invention is applied.

FIG. 24 schematically illustrates an application situation of the control device 1A according to the present modified example. The control device 1A according to the present modified example is a computer configured to serve as both the analysis device 1 and the PLC 2 according to the above-described embodiment. The hardware configuration of the control device 1A may be obtained by adding the input and output interface 23 of the PLC 2 to the hardware configuration of the analysis device 1. Further, regarding the processing of identifying the dependency relation between the devices 28, the software configuration of the control device 1A may be the same as the software configuration of the analysis device 1. In this way, the present invention may be applied to a device (the PLC or the like) which controls the operation of the production line 27.

The invention claimed is:

1. An analysis device comprising:
a memory, storing a program;
a processor, by executing the program, being configured to function as:
a program acquisition part acquiring a control program including a plurality of instructions for controlling operations of a plurality of devices included in a production line, the plurality of instructions including a function and a plurality of variables, the function including a standard function prepared as a standard, and each of the plurality of variables including a plurality of device variables corresponding to each of the devices;
a program analysis part extracting a pattern of a dependency relation of each of the device variables with an input parameter or an output parameter of the function by performing a dependency analysis on the control program;
a definition assignment part identifying a dependency relation between the input parameter and the output parameter in the standard function included in the function based on function structure information which defines the dependency relation between the input parameter and the output parameter in the standard function;
a relation identification part identifying the dependency relation between the device variables by recognizing that one device variable having the dependency relation with an input parameter has a dependency relation with another device variable having a dependency relation with an output parameter having the dependency relation with the input parameter of the same function among the functions in the extracted pattern of the dependency relation; and
an output part outputting information on a result in which the dependency relation between the device variables is identified,
wherein the plurality of variables includes another variable which is different from each of the device variables and is used between any one of the plurality of device variables and the input parameter or the output parameter of the function.

2. The analysis device according to claim 1, wherein extracting the pattern of the dependency relation by performing the dependency analysis includes,
generating an abstract syntax tree from the control program by performing a syntax analysis on the control program,
generating a control flow graph showing a route, on which each of the instructions depends, from the generated abstract syntax tree,
extracting each of the device variables from the abstract syntax tree or the control flow graph,
extracting a function from the abstract syntax tree or the control flow graph, and
extracting the pattern of the dependency relation of each extracted device variable with an input parameter or an output parameter of the extracted function by tracing the route on which each of instruction depends with reference to the control flow graph.

3. The analysis device according to claim 1, wherein the processor further configured to function as:
a graph generation part generating a directed graph which shows the dependency relation between the identified device variables based on the result in which the dependency relation is identified and includes a plurality of first nodes representing each of the device variables, and an edge representing the dependency relation, and
wherein the output part outputs the generated directed graph as information on the result.

4. The analysis device according to claim 3, wherein the directed graph is generated to further include a block which represents the function and is connected via the edge to the first node representing the device variable having the dependency relation with the input parameter or the output parameter of the represented function.

5. The analysis device according to claim 4, wherein:
the directed graph is generated to further include a second node which represents the other variable, is disposed between the first node representing any one of the plurality of device variables and the block representing the function, and is connected to each of the first node and the block via the edge.

6. The analysis device according to claim 4, wherein the directed graph is generated so that the input parameter and the output parameter of the represented function are distinguished, the block is connected via the edge to the first node representing the device variable having the dependency relation, and a name of the corresponding input parameter or output parameter is shown in the vicinity of the edge.

7. The analysis device according to claim 4, wherein:
the plurality of instructions includes the plurality of functions,
the plurality of functions further includes a user-defined function which is different from the standard function and is defined by a user in the control program, and the directed graph is generated so that, among the plurality of blocks, a first block representing the standard function of the plurality of functions is shown in a first form, and a second block representing the user-defined function is shown in a second form different from the first form.

8. The analysis device according to claim 4, wherein the directed graph is generated to further include a plurality of third nodes which is disposed in the block and represents each of the input parameter and the output parameter of the represented function, the third nodes each of which is connected via the edge to the first node representing the device variable having the dependency relation with each of the represented input parameter and output parameter and represents each of the input parameter and the output parameter having the dependency relation with each other in the represented function being connected to each other via the edge.

9. The analysis device according to claim 8, wherein:
the plurality of instructions includes the plurality of functions,
the plurality of functions further includes a user-defined function which is different from the standard function and is defined by a user in the control program, and
the directed graph is generated so that, among the plurality of blocks, a first block representing the standard function of the plurality of functions is shown in a first form, and a second block representing the user-defined function is shown in a second form different from the first form.

10. The analysis device according to claim 9, wherein:
the plurality of variables includes a local variable which is different from each of the device variables and is used between the input parameter and the output parameter which have the dependency relation with each other inside the user-defined function, and
the directed graph is generated to further include a fourth node which represents the local variable, is disposed between the third nodes representing each of the input parameter and the output parameter having the dependency relation with each other in the second block representing the user-defined function, and is connected to each of the third nodes via the edge.

11. The analysis device according to claim 9, wherein:
the plurality of functions includes a standard function used between the input parameter and the output parameter having the dependency relation with each other inside the user-defined function, and
the directed graph is generated so that the first block representing the standard function used inside the user-defined function is disposed between the third nodes representing each of the input parameter and the output parameter having the dependency relation with each other in the second block representing the user-defined function, and is connected to each of the third nodes via the edge.

12. The analysis device according to claim 9, wherein:
the plurality of functions further includes another user-defined function used between the input parameter and the output parameter having the dependency relation with each other inside the user-defined function, and
the directed graph is generated so that the second block representing the other user-defined function used inside the user-defined function is disposed between the third nodes representing each of the input parameter and the output parameter having the dependency relation with each other in the second block representing the user-defined function, and is connected to each of the third nodes via the edge.

13. The analysis device according to claim 3, wherein:
the control program is divided into a plurality of subprograms, and
the directed graph is generated so that a plurality of regions corresponding to each of the subprograms is included, and each of the first nodes is disposed in the region of the subprogram which utilizes the represented device variable among the plurality of regions.

14. The analysis device according to claim 13, wherein:
at least one of the plurality of subprograms is divided into sections, and
the directed graph is generated so that the first nodes which include sub-regions corresponding to the sections in the region of the subprogram divided into the sections and represent the device variables used in the sections are disposed in the sub-regions corresponding to the sections.

15. An analysis method in which the following steps are performed by a computer:
a step of acquiring a control program including a plurality of instructions for controlling operations of a plurality of devices included in a production line, the plurality of instructions including a function and a plurality of variables, the function including a standard function prepared as a standard, and each of the plurality of variables including a plurality of device variables corresponding to each of the devices;
a step of extracting a pattern of a dependency relation of each of the device variables with an input parameter or an output parameter of the function by performing a dependency analysis on the control program;
a step of identifying a dependency relation between the input parameter and the output parameter in the standard function included in the function based on function structure information which defines the dependency relation between the input parameter and the output parameter in the standard function;
a step of identifying the dependency relation between the device variables by recognizing that one device variable having the dependency relation with an input parameter has a dependency relation with another device variable having a dependency relation with an output parameter having the dependency relation with the input parameter of the same function among the functions in the extracted pattern of the dependency relation; and
a step of outputting information on a result in which the dependency relation between the device variables is identified,
wherein the plurality of variables includes another variable which is different from each of the device variables and is used between any one of the plurality of device variables and the input parameter or the output parameter of the function.

16. A recording medium in which an analysis program is recorded to make the following steps are performed by a computer:
a step of acquiring a control program including a plurality of instructions for controlling operations of a plurality of devices included in a production line, the plurality of instructions including a function and a plurality of variables, the function including a standard function prepared as a standard, and each of the plurality of variables including a plurality of device variables corresponding to each of the devices;

a step of extracting a pattern of a dependency relation of each of the device variables with an input parameter or an output parameter of the function by performing a dependency analysis on the control program;

a step of identifying a dependency relation between the input parameter and the output parameter in the standard function included in the function based on function structure information which defines the dependency relation between the input parameter and the output parameter in the standard function;

a step of identifying the dependency relation between the device variables by recognizing that one device variable having the dependency relation with an input parameter has a dependency relation with another device variable having a dependency relation with an output parameter having the dependency relation with the input parameter of the same function among the functions in the extracted pattern of the dependency relation; and a step of outputting information on a result in which the dependency relation between the device variables is identified, wherein the plurality of variables includes another variable which is different from each of the device variables and is used between any one of the plurality of device variables and the input parameter or the output parameter of the function.

* * * * *